(12) United States Patent
Donnelly et al.

(10) Patent No.: US 12,357,124 B2
(45) Date of Patent: Jul. 15, 2025

(54) INSET FRAMES FOR SUPPORTING COOKING ACCESSORIES IN COOKBOXES OF GRILLS

(71) Applicant: Weber-Stephen Products LLC, Palatine, IL (US)

(72) Inventors: Brian C. Donnelly, Naperville, IL (US); Shannon Ella Cerny, Aurora, IL (US); Christian Hyde, Schaumburg, IL (US); Cassandra A. S. McVey, Palatine, IL (US); William Alexander Mecker, Kildeer, IL (US); Michelle Stohl, Glenview, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 936 days.

(21) Appl. No.: 17/472,320

(22) Filed: Sep. 10, 2021

(65) Prior Publication Data

US 2022/0167793 A1 Jun. 2, 2022

Related U.S. Application Data

(60) Provisional application No. 63/120,539, filed on Dec. 2, 2020, provisional application No. 63/213,508, filed on Jun. 22, 2021.

(51) Int. Cl.
*A47J 37/07* (2006.01)

(52) U.S. Cl.
CPC ....... *A47J 37/0786* (2013.01); *A47J 37/0704* (2013.01)

(58) Field of Classification Search
CPC .. A47J 37/0786; A47J 37/067; A47J 37/0704; A47J 37/0694; A47J 37/0763; A47J 2037/0795; A47J 2037/0777; A47J 36/16; A47J 37/0629; A47J 37/0709; A47J 37/0713; A47J 27/62; A47J 36/00;
(Continued)

(56) References Cited

U.S. PATENT DOCUMENTS

| 5,490,452 A | 2/1996 | Schlosser et al. |
| 6,588,417 B2 | 7/2003 | Jones et al. |

(Continued)

FOREIGN PATENT DOCUMENTS

| CN | 101815457 A | 8/2010 |
| CN | 202681691 U | 1/2013 |

(Continued)

OTHER PUBLICATIONS

Australian Government, IP Australia, "Examination Report No. 3," issued in connection with Australian Patent Application No. 2021393362, dated Aug. 22, 2024, 4 pages.
Australian Government, IP Australia, "Examination Report No. 1," issued in connection with Australian Patent Application No. 2021393362, issued on Nov. 13, 2023, 3 pages.
(Continued)

*Primary Examiner* — Chris Q Liu
(74) *Attorney, Agent, or Firm* — Avantech Law

(57) ABSTRACT

Example inset frames configured to interchangeably support cooking accessories of various shapes and sizes within a cookbox of a grill are described. An example inset frame is configured to be positioned within a cookbox of a grill. The inset frame comprises a support lattice configured to interchangeably support a rectangular cooking accessory and a circular cooking accessory within the cookbox of the grill.

25 Claims, 65 Drawing Sheets

(58) Field of Classification Search
CPC .......... A47J 36/06; A47J 36/22; A47J 36/321; A47J 36/36; A47J 37/0676; A47J 37/0682; A47J 37/0718; A47J 37/0772; H05B 1/0261; H05B 1/0266
USPC .......... 99/422, 445, 450, 340, 394, 425, 446, 99/449
See application file for complete search history.

(56) References Cited

U.S. PATENT DOCUMENTS

| | | | |
|---|---|---|---|
| 6,935,330 | B1 | 8/2005 | Barrero et al. |
| D671,363 | S | 11/2012 | Parel et al. |
| D671,364 | S | 11/2012 | Parel et al. |
| 8,857,652 | B2 | 10/2014 | Lewis et al. |
| 8,899,145 | B2 * | 12/2014 | Harrison ............. A47J 45/10 99/422 |
| 9,554,671 | B2 | 1/2017 | Poon |
| 9,681,775 | B2 | 6/2017 | Contarino, Jr. |
| D809,340 | S | 2/2018 | Poon |
| D880,216 | S | 4/2020 | Lah et al. |
| 10,612,788 | B2 | 4/2020 | Lah et al. |
| 2009/0078246 | A1 | 3/2009 | Leavens et al. |
| 2012/0192724 | A1 | 8/2012 | Harrison et al. |
| 2014/0208961 | A1 | 7/2014 | Poon |
| 2014/0208962 | A1 | 7/2014 | Poon |
| 2017/0273505 | A1 * | 9/2017 | MacDonald .......... A47J 37/067 |
| 2020/0217511 | A1 | 7/2020 | Lah et al. |
| 2020/0260911 | A1 | 8/2020 | Brennan |

FOREIGN PATENT DOCUMENTS

| | | |
|---|---|---|
| CN | 203539133 U | 4/2014 |
| CN | 103222809 | 11/2015 |
| CN | 208709569 | 4/2019 |
| CN | 211795989 U | 10/2020 |
| KR | 20160085119 | 7/2016 |
| TW | 253165 | 8/1995 |

OTHER PUBLICATIONS

Canadian Patent Office, "Examiner Requisition," issued in connection with CA Patent Application No. 3,181,452, mailed on May 6, 2024, 6 pages.
Taiwan Intellectual Property Office, "Office Action and Search Report," issued in connection with Taiwan Patent Application No. 110139512, dated Mar. 9, 2023, 26 pages.
Taiwan Patent Office, "Patent Examination Rejection Letter," issued in connection with Taiwan Patent Application No. 110139512, dated Jun. 19, 2023, 3 pages. (non-certified machine translation provided).
International Searching Authority, "International Preliminary Report on Patentability," issued in connection with International Patent Application No. PCT/US2021/054537, mailed on Jun. 15, 2023, 6 pages.
European Patent Office, "Communication pursuant to Rules 161(2) and 162 EPC," issued in connection with European Patent Application No. 21901226.7, dated Jul. 11, 2023, 3 pages.
Australian Government, IP Australia, "Examination Report No. 2," issued in connection with Australian Patent Application No. 2021393362, dated Aug. 7, 2024, 3 pages.
Australian Government, IP Australia, "Notice of Acceptance," issued in connection with Australian Patent Application No. 2021393362, dated Sep. 2, 2024, 3 pages.
International Searching Authority, "International Search Report and Written Opinion," issued in connection with International Patent Application No. PCT/US2021/054537, mailed Jan. 11, 2022, 9 pages.
European Patent Office, "Extended European Search Report," issued in connection with European Patent Application No. 21901226.7, dated Oct. 11, 2024, 7 pages.
China National Intellectual Property Administration, "Office Action," issued in connection with Chinese Patent Application No. 202180044220.2, dated Jan. 17, 2025, 28 pages (including machine-generated translation).
China National Intellectual Property Administration, "Office Action," issued in connection with Chinese Patent Application No. 202180044220.2, dated Apr. 3, 2025, 6 pages (including machine-generated translation).

* cited by examiner

SECTION A-A

SECTION B-B

SECTION C-C

SECTION D-D

FIG. 19 SECTION E-E

FIG. 29 SECTION F-F

SECTION G-G

SECTION H-H

SECTION J-J

SECTION K-K

INSET FRAMES FOR SUPPORTING COOKING ACCESSORIES IN COOKBOXES OF GRILLS

RELATED APPLICATIONS

This application claims priority to U.S. Provisional Patent Application No. 63/213,508, filed Jun. 22, 2021, and to U.S. Provisional Patent Application No. 63/120,539, filed Dec. 2, 2020. The entireties of U.S. Provisional Patent Application No. 63/213,508 and U.S. Provisional Patent Application No. 63/120,539 are hereby incorporated by reference herein.

FIELD OF THE DISCLOSURE

This disclosure relates generally to inset frames and, more specifically, to inset frames for supporting cooking accessories in cookboxes of grills.

BACKGROUND

Cookboxes of grills (e.g., gas grills, charcoal grills, pellet grills, electric grills, etc.) are conventionally equipped with one or more cooking grate(s) that define a cooking surface. The cooking surface defined by the cooking grate(s) typically fills, covers, and/or occupies the substantial entirety of an upper opening of the cookbox. In order to utilize a cooking accessory (e.g., a sear grate, a grilling basket, a wok, etc.) in conjunction with such a grill, the user must typically place and/or position the cooking accessory directly on (e.g., in direct contact with) the cooking grate(s). Placing the cooking accessory directly on the cooking grate(s) disadvantageously results in cooking residue (e.g., from past food items cooked on the cooking grate(s)) being transferred to the cooking accessory, and can also disadvantageously result in inefficient cooking of any food item(s) located on and/or within the cooking accessory.

A known modular cooking grate system includes one or more peripheral cooking grate(s) that define a central, circular opening which can be selectively occupied by a central, circular cooking grate. When the central, circular cooking grate is removed from the central, circular opening of the modular cooking grate system, a cooking accessory can be placed across and/or docked within the central, circular opening. While this known modular cooking grate system offers notable improvements with regard to the above-identified shortcomings of conventional cooking grate systems, the known modular cooking grate system remains somewhat limited in terms of its ability to interchangeably accommodate cooking accessories of different shapes and/or sizes.

Figure 1:
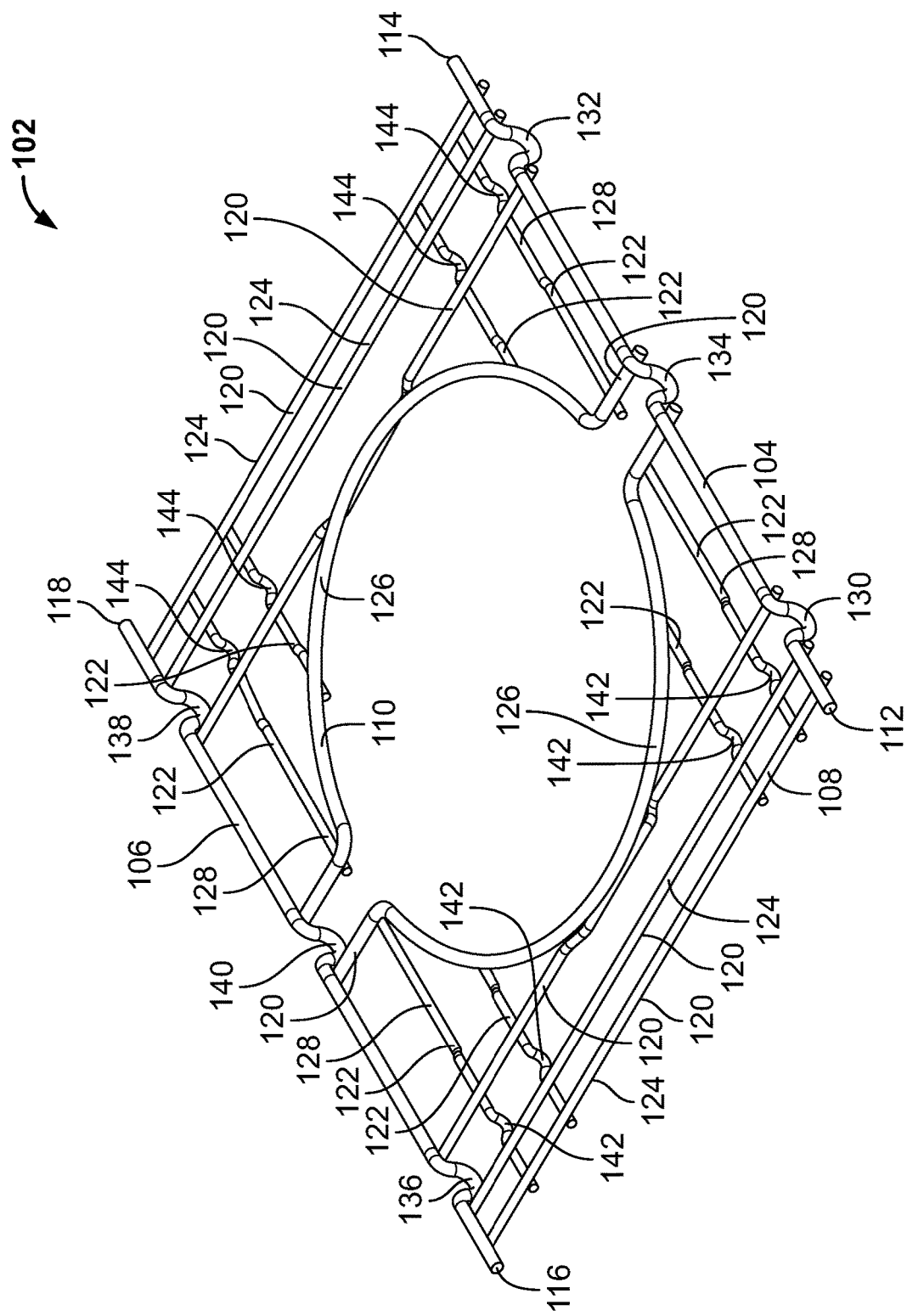
FIG. 1 is a perspective view of an example inset frame constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third."

In such instances, it should be understood that such descriptors are used merely for ease of referencing multiple elements or components.

DETAILED DESCRIPTION

Example inset frames disclosed herein are advantageously configured to interchangeably support cooking accessories of various shapes and sizes within a cookbox of a grill. For example, inset frames disclosed herein are advantageously configured to interchangeably support various large-format rectangular cooking accessories (e.g., a rectangular sear grate, a rectangular cooking stone, a rectangular griddle, a rectangular grilling basket, a rectangular cooking grate, etc.) dimensioned to fill, cover, and/or occupy a substantial portion and/or section (e.g., a majority) of an upper opening of the cookbox of the grill, and to further interchangeably support various rounded (e.g., circular) cooking accessories (e.g., a circular Dutch oven, a circular wok, a circular pot, a circular grilling basket, etc.) dimensioned to have a comparatively smaller form factor and/or footprint relative to such large-format rectangular cooking accessories. Inset frames disclosed herein accordingly provide enhanced flexibility with regard to the range of cooking accessories and/or the range of cooking operations that can be accommodated and/or performed within cookboxes of grills.

The above-identified features as well as other advantageous features of example inset frames disclosed herein are further described below in connection with the figures of the application. As used herein, the term "cooking accessory" means any surface, vessel, or instrument that is intended to support and/or receive one or more food item(s) in conjunction with such food item(s) being cooked. Example cooking accessories include, but are not limited to, grates (e.g., grilling grates, searing grates, etc.), stones (e.g., pizza stones, baking stones, etc.), griddles, baskets, Dutch ovens, woks, pots, pans, trays, etc. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
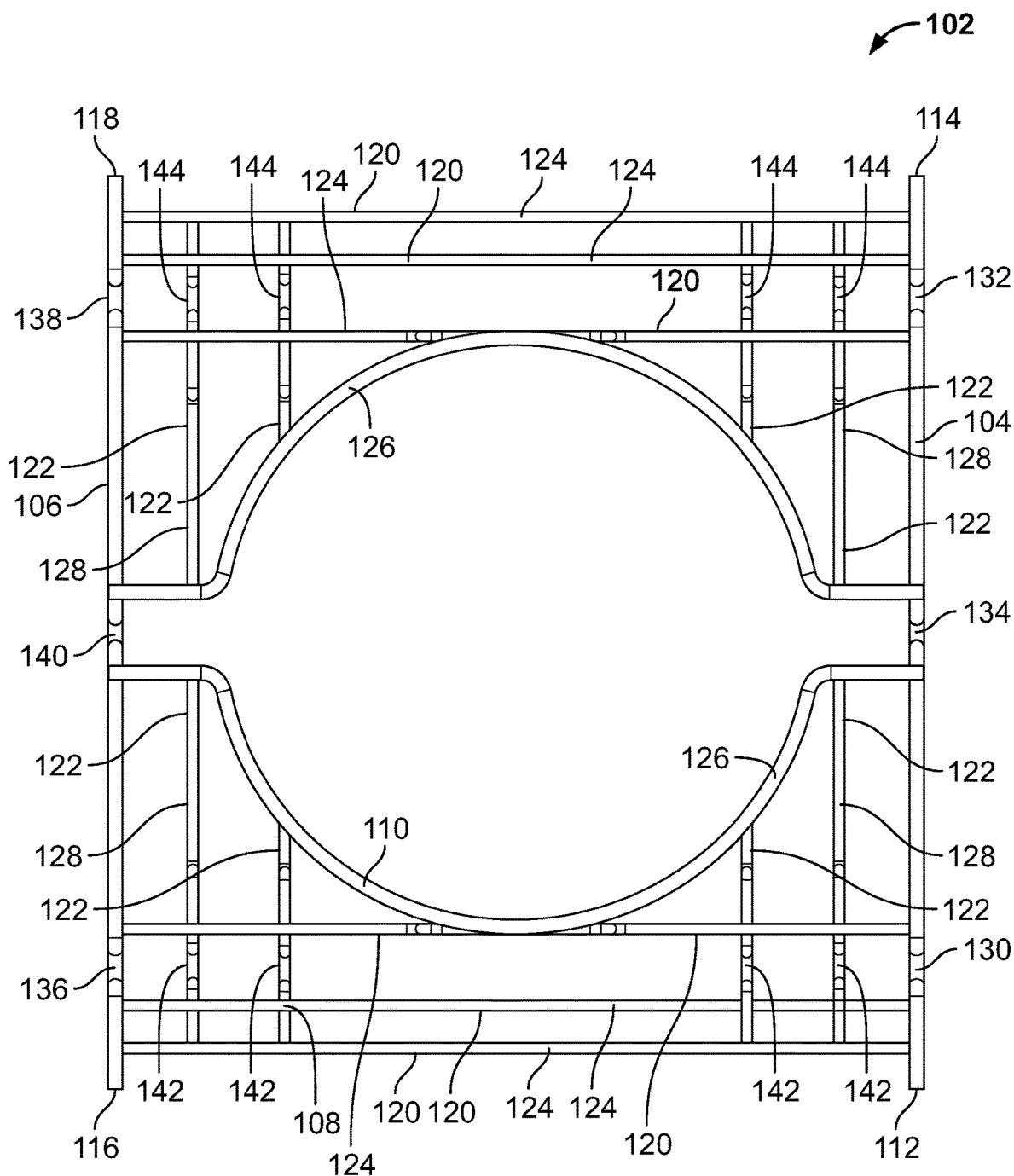
FIG. 2 is a top view of the inset frame of FIG. 1.
Figure 3:
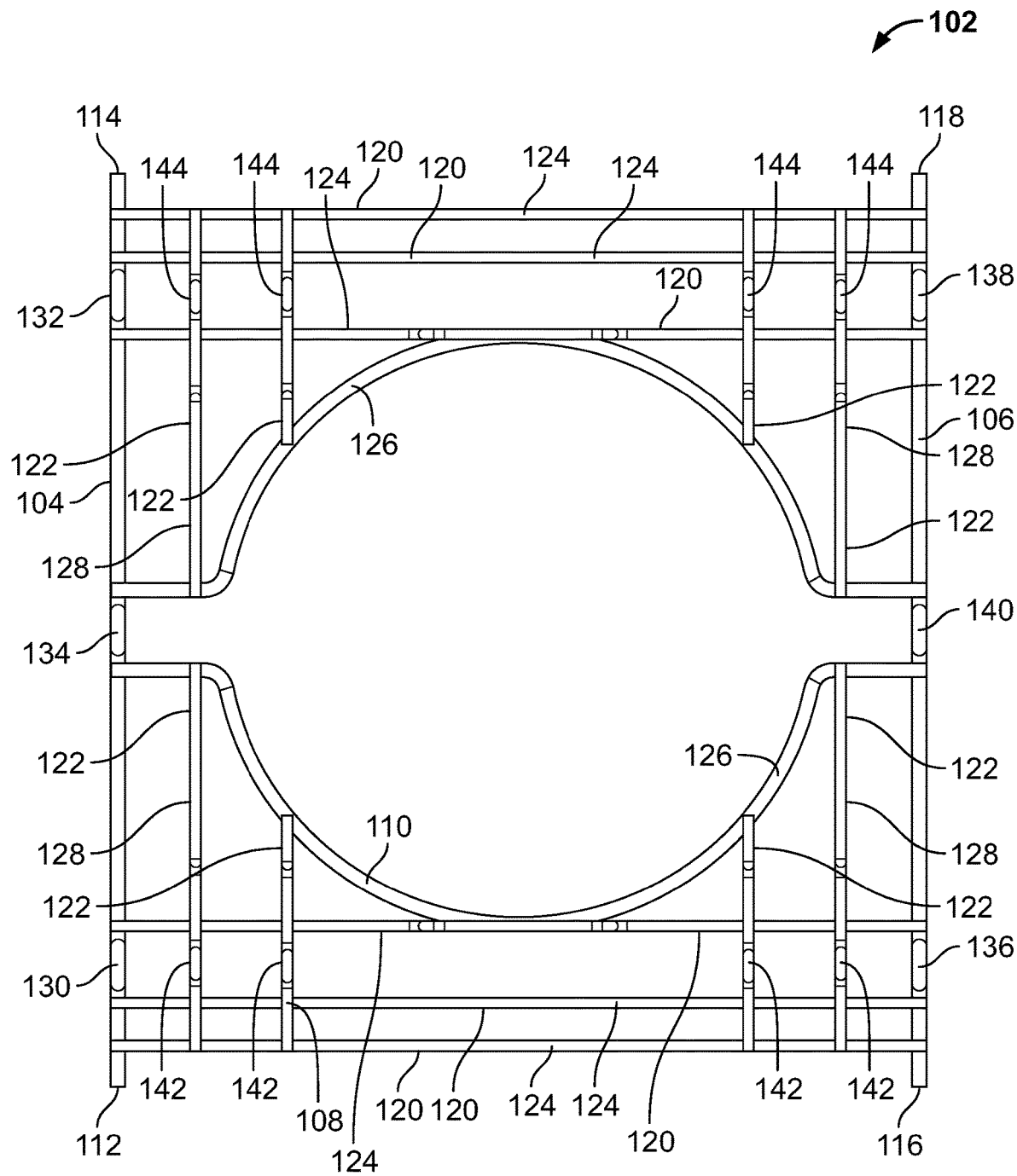
FIG. 3 is a bottom view of the inset frame of FIGS. 1 and 2.

FIG. 1 is a perspective view of an example inset frame 102 constructed in accordance with teachings of this disclosure. FIG. 2 is a top view of the inset frame 102 of FIG. 1. FIG. 3 is a bottom view of the inset frame 102 of FIGS. 1 and 2. In the illustrated example of FIGS. 1-3, the inset frame 102 includes an example first (e.g., right) support rod 104, an example second (e.g., left) support rod 106 spaced apart from the first support rod 104, an example support lattice 108 extending between (e.g., spanning) and coupled to the first support rod 104 and the second support rod 106, and an example central opening 110 located within the support lattice 108 between the first support rod 104 and the second support rod 106.

The first support rod 104 of FIGS. 1-3 includes an example first end 112 and an example second end 114 located opposite the first end 112. Similarly, the second support rod 106 of FIGS. 1-3 includes an example first end 116 and an example second end 118 located opposite the first end 116. The first end 112 of the first support rod 104 and the first end 116 of the second support rod 106 collectively define a front end of the inset frame 102. Conversely, the second end 114 of the first support rod 104 and the second end 118 of the second support rod 106 collectively define a rear end of the inset frame 102 located opposite the front end of the inset frame 102.

The first support rod 104 of the inset frame 102 has a length ($L_1$) defined by the first end 112 and the second end 114 of the first support rod 104. Similarly, the second support rod 106 of the inset frame 102 has a length ($L_2$) defined by the first end 116 and the second end 118 of the second support rod 106. In the illustrated example of FIGS. 1-3, the respective lengths ($L_1$, $L_2$) of the first support rod 104 and the second support rod 106 are substantially equal. In other examples, the respective lengths ($L_1$, $L_2$) of the first support rod 104 and the second support rod 106 can differ from one another. In the illustrated example of FIGS. 1-3, the respective lengths ($L_1$, $L_2$) of the first support rod 104 and the second support rod 106 collectively define an overall length (L) of the inset frame 102.

The first support rod 104 and the second support rod 106 of the inset frame 102 are respectively configured to fully extend between (e.g., span) a front structure (e.g., a front rack, a front rail, a front ledge, and/or a front wall) of a cookbox of a grill and a rear structure (e.g., a rear rack, a rear rail, a rear ledge, and/or a rear wall) of the cookbox of the grill. In this regard, the first support rod 104 and the second support rod 106 of the inset frame 102 are respectively configured such that the first end 112 of the first support rod 104 and the first end 116 of the second support rod 106 are positionable on the front structure of the cookbox of the grill, and such that the second end 114 of the first support rod 104 and the second end 118 of the second support rod 106 are positionable on the rear structure of the cookbox of the grill, as further described below. In other examples, the first support rod 104 and/or the second support rod 106 of the inset frame 102 may not fully extend between the front structure and the rear structure of the cookbox of the grill.

As discussed above, the first support rod 104 and the second support rod 106 of the inset frame 102 are spaced apart from one another. In the illustrated example of FIGS. 1-3, the spacing that exists between the first support rod 104 and the second support rod 106 of the inset frame 102 is generally defined by a width (W) of the support lattice 108 of the inset frame 102, with the support lattice 108 being laterally bounded by the first support rod 104 and the second support rod 106. In other examples, one or more aspect(s) of the support lattice 108 can extend laterally beyond the first support rod 104 and/or the second support rod 106 of the inset frame.

In the illustrated example of FIGS. 1-3, the first support rod 104 and the second support rod 106 of the inset frame 102 are substantially parallel to one another. The inset frame 102 of FIGS. 1-3 accordingly has a generally rectangular profile defined by the first support rod 104, the second support rod 106, and/or the support lattice 108. The rectangular profile of the inset frame 102 is configured to support a cooking accessory (e.g., a sear grate, a cooking stone, a griddle, a grilling basket, a cooking grate, etc.) including a base and/or bottom having a similarly configured rectangular profile. In other examples, the second support rod 106 of the inset frame 102 can be oriented at an angle relative to the first support rod 104 of the inset frame 102. In such other examples, the inset frame 102 can have a non-rectangular profile, such as a triangular profile, a trapezoidal profile, a hexagonal profile, etc. In such other examples, the non-rectangular profile of the inset frame 102 can be configured to support a cooking accessory (e.g., a sear grate, a cooking stone, a griddle, a grilling basket, a cooking grate, etc.) including a base and/or bottom having a similarly configured non-rectangular profile.

As discussed above, the support lattice 108 of the inset frame 102 extends between (e.g., spans) and is coupled to the first support rod 104 and the second support rod 106 of the inset frame 102. In the illustrated example of FIGS. 1-3, the first support rod 104 and the second support rod 106 of the inset frame 102 are respectively located and/or positioned on top of and/or above the support lattice 108. In such a configuration, the first support rod 104 and the second support rod 106 of the inset frame 102 respectively provide lateral boundaries and/or mechanical stops that restrict and/or prevent lateral movement and/or sliding of a similarly sized cooking accessory positioned on the support lattice 108 of the inset frame 102. In other examples, the first support rod 104 and/or the second support rod 106 of the inset frame 102 can instead be located and/or positioned in the same plane as, and/or below the support lattice 108 of the inset frame 102.

The support lattice 108 of FIGS. 1-3 includes example first crosswise rods 120, some of which extend fully between (e.g., span) the first support rod 104 and the second support rod 106 of the inset frame 102. The support lattice 108 of FIGS. 1-3 further includes example second crosswise rods 122, some of which extend fully between (e.g., span) two or more of the first crosswise rods 120. The first crosswise rods 120 and/or the second crosswise rods 122 of the support lattice 108 can be of any shape and/or size, and can form any pattern, layout, framework, and/or configuration. The first crosswise rods 120 and/or the second crosswise rods 122 of the support lattice 108 provide and/or define a substantially flat, planar support surface of the inset frame 102, with the support surface being configured to support a cooking accessory (e.g., a sear grate, a cooking stone, a griddle, a grilling basket, a cooking grate, etc.) including a base having a substantially flat and/or planar bottom surface, as further described below.

In the illustrated example of FIGS. 1-3, the first crosswise rods 120 of the support lattice 108 include example linear rods 124 and example curved rods 126, and the second crosswise rods 122 of the support lattice 108 include example linear rods 128. In other examples, the first crosswise rods 120 of the support lattice 108 can instead include only linear rods (e.g., to the exclusion of curved rods), or can instead include only curved rods (e.g., to the exclusion of linear rods). In still other examples, the second crosswise rods 122 of the support lattice 108 can instead include a mix of linear rods and curved rods, or can instead include only curved rods (e.g., to the exclusion of linear rods). In the illustrated example of FIGS. 1-3, the central opening 110 of the inset frame 102 is defined and/or formed by two of the curved rods 126 of the first crosswise rods 120 of the support lattice 108. In other examples, the central opening 110 of the inset frame 102 can instead be formed by a different number (e.g., 1, 3, 4, etc.) of curved rods 126 of the first crosswise rods 120 of the support lattice 108. In still other examples, the central opening 110 of the inset frame 102 can instead be formed by a number (e.g., 1, 2, 3, 4, etc.) of curved rods that may be included among the second crosswise rods 122 of the support lattice 108.

The central opening 110 of the inset frame 102 of FIGS. 1-3 has a generally circular profile defined by the curved rods 126 of the first crosswise rods 120 of the support lattice 108. The circular profile of the central opening 110 is configured to receive, support, and/or dock a circular cooking accessory (e.g., a Dutch oven, a wok, a pot, a grilling basket, etc.) including a base and/or bottom having a similarly configured rounded and/or circular profile. In other examples, the central opening 110 of the inset frame 102 can have a non-circular profile, such as an elliptical profile, a triangular profile, a rectangular profile, a trapezoidal profile, a hexagonal profile, etc. In such other examples, the non-circular profile of the central opening 110 can be configured to support a cooking accessory including a base and/or bottom having a similarly configured non-circular profile.

In the illustrated example of FIGS. 1-3, the first support rod 104, the second support rod 106, the first crosswise rods 120 (e.g., including the linear rods 124 and the curved rods 126), and the second crosswise rods 122 (e.g., including the linear rods 128) respectively have a circular cross-sectional profile. In other examples, the first support rod 104, the second support rod 106, one or more of the first crosswise rods 120 (e.g., including the linear rods 124 and the curved rods 126), and/or one or more of the second crosswise rods 122 (e.g., including the linear rods 128) can instead have a non-circular cross-sectional profile. For example, the first support rod 104, the second support rod 106, one or more of the first crosswise rods 120 (e.g., including the linear rods 124 and the curved rods 126), and/or one or more of the second crosswise rods 122 (e.g., including the linear rods 128) can instead have an elliptical cross-sectional profile a triangular cross-sectional profile, a rectangular cross-sectional profile, a hexagonal cross-sectional profile, etc.

In some examples, the first support rod 104 and/or the second support rod 106 of the inset frame 102 may respectively include one or more recess(es) located along the length ($L_1$) of the first support rod 104 and/or along the length ($L_2$) of the second support rod 106. For example, as shown in FIGS. 1-3, the first support rod 104 of the inset frame 102 includes an example first recess 130 located proximate the first end 112 of the first support rod 104, an example second recess 132 located proximate the second end 114 of the first support rod 104, and an example third recess 134 located approximately midway between the first end 112 and the second end 114 of the first support rod 104. Similarly, the second support rod 106 of the inset frame 102 includes an example first recess 136 located proximate the first end 116 of the second support rod 106, an example second recess 138 located proximate the second end 118 of the second support rod 106, and an example third recess 140 located approximately midway between the first end 116 and the second end 118 of the second support rod 106. In other examples, the first support rod 104 and/or the second support rod 106 can instead include a different number (e.g., 0, 1, 2, 4, etc.) of recesses relative to the number of recesses shown in FIGS. 1-3.

In the illustrated example of FIGS. 1-3, each recess (e.g., recess 130, recess 132, recess 134, recess 136, recess 138, and recess 140) formed in the first support rod 104 and/or the second support rod 106 is configured to receive a spacer tab of a first cooking accessory (e.g., a first cooking grate) when the first cooking accessory is positioned on or adjacent to the inset frame 102 of FIGS. 1-3, as further described below. Locating a spacer tab of the first cooking accessory within one of the recesses of the first support rod 104 of the inset frame 102 or within one of the recesses of the second support rod 106 of the inset frame 102 advantageously assists in properly positioning the first cooking accessory relative to the inset frame 102 (or vice-versa), or relative to a second cooking accessory (e.g., a second cooking grate) to be positioned adjacent the first cooking accessory.

In some examples, respective ones of the second crosswise rods 122 of the inset frame 102 may respectively include one or more recess(es) located along the respective lengths of the second crosswise rods 122. For example, as shown in FIGS. 1-3, the second crosswise rods 122 of the inset frame 102 include example first recesses 142 respectively located proximate the first end 112 of the first support rod 104 and/or proximate the first end 116 of the second support rod 106, and example second recesses 144 located proximate the second end 114 of the first support rod 104 and/or proximate the second end 118 of the second support rod 106. In other examples, respective ones of the second crosswise rods 122 can instead include a different number of first recesses 142 and/or a different number of second recesses 144 relative to the number of first recesses 142 and/or second recesses 144 shown in FIGS. 1-3.

In the illustrated example of FIGS. 1-3, each first recess 142 formed in the second crosswise rods 122 is configured to receive a support flange of a filler grate (e.g., the filler grate 1702 of FIGS. 17-22) when the filler grate is positioned on the inset frame 102 proximate the first end 112 of the first support rod 104 and/or proximate the first end 116 of the second support rod 106. Conversely, each second recess 144 formed in the second crosswise rods 122 is configured to receive a support flange of the filler grate when the filler grate is positioned on the inset frame 102 proximate the second end 114 of the first support rod 104 and/or proximate the second end 118 of the second support rod 106. Locating a support flange of the filler grate within one of the first recesses 142 or within one of the second recesses 144 of the second crosswise rods 122 of the inset frame 102 advantageously assists in properly positioning and/or stabilizing the filler grate relative to the inset frame 102, or relative to a cooking accessory (e.g., a sear grate, a cooking stone, a griddle, a grilling basket, etc.) to be positioned on the inset frame 102 adjacent the filler grate.

Figure 4:
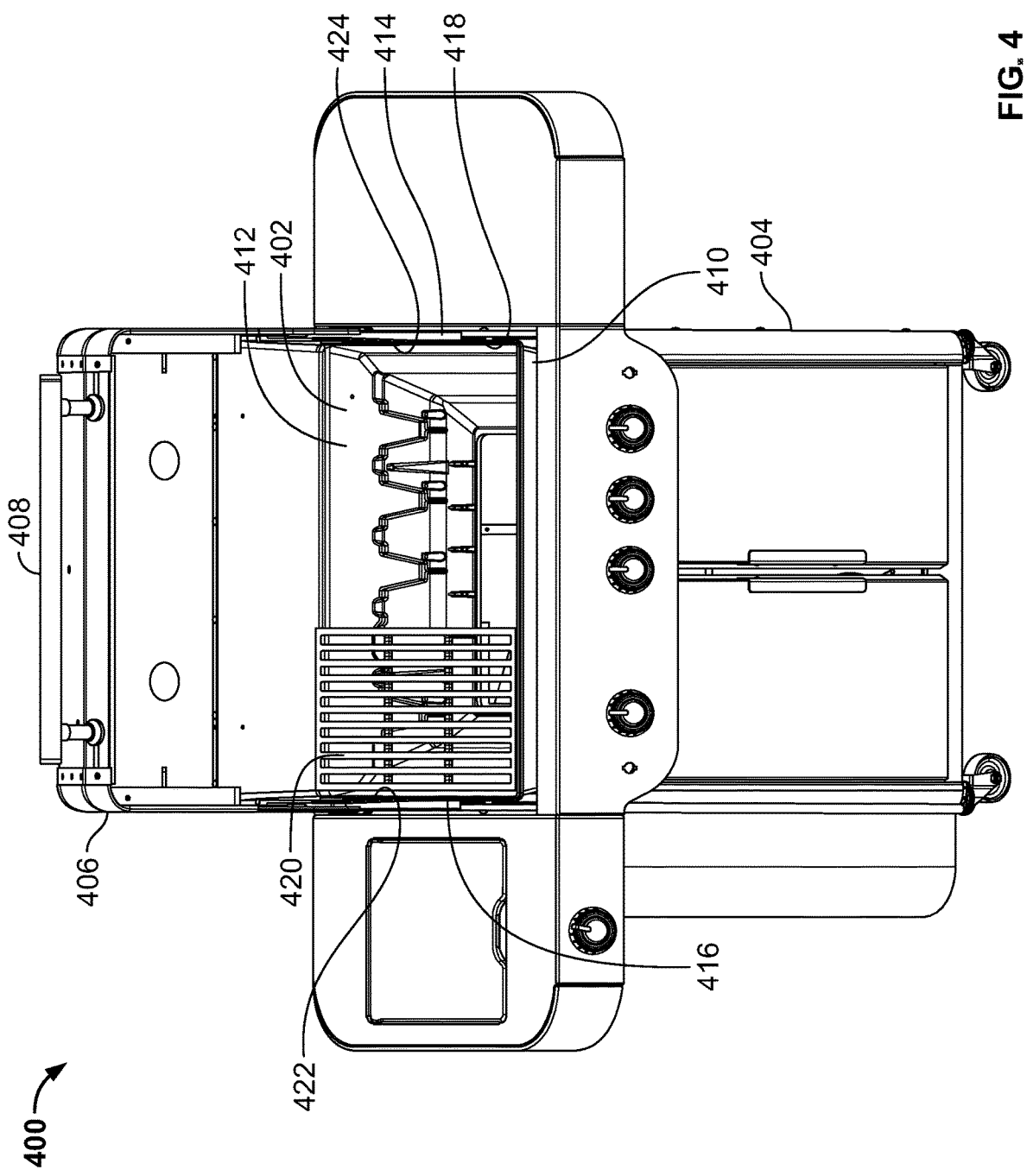
FIG. 4 is a perspective view of an example grill having an example cookbox configured to receive the inset frame of FIGS. 1-3.
Figure 5:
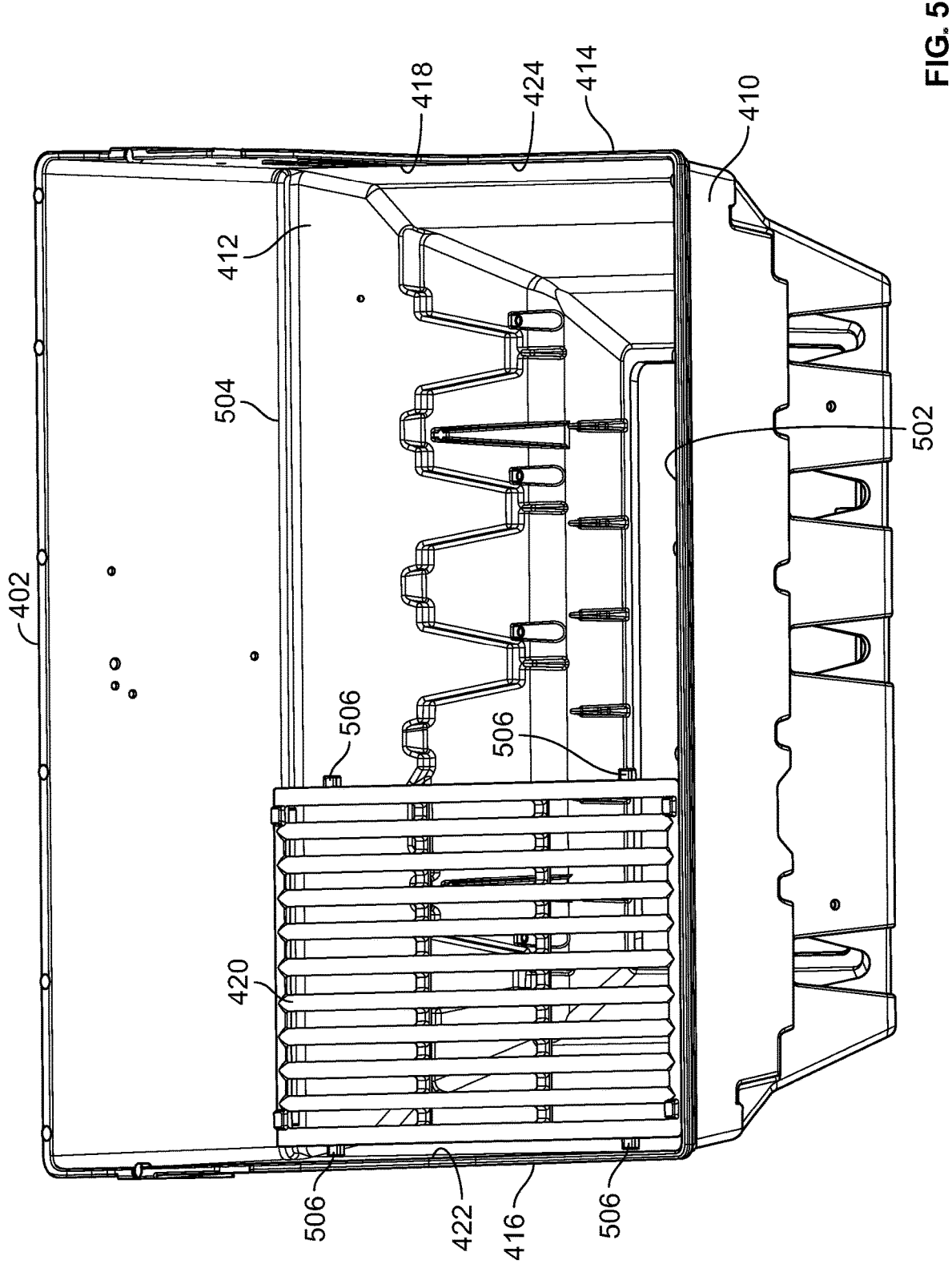
FIG. 5 is a perspective view of the cookbox of FIG. 4.
Figure 6:
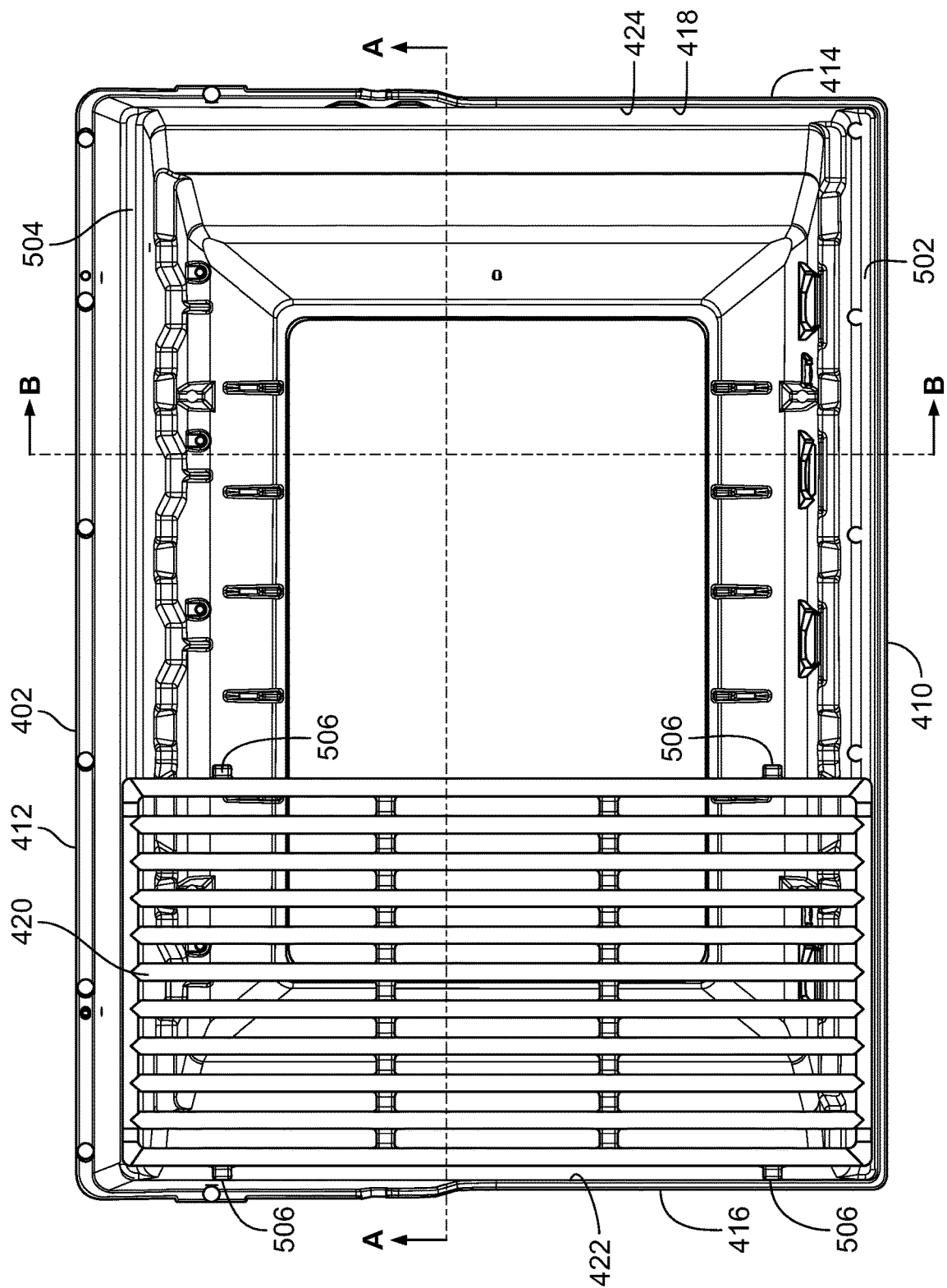
FIG. 6 is a top view of the cookbox of FIGS. 4 and 5.
Figure 7:
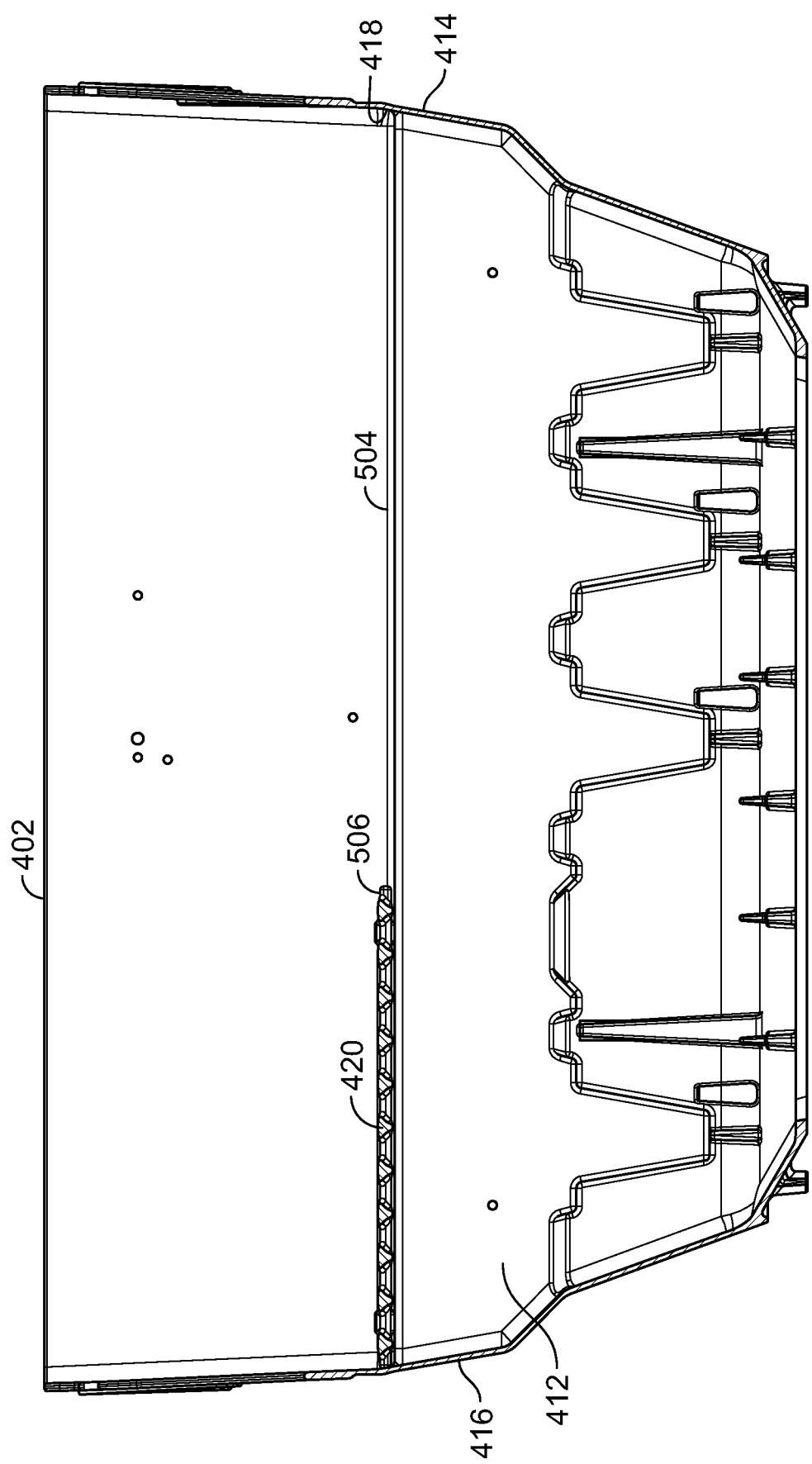
FIG. 7 is a cross-sectional view of the cookbox of FIGS. 4-6 taken along section A-A of FIG. 6.
Figure 8:
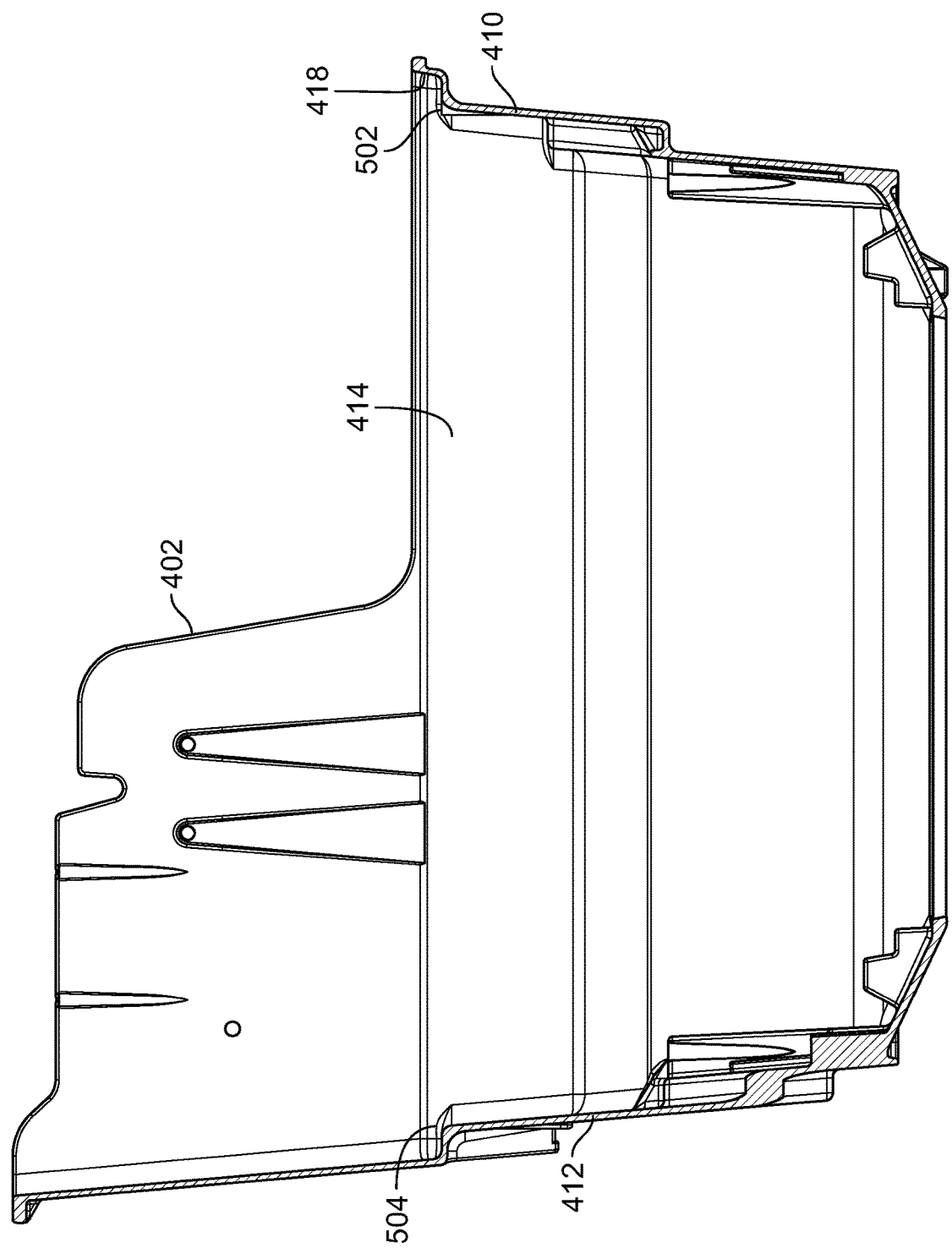
FIG. 8 is a cross-sectional view of the cookbox of FIGS. 4-7 taken along section B-B of FIG. 6.

FIG. 4 is a perspective view of an example grill 400 having an example cookbox 402 configured to receive the inset frame 102 of FIGS. 1-3. FIG. 5 is a perspective view of the cookbox 402 of FIG. 4. FIG. 6 is a top view of the cookbox 402 of FIGS. 4 and 5. FIG. 7 is a cross-sectional view of the cookbox 402 of FIGS. 4-6 taken along section A-A of FIG. 6. FIG. 8 is a cross-sectional view of the cookbox 402 of FIGS. 4-7 taken along section B-B of FIG. 6.

In the illustrated example of FIGS. 4-8, the grill includes the cookbox 402, an example base 404, and an example lid 406. The cookbox 402 of the grill 400 is coupled to, positioned on, and/or supported by the base 404 of the grill 400. The base 404 can be structured as a cart, a storage compartment, a frame, and/or any number of legs that may be suitable to support the cookbox 402. The lid 406 of the grill 400 is movably coupled (e.g., via one or more hinge(s) or pin(s)) to the cookbox 402 of the grill 400 in a manner that enables the lid 406 to be moved (e.g., pivoted and/or rotated) relative to the cookbox 402 between a closed position and an open position (e.g., as shown in FIG. 4). The cookbox 402 and the lid 406 collectively define a cooking chamber of the grill 400 when the lid 406 is in the closed position. Placement of the lid 406 in the open position (e.g., as shown in FIG. 4) enables a user to access the cookbox 402 and/or the cooking chamber, as may be required to load, unload, and/or otherwise access a food item, a cooking accessory, and/or an inset frame located thereon or therein. Movement of the lid 406 between the closed position and the open position can be performed by a user of the grill 400 via an example handle 408 coupled to the lid 406.

The cookbox 402 of the grill 400 can house, carry, and/or otherwise include a heat-generating and/or heat-emitting structure positioned within the cookbox 402. For example, in instances where the grill 400 is a gas grill, the cookbox 402 of the grill 400 can house, carry, and/or otherwise include one or more burner tube(s) configured to generate and/or emit a heat-producing gas flame. As another example, in instances where the grill 400 is a solid-fuel grill (e.g., a charcoal grill, a pellet grill, etc.), the cookbox 402 of the grill 400 can house, carry, and/or otherwise include a burn pot and/or a burn pit configured to generate and/or emit heat from charcoal and/or wood pellets being combusted thereon or therein.

In the illustrated example of FIGS. 4-8, the cookbox 402 includes an example front wall 410, an example rear wall 412 spaced apart from the front wall 410, an example right sidewall 414 extending between the front wall 410 and the rear wall 412, and an example left sidewall 416 spaced apart from the right sidewall 414 and extending between the front wall 410 and the rear wall 412. The front wall 410, rear wall 412, right sidewall 414, and left sidewall 416 collectively form and/or define an example opening 418 of the cookbox 402. In the illustrated example of FIGS. 4-8, the opening 418 of the cookbox 402 has a generally rectangular profile. In other examples, the opening 418 of the cookbox 402 can instead have a non-rectangular profile (e.g., a circular profile, a triangular profile, a hexagonal profile, etc.).

In the illustrated example of FIGS. 4-8, an example cooking grate 420 of the grill 400 is located and/or positioned within an example first section 422 (e.g., a leftmost section) of the opening 418 of the cookbox 402. An example second section 424 (e.g., a rightmost section) of the opening 418 of the cookbox 402 is unobstructed by the cooking grate 420, with the second section 424 being configured to receive and/or support the inset frame 102 of FIGS. 1-3 described above. In other examples, the above-described positional relationships between the cooking grate 420 of the grill 400 and the first section 422 and second section 424 of the opening 418 of the cookbox 402 can be reversed and/or otherwise modified. For example, the cooking grate 420 can instead be located and/or positioned within a rightmost section of the opening 418 of the cookbox 402, with the leftmost section of the opening 418 of the cookbox 402 being unobstructed by the cooking grate 420, and with the leftmost section of the opening 418 of the cookbox 402 being configured to receive and/or support the inset frame 102 of FIGS. 1-3 described above.

The cookbox 402 of FIGS. 4-8 includes an example front rack 502 formed by and/or coupled to the inner surface of the front wall 410 of the cookbox 402, and an example rear rack 504 formed by and/or coupled to the inner surface of the rear wall 412 of the cookbox 402. The front rack 502 extends along the inner surface of the front wall 410 of the cookbox 402, either partially or fully between the right sidewall 414 and the left sidewall 416 of the cookbox 402. The rear rack 504 extends along the inner surface of the rear wall 412 of the cookbox 402, either partially or fully between the right sidewall 414 and the left sidewall 416 of the cookbox 402. In the illustrated example of FIGS. 4-8, the cooking grate 420 of the grill 400 is located and/or positioned within the cookbox 402 such that a front portion of the bottom surface of the cooking grate 420 is positioned on and/or supported by the front rack 502 of the cookbox 402, and a rear portion of the bottom surface of the cooking grate 420 is positioned on and/or supported by the rear rack 504 of the cookbox 402.

Figure 9:
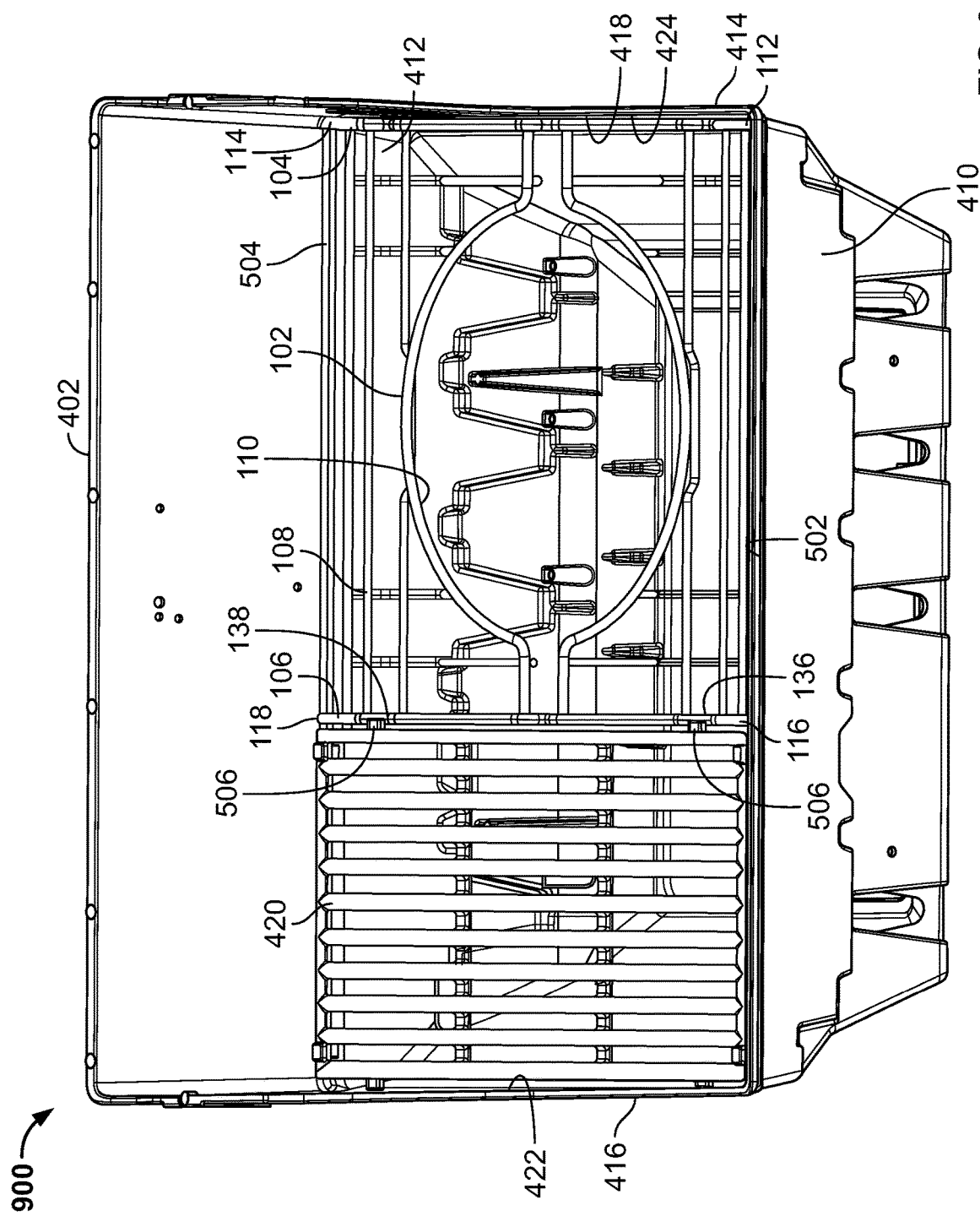
FIG. 9 is a perspective view of the cookbox of FIG. 4-8 configured in an example first cookbox configuration in which the inset frame of FIGS. 1-3 is positioned in the cookbox.
Figure 10:
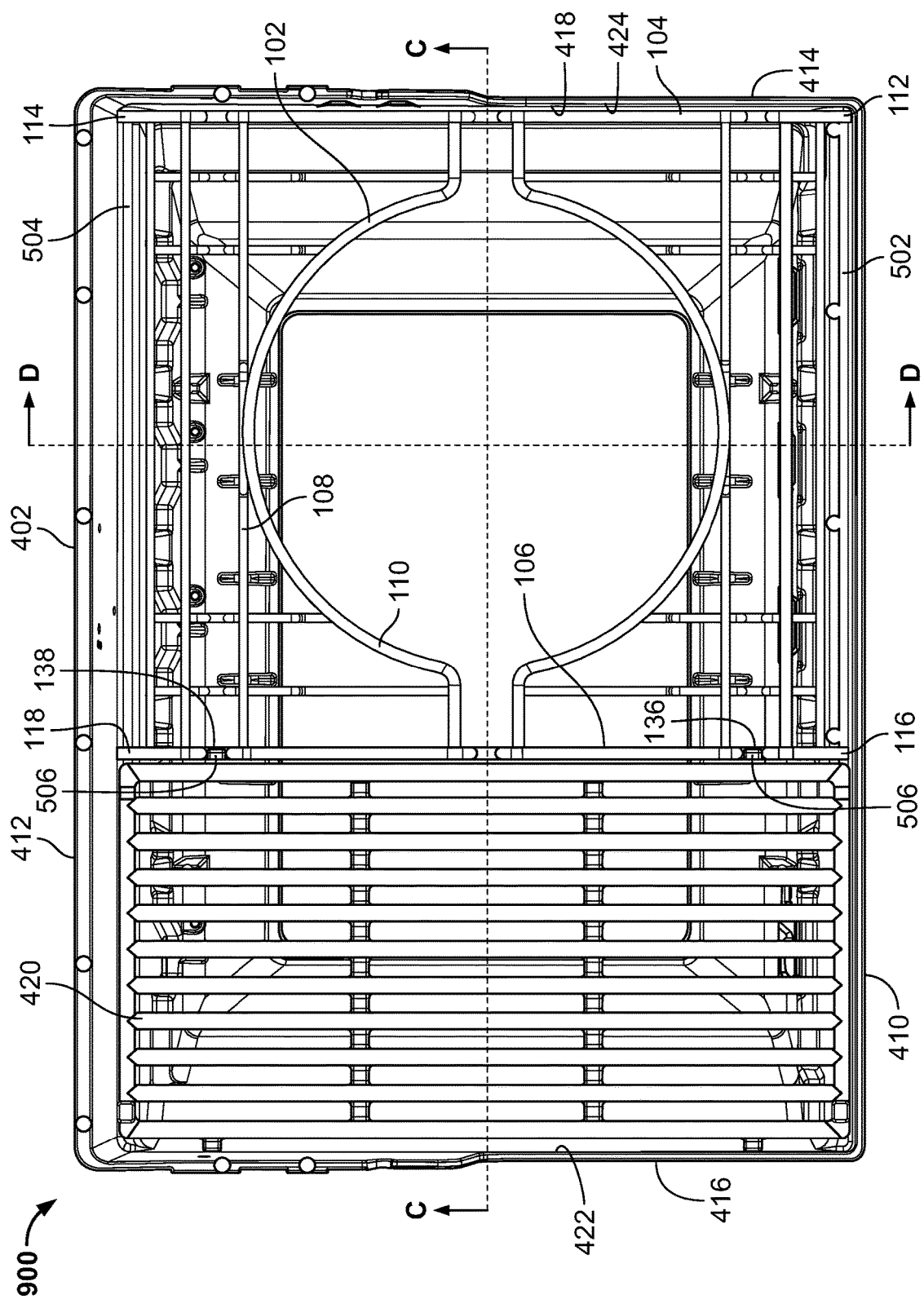
FIG. 10 is a top view of the first cookbox configuration of FIG. 9.
Figure 11:
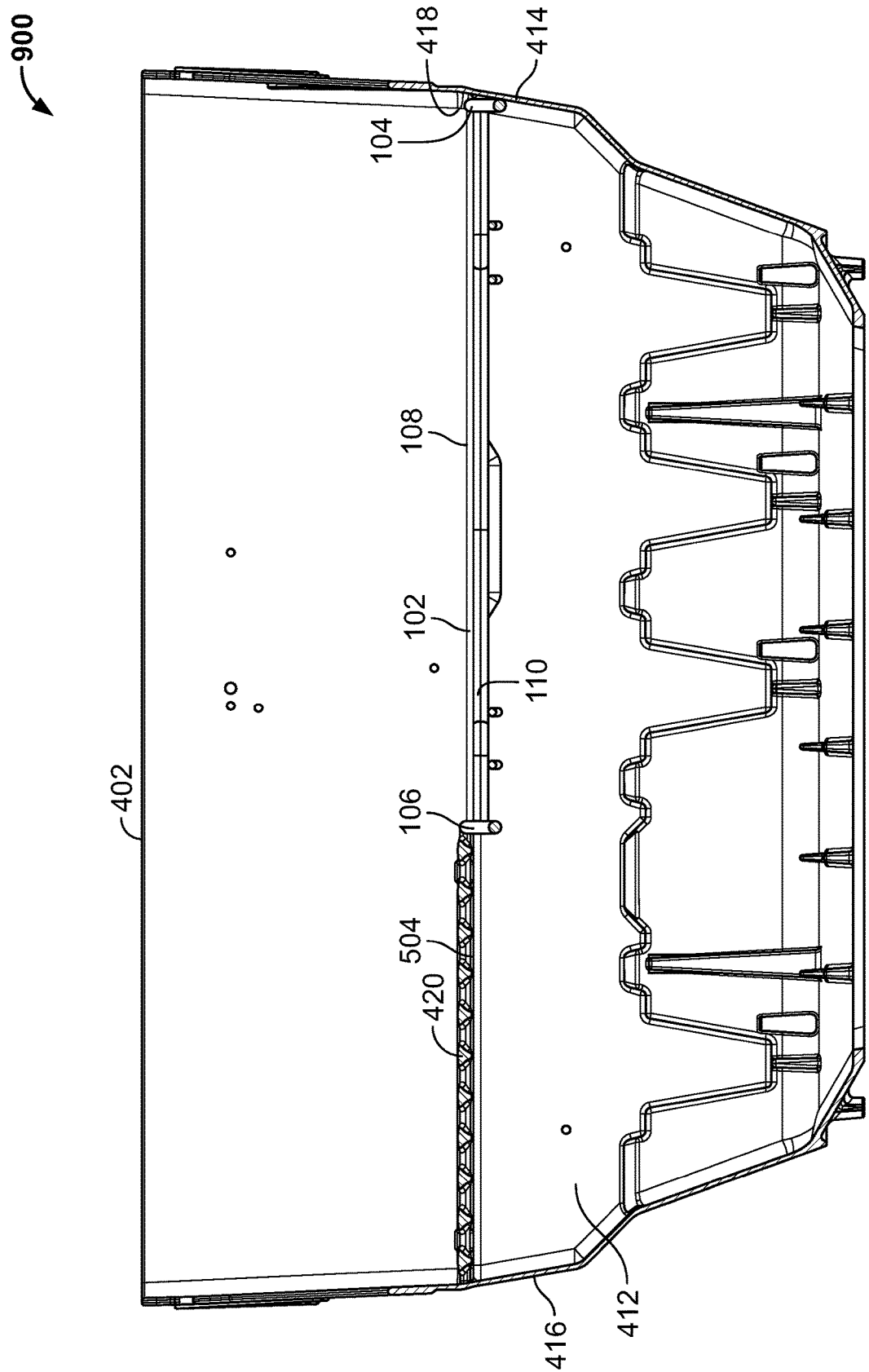
FIG. 11 is a cross-sectional view of the first cookbox configuration of FIGS. 9 and 10 taken along section C-C of FIG. 10.
Figure 12:
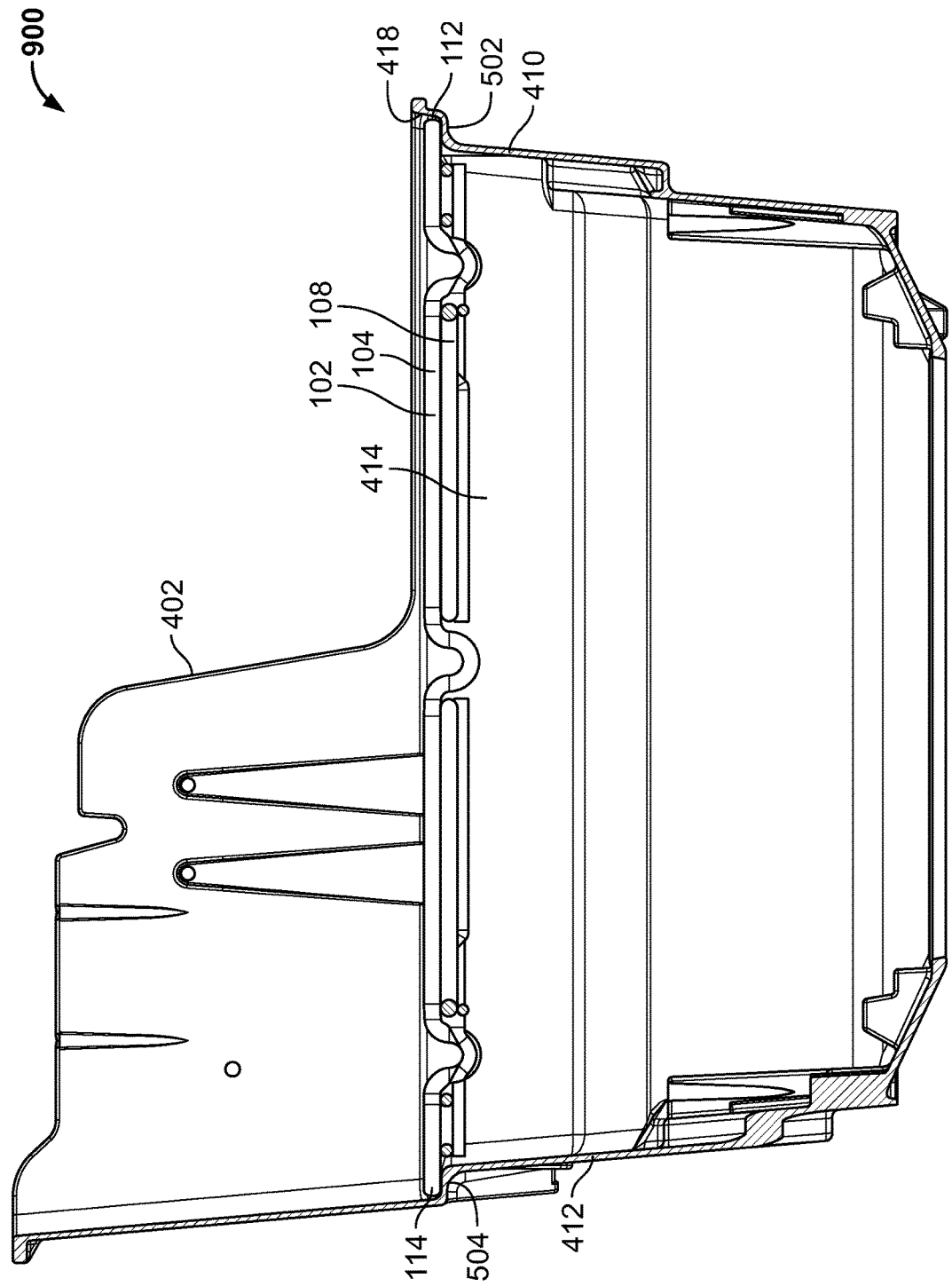
FIG. 12 is a cross-sectional view of the first cookbox configuration of FIGS. 9-11 taken along section D-D of FIG. 10.

FIG. 9 is a perspective view of the cookbox 402 of FIG. 4-8 configured in an example first cookbox configuration 900 in which the inset frame 102 of FIGS. 1-3 is positioned in the cookbox 402. FIG. 10 is a top view of the first cookbox configuration 900 of FIG. 9. FIG. 11 is a cross-sectional view of the first cookbox configuration 900 of FIGS. 9 and 10 taken along section C-C of FIG. 10. FIG. 12 is a cross-sectional view of the first cookbox configuration 900 of FIGS. 9-11 taken along section D-D of FIG. 10.

In the illustrated example of FIGS. 9-12, the inset frame 102 is located and/or positioned within the cookbox 402 of the grill 400 such that the bottom surface of the first end 112 of the first support rod 104 and the bottom surface of the first end 116 of the second support rod 106 are respectively positioned on and/or supported by the front rack 502 of the cookbox 402, and such that the bottom surface of the second end 114 of the first support rod 104 and the bottom surface of the second end 118 of the second support rod 106 are respectively positioned on and/or supported by the rear rack 504 of the cookbox 402. The inset frame 102 is accordingly located and/or positioned within the cookbox 402 in a side-by-side relationship relative to the cooking grate 420, with the cooking grate 420 being located and/or positioned within the first section 422 of the opening 418 of the cookbox 402, and with the inset frame 102 being located and/or positioned within the second section 424 of the opening 418 of the cookbox 402.

In the illustrated example of FIGS. 9-12, the inset frame 102 has a form factor and/or footprint (e.g., as defined by the length (L) and the width (W) of the inset frame) that substantially fills and/or occupies the form factor and/or footprint associated with the second section 424 of the opening 418 of the cookbox 402. In this regard, the inset frame 102 extends substantially completely between the front wall 410 and the rear wall 412 of the cookbox 402, and also extends substantially completely between the right sidewall 414 of the cookbox 402 and the rightmost edge of the cooking grate 420. Thus, as shown in FIGS. 9-12, the cooking grate 420 and the inset frame 102 collectively substantially completely fill and/or occupy the opening 418 of the cookbox 402.

In other examples, the inset frame 102 can instead have a form factor and/or footprint (e.g., as defined by the length (L) and the width (W) of the inset frame) that fills and/or occupies a lesser portion of the form factor and/or footprint associated with the second section 424 of the opening 418 of the cookbox 402. In this regard, the inset frame 102 can instead extend substantially completely between the front wall 410 and the rear wall 412 of the cookbox 402, but extend only partially between the right sidewall 414 of the cookbox 402 and the rightmost edge of the cooking grate 420 (e.g., leaving a gap between the rightmost edge of the cooking grate 420 and the leftmost edge of the inset frame 102, and/or leaving a gap between the rightmost edge of the inset frame 102 and the right sidewall 414 of the cookbox 402). In such other examples, the cooking grate 420 and the inset frame 102 collectively fill and/or occupy some, but less than all of the opening 418 of the cookbox 402.

As further shown in FIGS. 9-12, the right and left sides of the cooking grate 420 respectively include example spacer tabs 506 extending outwardly therefrom (e.g., away from the right side of the cooking grate 420, and away from the left side of the cooking grate 420). In the illustrated example of FIGS. 9-12, respective ones of the spacer tabs 506 existing along the right side of the cooking grate 420 are located within corresponding ones of the first recess 136 and the second recess 138 of the second support rod 106 of the inset frame 102. Locating such right-side spacer tabs 506 of the cooking grate 420 within the first recess 136 and the second recess 138 of the second support rod 106 of the inset frame 102 as shown in FIGS. 9-12 advantageously assists in properly positioning the cooking grate 420 relative to the inset frame 102 (or vice-versa), or relative to another cooking accessory (e.g., a second cooking grate) to be positioned on the inset frame 102 adjacent the cooking grate 420.

In other examples (e.g., when the inset frame 102 is located at a left-side position within the cookbox 402, as opposed to the right-side position shown in FIGS. 9-12), respective ones of the spacer tabs 506 existing along the left side of the cooking grate 420 will instead be located within corresponding ones of the first recess 130 and the second recess 132 of the first support rod 104 of the inset frame 102. In such examples, locating the left-side spacer tabs 506 of the cooking grate 420 within the first recess 130 and the second recess 132 of the first support rod 104 of the inset frame 102 advantageously assists in properly positioning the cooking grate 420 relative to the inset frame 102 (or vice-versa), or relative to another cooking accessory (e.g., a second cooking grate) to be positioned on the inset frame 102 adjacent the cooking grate 420.

Figure 13:
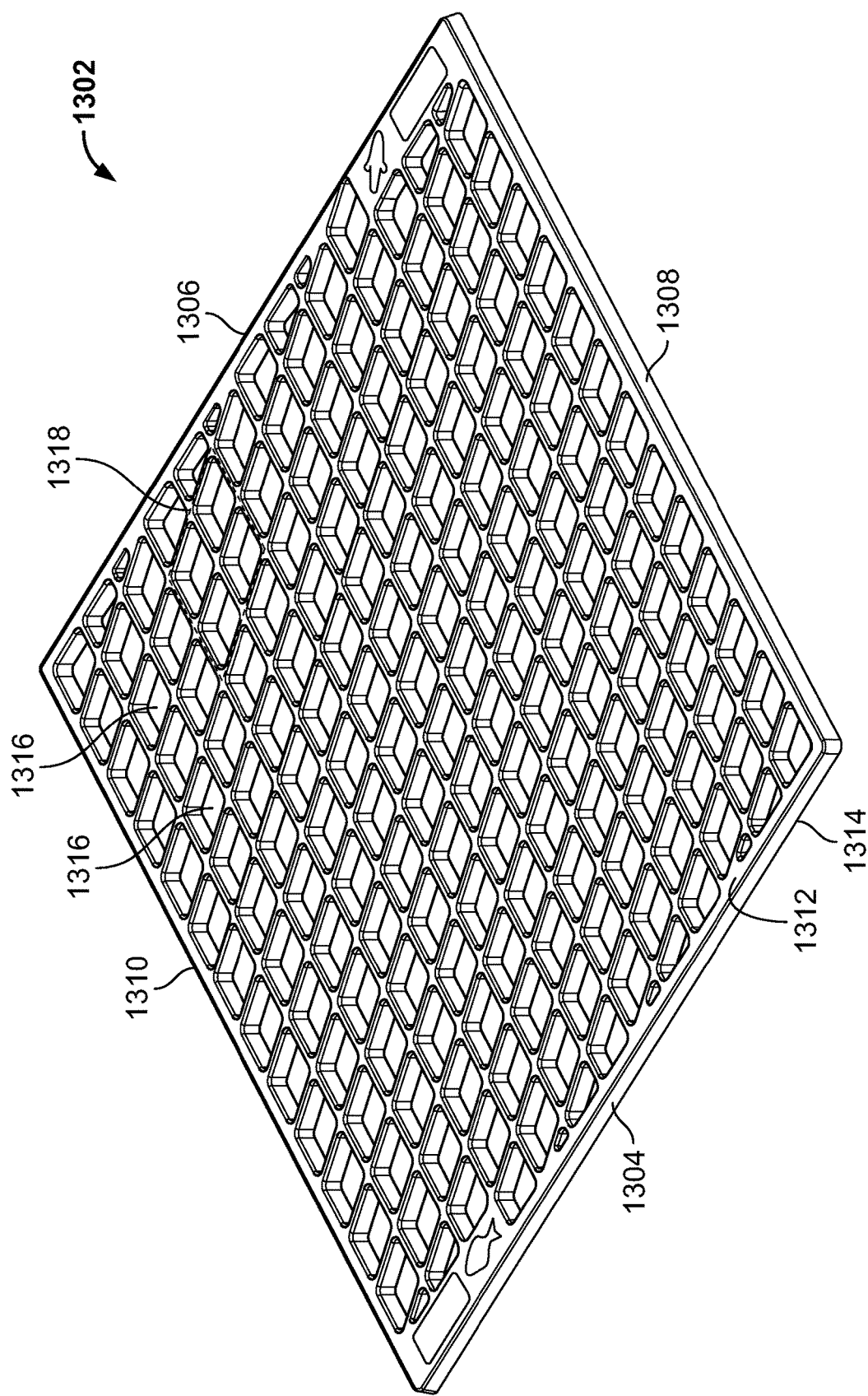
FIG. 13 is a perspective view of an example sear grate constructed in accordance with teachings of this disclosure.

FIG. 13 is a perspective view of an example sear grate 1302 constructed in accordance with teachings of this disclosure. The sear grate 1302 of FIG. 13 includes an example front end 1304, an example rear end 1306 located opposite the front end 1304, an example right side 1308 extending between the front end 1304 and the rear end 1306, and an example left side 1310 located opposite the right side 1308 and extending between the front end 1304 and the rear end 1306. The sear grate 1302 has a length ($L_{SG}$) extending between and defined by the front end 1304 and the rear end 1306 of the sear grate 1302, and a width ($W_{SG}$) extending between and defined by the right side 1308 and the left side 1310 of the sear grate 1302. In the illustrated example of FIG. 13, the sear grate 1302 has a generally rectangular profile defined by the front end 1304, the rear end 1306, the right side 1308, and the left side 1310 of the sear grate 1302. In other examples, the sear grate 1302 can instead have a non-rectangular profile (e.g., a circular profile, an elliptical profile, a triangular profile, a trapezoidal profile, a hexagonal profile, etc.).

The sear grate 1302 of FIG. 13 further includes an example top surface 1312 extending between the front end 1304, the rear end 1306, the right side 1308, and the left side 1310, as well as an example bottom surface 1314 located opposite the top surface 1312 and extending between the front end 1304, the rear end 1306, the right side 1308, and the left side 1310. The sear grate 1302 of FIG. 13 further includes example openings 1316 (e.g., through holes) extending from the top surface 1312 through to the bottom surface 1314 of the sear grate 1302. Respective ones of the openings 1316 are arranged relative to one another in a manner that provides an example sear pattern 1318. In the illustrated example of FIG. 13, the openings 1316 of the sear grate 1302 have a diamond-shaped profile. In other examples, the openings 1316 of the sear grate 1302 can instead have a non-diamond-shaped profile (e.g., a rectangular profile, a triangular profile, etc.).

The sear grate 1302 of FIG. 13 is configured such that the top surface 1312 constitutes a surface for searing (e.g., causing sear marks to be applied to) one or more items of food (e.g., a steak, a pork chop, a piece fish, an ear of corn, etc.) placed in contact with the top surface 1312 when the sear grate 1302 is positioned within the cookbox 402 of the grill 400 (e.g., on the inset frame 102) over an underlying heat source. In the illustrated example of FIG. 13, the sear grate 1302 is configured to be reversible, such that the bottom surface 1314 can be reoriented as the top surface 1312, and vice-versa, with the reoriented bottom surface 1314 then constituting a surface for searing (e.g., causing sear marks to be applied to) one or more items of food (e.g., a steak, a pork chop, a piece of fish, an ear of corn, etc.) placed in contact with the reoriented bottom surface 1314 when the sear grate 1302 is positioned within the cookbox 402 of the grill 400 (e.g., on the inset frame 102) over an underlying heat source.

In some examples, the openings 1316 of the sear grate 1302 taper from the top surface 1312 of the sear grate 1302 to the bottom surface 1314 of the sear grate 1302. In such examples, the top surface 1312 of the sear grate 1302 can produce sear marks that differ from (e.g., are relatively thicker or relatively thinner than) sear marks produced by the reoriented bottom surface 1314 of the sear grate 1302. For example, the top surface 1312 of the sear grate 1302 is configured to produce relatively thinner sear marks that may be preferable for searing a piece of fish or an ear of corn, while the bottom surface 1314 of the sear grate 1302 is conversely configured to produce relatively thicker sear marks that may be preferable for searing a steak or a pork chop.

Figure 14:
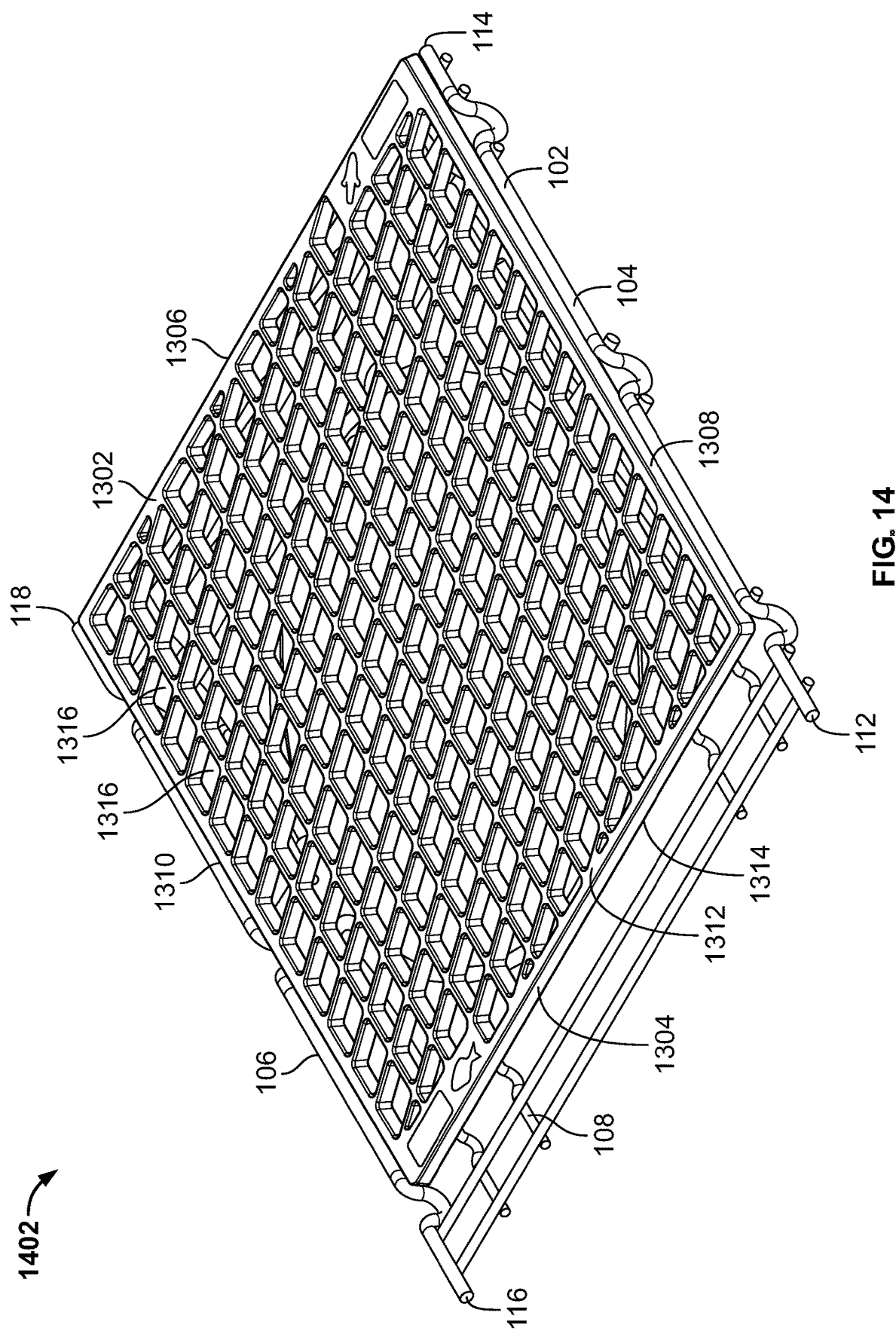
FIG. 14 is a perspective view of the sear grate of FIG. 13, with the sear grate shown positioned in an example first position on the inset frame of FIGS. 1-3.
Figure 15:
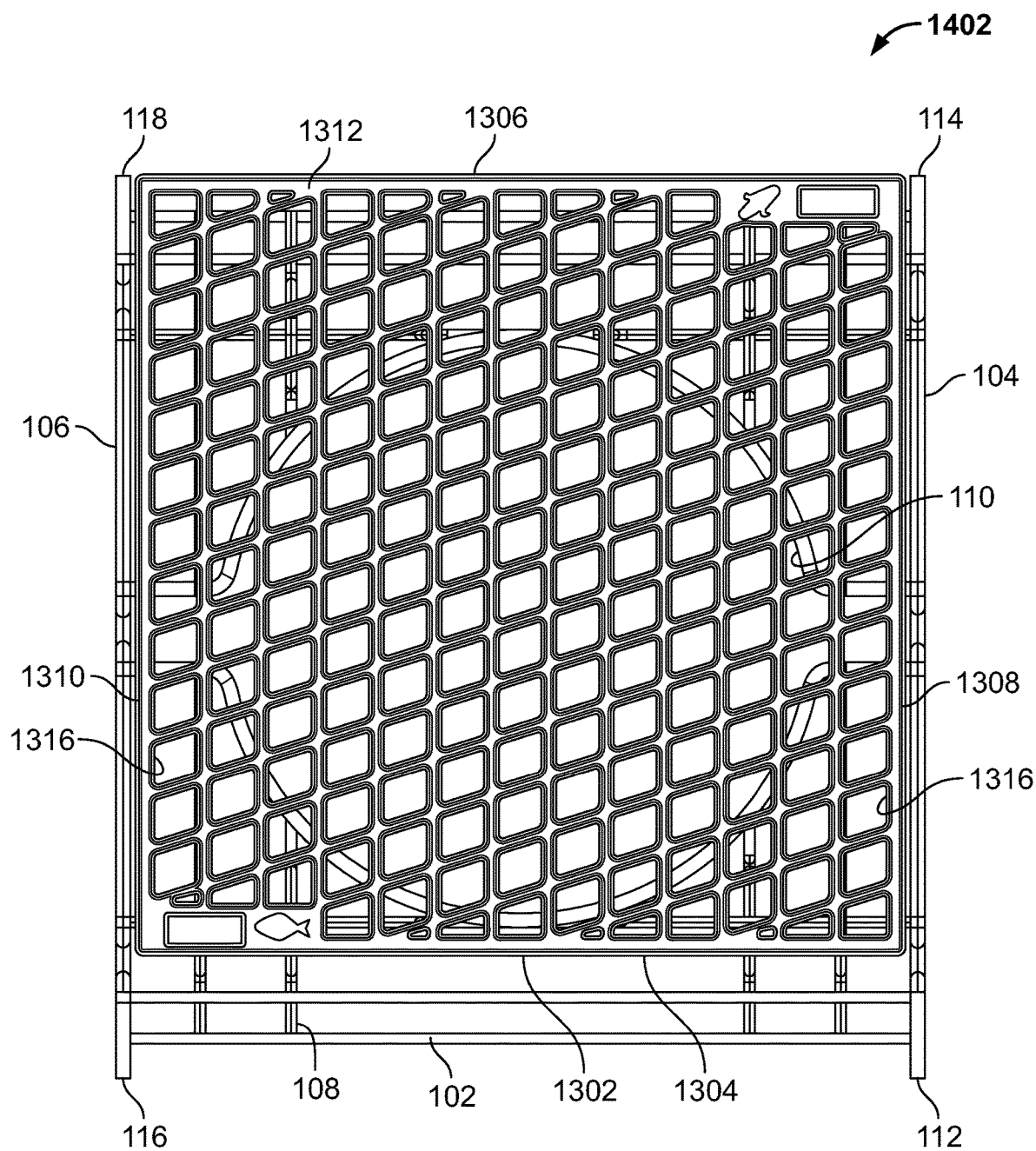
FIG. 15 is a top view of the sear grate of FIGS. 13 and 14, with the sear grate shown positioned in the first position on the inset frame of FIGS. 1-3 and 14.
Figure 16:
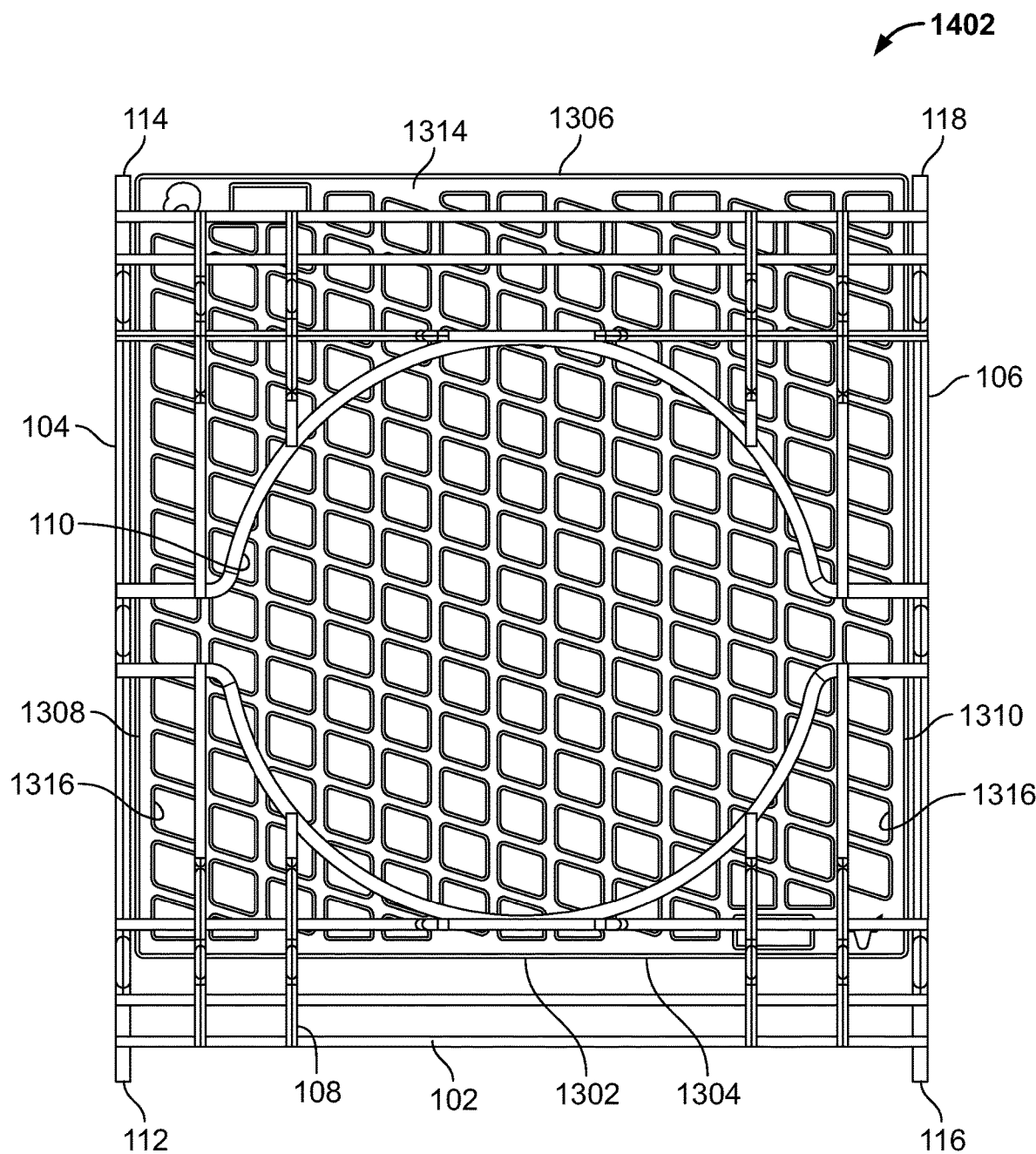
FIG. 16 is a bottom view of the sear grate of FIGS. 13-15, with the sear grate shown positioned in the first position on the inset frame of FIGS. 1-3, 14, and 15.

FIG. 14 is a perspective view of the sear grate 1302 of FIG. 13, with the sear grate 1302 shown positioned in an example first position 1402 on the inset frame 102 of FIGS. 1-3. FIG. 15 is a top view of the sear grate 1302 of FIGS. 13 and 14, with the sear grate 1302 shown positioned in the first position 1402 on the inset frame 102 of FIGS. 1-3 and 14. FIG. 16 is a bottom view of the sear grate 1302 of FIGS. 13-15, with the sear grate 1302 shown positioned in the first position 1402 on the inset frame 102 of FIGS. 1-3, 14, and 15. In the illustrated example of FIGS. 14-16, the support lattice 108 and/or, more generally, the inset frame 102 supports the bottom surface 1314 of the sear grate 1302, with the bottom surface 1314 of the sear grate 1302 extending fully over and/or across the central opening 110 of the support lattice 108. The width ($W_{SG}$) of the sear grate 1302 substantially fills, covers, and/or occupies the width (W) of the inset frame 102. For example, as shown in FIGS. 14-16, the right side 1308 of the sear grate 1302 is located and/or positioned adjacent the first support rod 104 of the inset frame 102, and the left side 1310 of the sear grate 1302 is located and/or positioned adjacent the second support rod 106 of the inset frame 102. The first support rod 104 and the second support rod 106 of the inset frame 102 respectively provide lateral boundaries and/or mechanical stops that restrict and/or prevent lateral movement and/or sliding of the sear grate 1302 relative to the inset frame 102. This benefit is accomplished as a result of the first support rod 104 and the second support rod 106 of the inset frame 102 both being elevated and/or raised above the planar support surface provided by the support lattice 108.

In the illustrated example of FIGS. 14-16, the length ($L_{SG}$) of the sear grate 1302 is less than the length (L) of the inset frame 102. This difference in lengths enables the sear grate 1302 to be located and/or positioned on the inset frame 102 in either the first position 1402 (e.g., a rearward position) shown in FIGS. 14-16 (and subsequently shown and described in connection with FIGS. 17-19), or in a second position (e.g., a forward position) as shown and described in connection with FIG. 20. When the sear grate 1302 is located and/or positioned on the inset frame 102 in the first position 1402 shown in FIGS. 14-16, the rear end 1306 of the sear grate 1302 is adjacent (e.g., flush with) the second end 114 of the first support rod 104 of the inset frame 102, and/or adjacent (e.g., flush with) the second end 118 of the second support rod 106 of the inset frame 102. The front end 1304 of the sear grate 1302 is spaced apart from the first end 112 of the first support rod 104 of the inset frame 102, and/or spaced apart from the first end 116 of the second support rod 106 of the inset frame 102.

In other examples, the length ($L_{SG}$) of the sear grate 1302 can instead substantially fill, cover, and/or occupy the length (L) of the inset frame 102, such that the sear grate 1302 can only be located and/or positioned on the inset frame 102 in a single lengthwise position. In such other examples, the front end 1304 of the sear grate 1302 is adjacent (e.g., flush with) the first end 112 of the first support rod 104 of the inset frame 102, and/or adjacent (e.g., flush with) the first end 116 of the second support rod 106 of the inset frame 102, and the rear end 1306 of the sear grate 1302 is adjacent (e.g., flush with) the second end 114 of the first support rod 104 of the inset frame 102, and/or adjacent (e.g., flush with) the second end 118 of the second support rod 106 of the inset frame 102.

Figure 17:
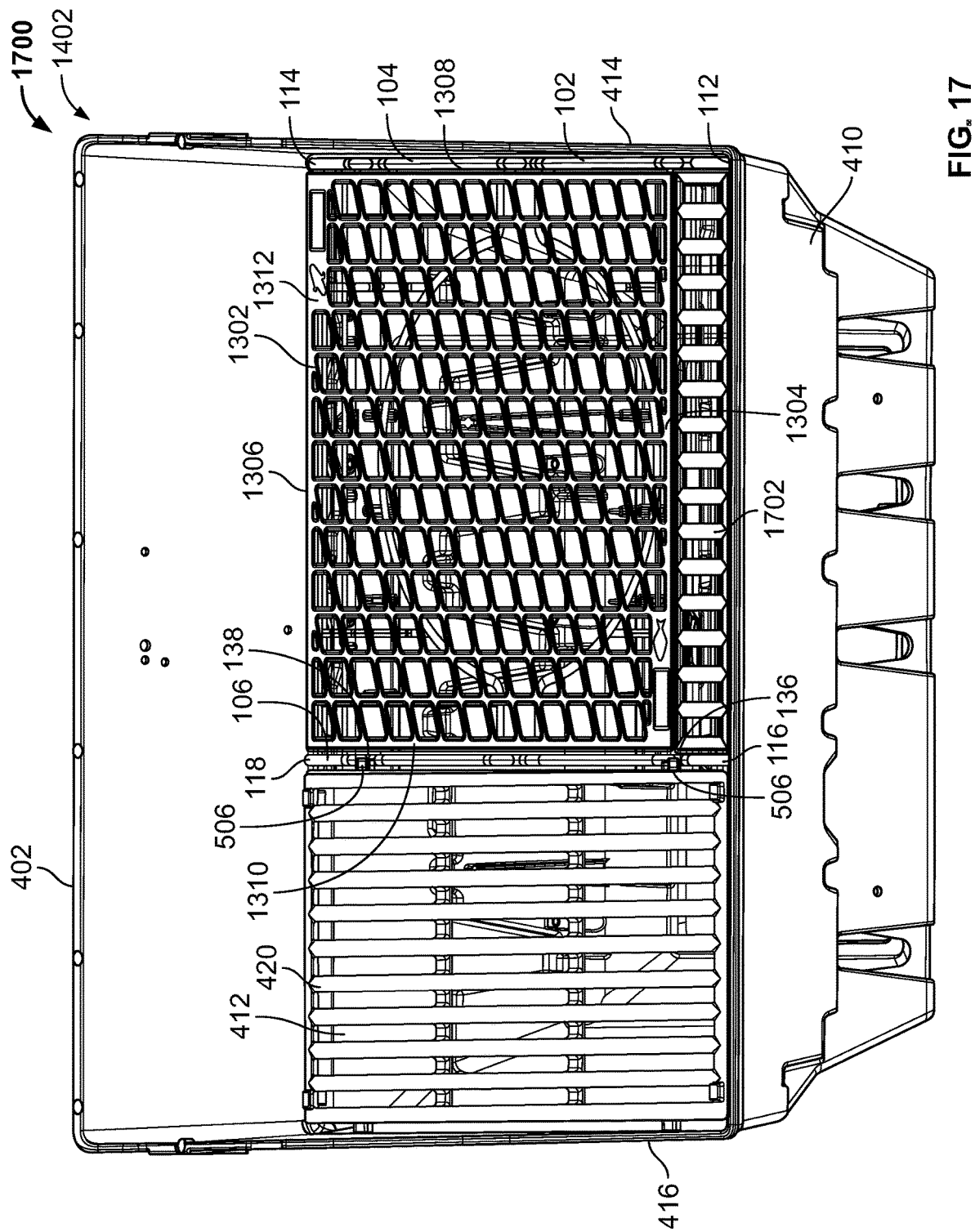
FIG. 17 is a perspective view of the cookbox of FIGS. 4-8 configured in an example second cookbox configuration in which the inset frame of FIGS. 1-3 and 14-16 is positioned in the cookbox, and the sear grate of FIGS. 13-16 is positioned in the first position on the inset frame.
Figure 18:
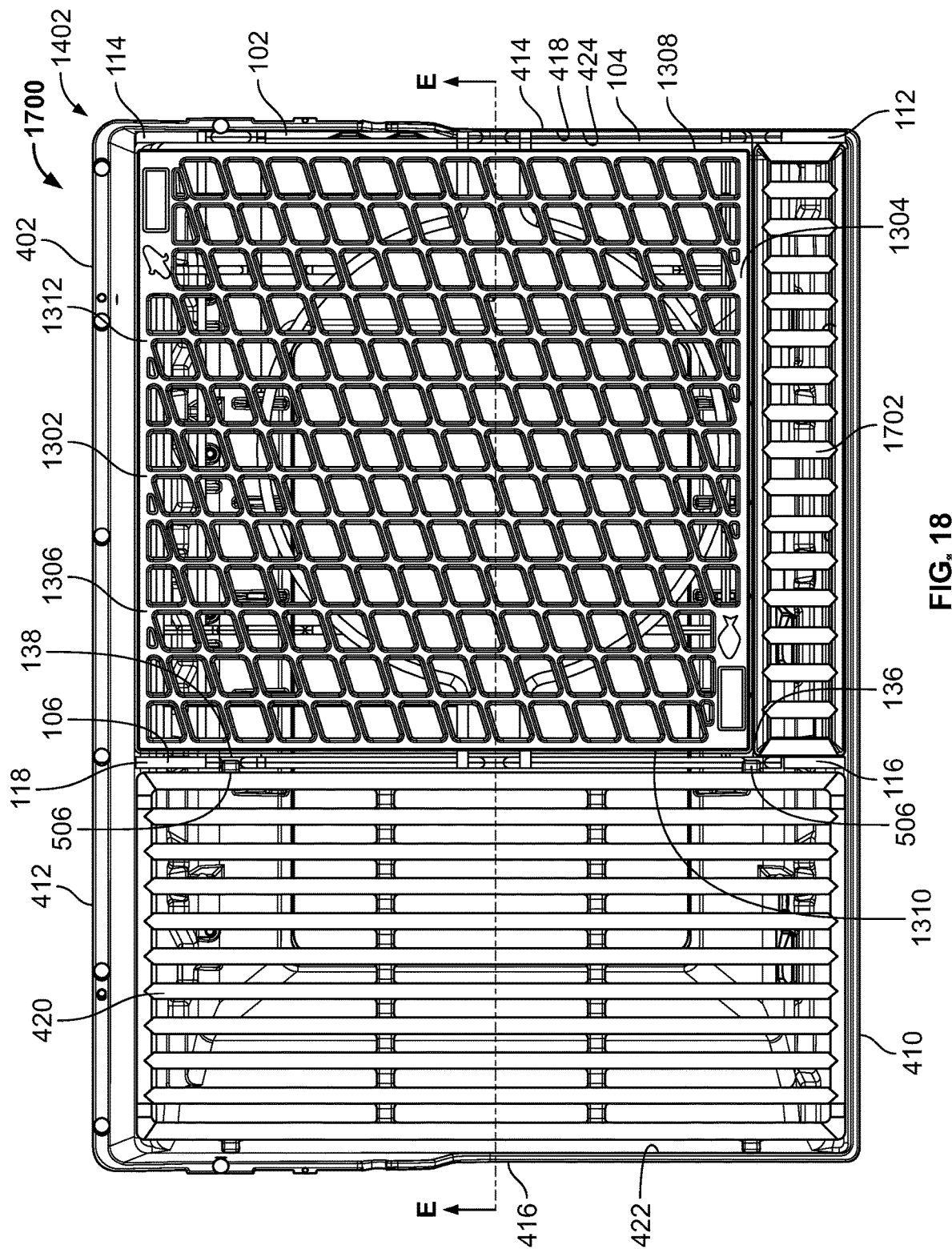
FIG. 18 is a top view of the second cookbox configuration of FIG. 17.
Figure 19:
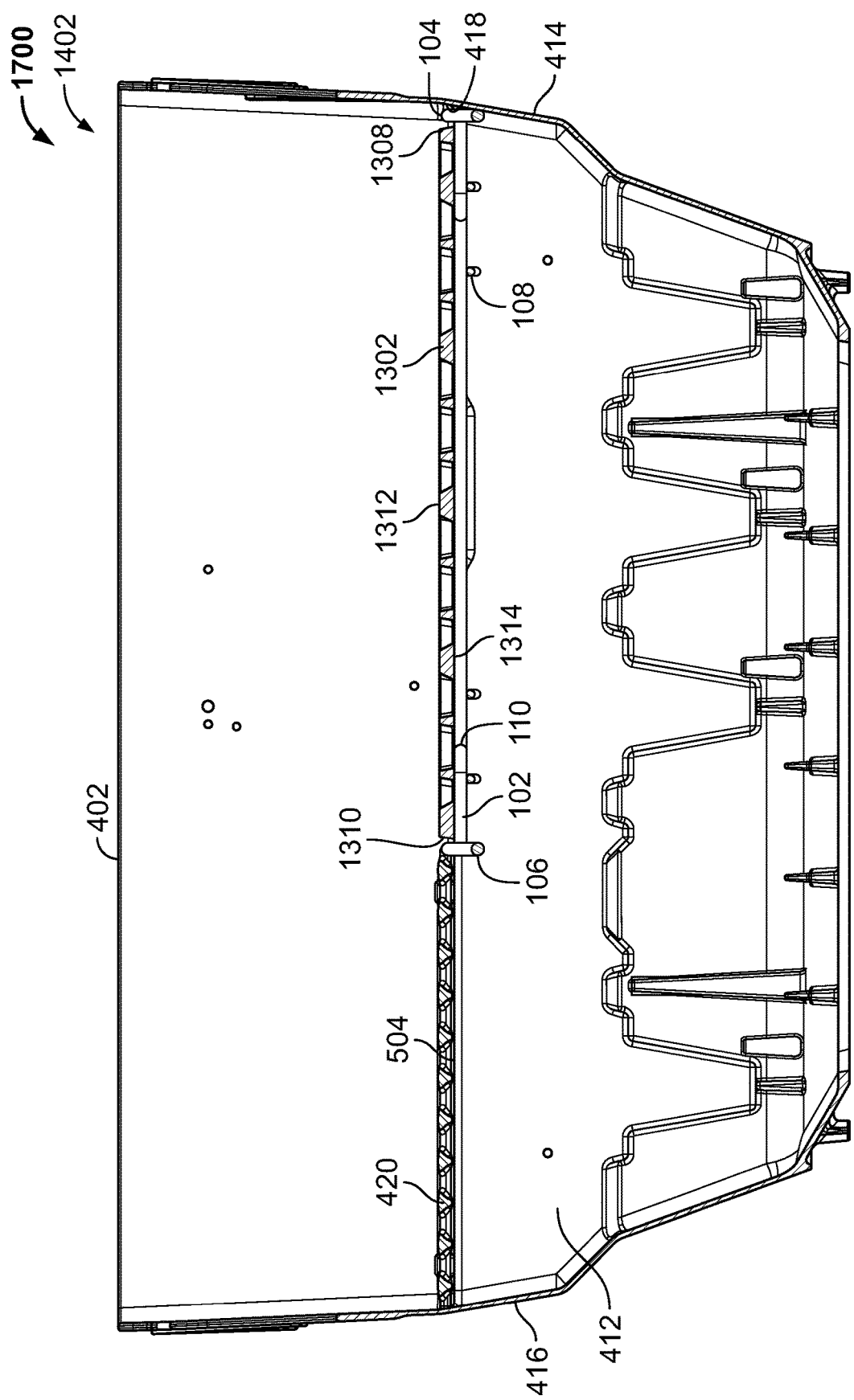
FIG. 19 is a cross-sectional view of the second cookbox configuration of FIGS. 17 and 18 taken along section E-E of FIG. 18.

FIG. 17 is a perspective view of the cookbox 402 of FIGS. 4-8 configured in an example second cookbox configuration 1700 in which the inset frame 102 of FIGS. 1-3 and 14-16 is positioned in the cookbox 402, and the sear grate 1302 of FIGS. 13-16 is positioned in the first position 1402 on the inset frame 102. FIG. 18 is a top view of the second cookbox configuration 1700 of FIG. 17. FIG. 19 is a cross-sectional view of the second cookbox configuration 1700 of FIGS. 17 and 18 taken along section E-E of FIG. 18. As shown in FIGS. 17-19, the location and/or position of the inset frame 102 within the cookbox 402 is substantially the same as the location and/or position of the inset frame 102 within the cookbox 402 as shown and described above in connection with FIGS. 9-12. As further shown in FIGS. 17-19, the location and/or position of the sear grate 1302 on the inset frame 102 is substantially the same as the location and/or position of the sear grate 1302 on the inset frame 102 as shown and described above in connection with FIGS. 14-16.

In the illustrated example of FIGS. 17-19, the inset frame 102 and the sear grate 1302 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the sear grate 1302 respectively being located and/or positioned within the second section 424 of the opening 418 of the cookbox 402. The inset frame 102 supports, locates, and/or positions the sear grate 1302 at a vertical elevation within the cookbox 402 that is substantially identical to a corresponding vertical elevation of the cooking grate 420 within the cookbox 402. This spatial arrangement advantageously enables the cooking grate 420 and the sear grate 1302 to collectively provide a planar and substantially continuous cooking surface extending laterally across the opening 418 of the cookbox 402 (e.g., extending laterally between the right sidewall 414 and the left sidewall 416 of the cookbox 402).

Figure 20:
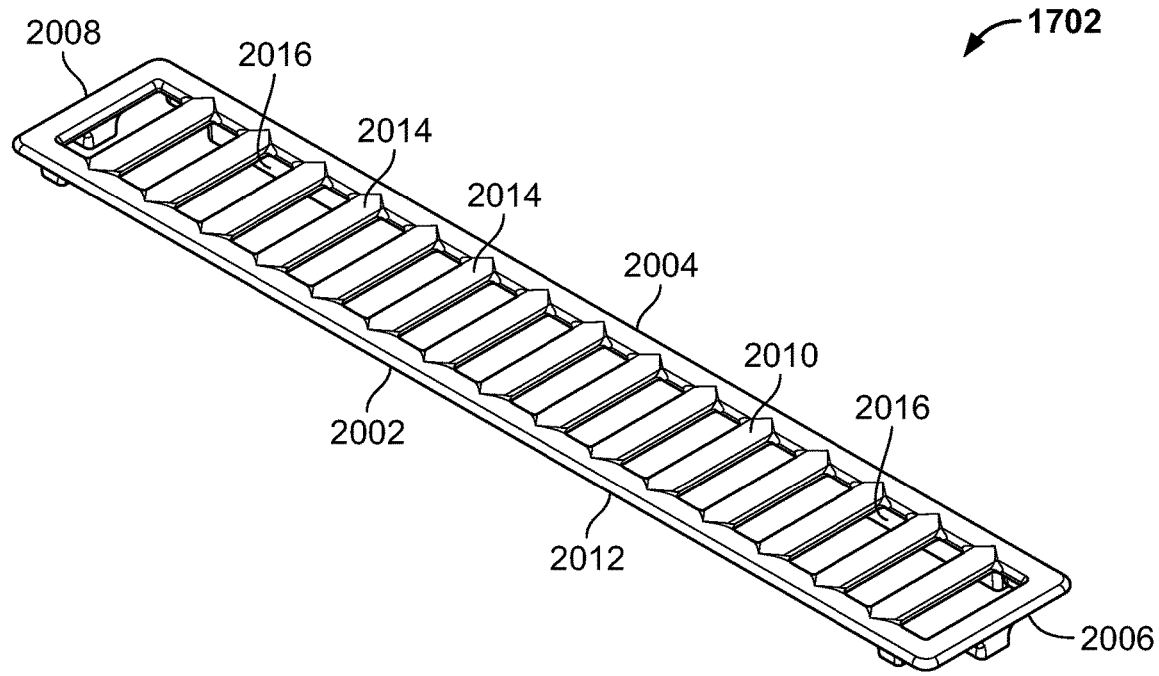
FIG. 20 is a first perspective view of the filler grate of FIGS. 17-19.

As further shown in FIGS. 17-19, the inset frame 102 additionally supports an example filler grate 1702. FIG. 20 is a first perspective view of the filler grate 1702 of FIGS.

Figure 21:
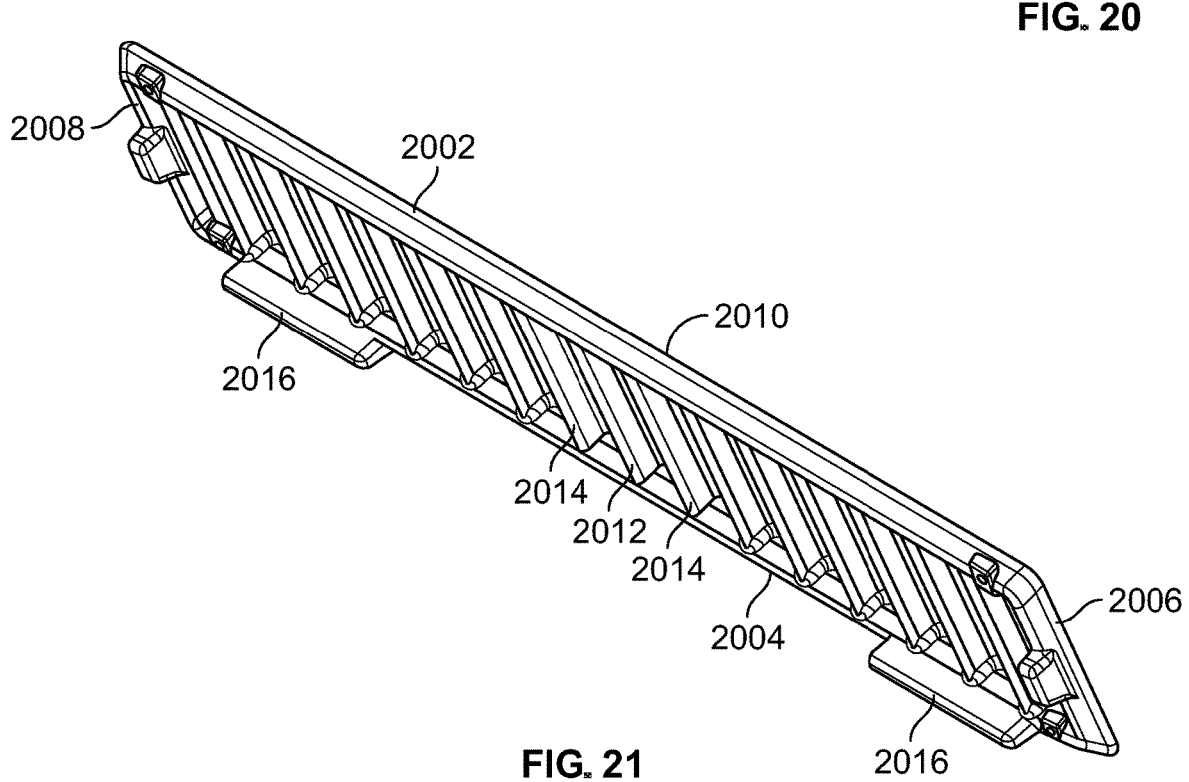
FIG. 21 is a second perspective view of the filler grate of FIGS. 17-20.

17-19. FIG. 21 is a second perspective view of the filler grate 1702 of FIGS. 17-20. The filler grate 1702 of FIGS. 17-21 includes an example front end 2002, an example rear end 2004 located opposite the front end 2002, an example right side 2006 extending between the front end 2002 and the rear end 2004, and an example left side 2008 located opposite the right side 2006 and extending between the front end 2002 and the rear end 2004. The filler grate 1702 has a length ($L_{FG}$) extending between and defined by the front end 2002 and the rear end 2004 of the filler grate 1702, and a width ($W_{FG}$) extending between and defined by the right side 2006 and the left side 2008 of the filler grate 1702. In the illustrated example of FIGS. 17-22, the filler grate 1702 has a generally rectangular profile defined by the front end 2002, the rear end 2004, the right side 2006, and the left side 2008 of the filler grate 1702. In other examples, the filler grate 1702 can instead have a non-rectangular profile (e.g., a circular profile, an elliptical profile, a triangular profile, a trapezoidal profile, a hexagonal profile, etc.).

The filler grate 1702 of FIGS. 17-21 further includes an example top surface 2010 extending between the front end 2002, the rear end 2004, the right side 2006, and the left side 2008, as well as an example bottom surface 2012 located opposite the top surface 2010 and extending between the front end 2002, the rear end 2004, the right side 2006, and the left side 2008. The filler grate 1702 further includes example linear rods 2014 extending between the front end 2002 and the rear end 2004 of the filler grate 1702, with respective ones of the linear rods 2014 being spaced apart from one another between the right side 2006 and the left side 2008 of the filler grate 1702. The filler grate 1702 of FIGS. 17-21 still further includes example support flanges 2016 extending downwardly from the bottom surface 2012 of the filler grate 1702.

The filler grate 1702 of FIGS. 17-21 is configured to be positioned on the inset frame 102 at either a forward position (e.g., forward of a cooking accessory that is also positioned on the inset frame 102) or a rearward position (e.g., rearward of a cooking accessory that is also positioned on the inset frame 102). For example, when the sear grate 1302 is located and/or positioned on the inset frame 102 in the first position 1402 shown in FIGS. 14-19, the filler grate 1702 can be located and/or positioned on the inset frame 102 forward of the sear grate 1302. In the illustrated example of FIGS. 17-19, the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the front end 1304 of the sear grate 1302 on the one hand, and the first end 112 of the first support rod 104 and/or the first end 116 of the second support rod 106 of the inset frame 102 on the other hand. Thus, as shown in FIGS. 17-19, the filler grate 1702 substantially completely fills, covers, and/or occupies the forward portion of the inset frame 102 that is not already substantially completely filled, covered, and/or occupied by the sear grate 1302 when the sear grate 1302 is positioned on the inset frame 102 in the first position 1402 shown in FIGS. 14-19.

When the filler grate 1702 is positioned on the inset frame 102 in the forward position shown in FIGS. 17-19, the rear end 2004 of the filler grate 1702 is adjacent the front end 1304 of the sear grate 1302, and the front end 2002 of the filler grate 1702 faces toward the first end 112 of the first support rod 104 and/or the first end 116 of the second support rod 106 of the inset frame 102. When the filler grate 1702 is positioned on the inset frame 102 in the forward position shown in FIGS. 17-19, the support flanges 2016 of the filler grate 1702 are located within the first recesses 142 of the second crosswise rods 122 of the inset frame 102. Locating the support flanges 2016 of the filler grate 1702 within the first recesses 142 of the second crosswise rods 122 of the inset frame 102 advantageously assists in properly positioning and/or stabilizing the filler grate 1702 relative to the inset frame 102, or relative to the sear grate 1302 positioned on the inset frame 102 adjacent the filler grate 1702.

Figure 22:
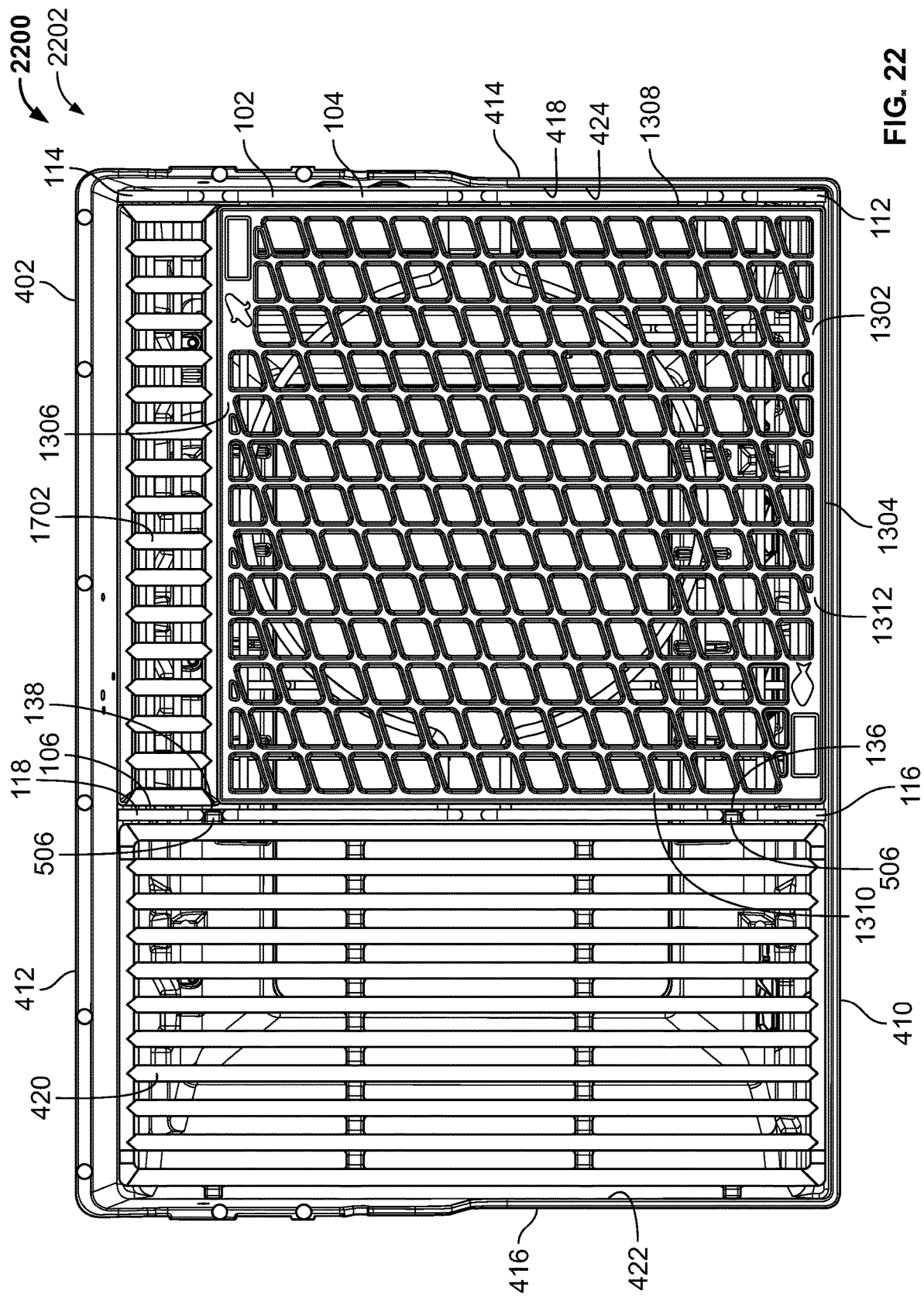
FIG. 22 is a top view of the cookbox of FIGS. 4-8 configured in an example third cookbox configuration in which the inset frame of FIGS. 1-3 and 14-16 is positioned in the cookbox, and the sear grate of FIGS. 13-16 is positioned in an example second position on the inset frame.

As discussed above, the filler grate 1702 of FIGS. 17-21 is also configured to be positioned on the inset frame 102 at a rearward position (e.g., rearward of a cooking accessory that is also positioned on the inset frame 102). In some examples, positioning the filler grate 1702 on the inset frame 102 at a rearward position involves reorienting the filler grate 1702 such that the respective orientations of the front end 2002 and the rear end 2004 of the filler grate 1702 are reversed, and/or such that the respective orientations of the right side 2006 and the left side 2008 of the filler grate 1702 are reversed. In this regard, FIG. 22 is a top view of the cookbox 402 of FIGS. 4-8 configured in an example third cookbox configuration 2200 in which the inset frame 102 of FIGS. 1-3 and 14-16 is positioned in the cookbox 402, and the sear grate 1302 of FIGS. 13-16 is positioned in an example second position 2202 on the inset frame 102. The front end 1304 of the sear grate 1302 is adjacent (e.g., flush with) the first end 112 of the first support rod 104 of the inset frame 102, and/or adjacent (e.g., flush with) the first end 116 of the second support rod 106 of the inset frame 102. The rear end 1306 of the sear grate 1302 is spaced apart from the second end 114 of the first support rod 104 of the inset frame 102, and/or spaced apart from the second end 118 of the second support rod 106 of the inset frame 102.

When the sear grate 1302 is located and/or positioned on the inset frame 102 in the second position 2202 shown in FIG. 22, the above-described filler grate 1702 can be located and/or positioned on the inset frame 102 rearward of the sear grate 1302. In the illustrated example of FIG. 22, the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the rear end 1306 of the sear grate 1302 on the one hand, and the second end 114 of the first support rod 104 and/or the second end 118 of the second support rod 106 of the inset frame 102 on the other hand. Thus, as shown in FIG. 22, the filler grate 1702 substantially completely fills, covers, and/or occupies the rearward portion of the inset frame 102 that is not already substantially completely filled, covered, and/or occupied by the sear grate 1302 when the sear grate 1302 is positioned on the inset frame 102 in the second position 2202 shown in FIG. 22.

When the filler grate 1702 is positioned on the inset frame 102 in the rearward position shown in FIG. 22, the rear end 2004 of the filler grate 1702 is reoriented to be adjacent the rear end 1306 of the sear grate 1302, and the front end 2002 of the filler grate 1702 is reoriented to face toward the second end 114 of the first support rod 104 and/or the second end 118 of the second support rod 106 of the inset frame 102. When the filler grate 1702 is positioned on the inset frame 102 in the rearward position shown in FIG. 22, the support flanges 2016 of the filler grate 1702 are located within the second recesses 144 of the second crosswise rods 122 of the inset frame 102. Locating the support flanges 2016 of the filler grate 1702 within the second recesses 144 of the second crosswise rods 122 of the inset frame 102 advantageously assists in properly positioning and/or stabilizing the filler grate 1702 relative to the inset frame 102, or relative to the sear grate 1302 positioned on the inset frame 102 adjacent the filler grate 1702.

The sear grate 1302 shown and described above in connection with FIGS. 13-19 and 22 provides one example of a large-format rectangular cooking accessory that can be supported, located, and/or positioned within the cookbox 402 of the grill 400 via the inset frame 102. The inset frame 102 is advantageously configured to accommodate and/or support other, similarly sized and/or similarly shaped large-format rectangular cooking accessories in an interchangeable manner. For example, with the sear grate 1302 of FIGS. 13-19 and 22 removed from the inset frame 102, the inset frame 102 can instead accommodate and/or support a large-format rectangular cooking stone (e.g., a pizza stone, a baking stone, etc.) having a length and a width that are respectively dimensioned to approximate and/or match the length and the width of the sear grate 1302, and/or the length and the width of the inset frame 102. As yet another example, with the sear grate 1302 of FIGS. 13-19 and 22 removed from the inset frame 102, the inset frame 102 can instead accommodate and/or support a large-format rectangular griddle having a base with a length and a width that are respectively dimensioned to approximate and/or match the length and the width of the sear grate 1302, and/or the length and the width of the inset frame 102. As yet another example, with the sear grate 1302 of FIGS. 13-19 and 22 removed from the inset frame 102, the inset frame 102 can instead accommodate and/or support a large-format rectangular grilling basket having a base with a length and a width that are respectively dimensioned to approximate and/or match the length and the width of the sear grate 1302, and/or the length and the width of the inset frame 102. As yet another example, with the sear grate 1302 of FIGS. 13-19 and 22 removed from the inset frame 102, the inset frame 102 can instead accommodate and/or support a large-format rectangular cooking grate (e.g., structured in a manner similar to the cooking grate 420 of FIG. 4) having a length and a width that are respectively dimensioned to approximate and/or match the length and the width of the sear grate 1302, and/or the length and the width of the inset frame 102.

Figure 23:
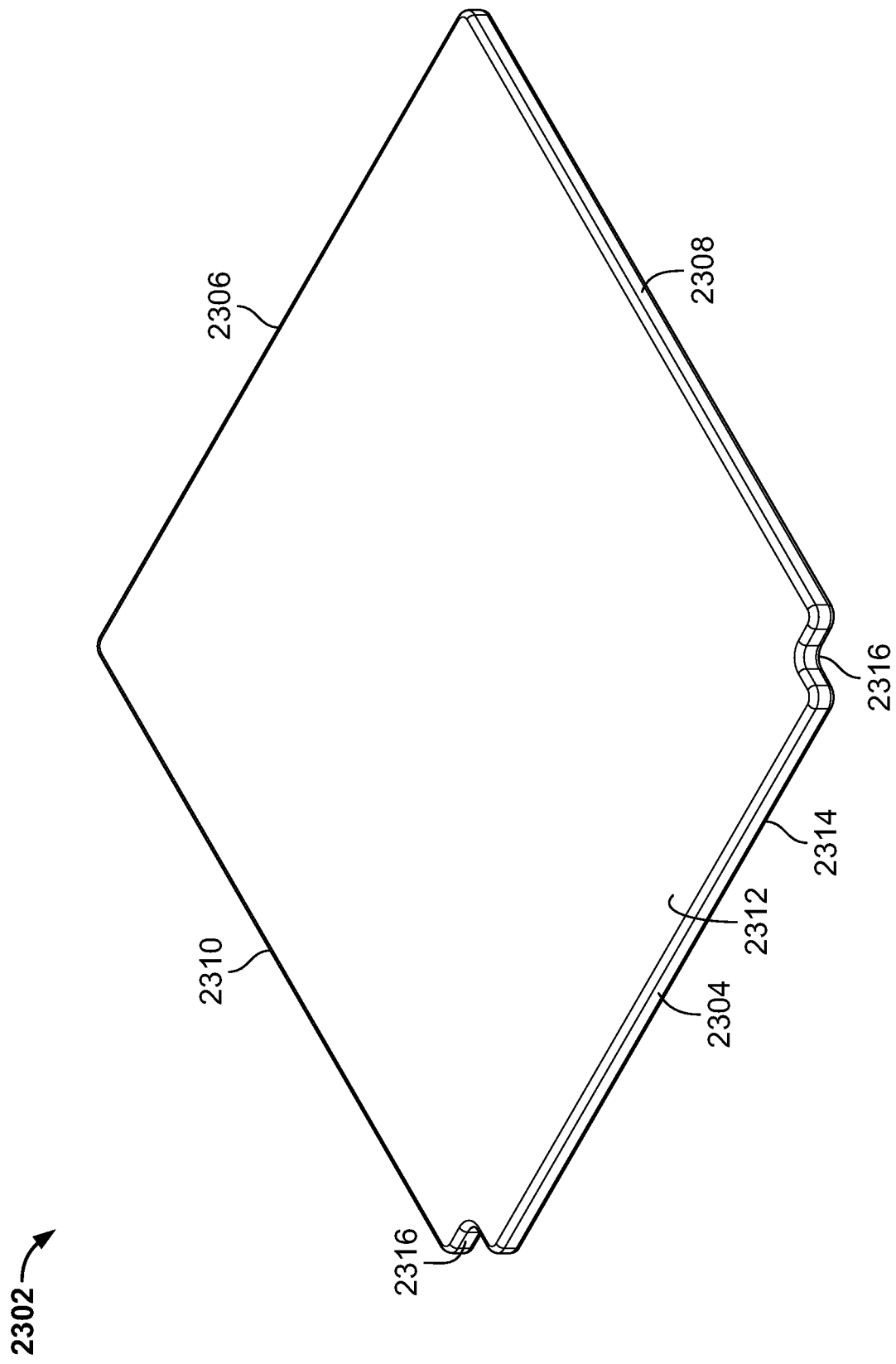
FIG. 23 is a perspective view of an example cooking stone constructed in accordance with teachings of this disclosure.

FIG. 23 is a perspective view of an example cooking stone 2302 constructed in accordance with teachings of this disclosure. The cooking stone 2302 of FIG. 23 includes an example front end 2304, an example rear end 2306 located opposite the front end 2304, an example right side 2308 extending between the front end 2304 and the rear end 2306, and an example left side 2310 located opposite the right side 2308 and extending between the front end 2304 and the rear end 2306. The cooking stone 2302 has a length ($L_{CS}$) extending between and defined by the front end 2304 and the rear end 2306 of the cooking stone 2302, and a width ($W_{CS}$) extending between and defined by the right side 2308 and the left side 2310 of the cooking stone 2302. In the illustrated example of FIG. 23, the cooking stone 2302 has a generally rectangular profile defined by the front end 2304, the rear end 2306, the right side 2308, and the left side 2310 of the cooking stone 2302. In other examples, the cooking stone 2302 can instead have a non-rectangular profile (e.g., a circular profile, an elliptical profile, a triangular profile, a trapezoidal profile, a hexagonal profile, etc.).

The cooking stone 2302 of FIG. 23 further includes an example top surface 2312 extending between the front end 2304, the rear end 2306, the right side 2308, and the left side 2310, as well as an example bottom surface 2314 located opposite the top surface 2312 and extending between the front end 2304, the rear end 2306, the right side 2308, and the left side 2310. The cooking stone 2302 is configured such that the top surface 2312 constitutes a surface for cooking (e.g., baking) one or more items of food (e.g., a pizza, cookies, bread, etc.) placed in contact with the top surface 2312 when the cooking stone 2302 is positioned within the cookbox 402 of the grill 400 (e.g., on the inset frame 102) over an underlying heat source. In some examples, the cooking stone 2302 of FIG. 23 can be is configured to be reversible, such that the bottom surface 2314 can be reoriented as the top surface 2312, and vice-versa, with the reoriented bottom surface 2314 then constituting a surface for cooking (e.g., baking) one or more items of food (e.g., a pizza, cookies, bread, etc.) placed in contact with the reoriented bottom surface 2314 when the cooking stone 2302 is positioned within the cookbox 402 of the grill 400 (e.g., on the inset frame 102) over an underlying heat source.

The cooking stone 2302 of FIG. 23 further includes example notched corners 2316. For example, as shown in FIG. 23, the cooking stone 2302 includes two notched corners 2316 respectively located along the front end 2304 of the cooking stone 2302 (e.g., at the junction between the front end 2304 and the right side 2308, and at the junction between the front end 2304 and the left side 2310). In other examples, the cooking stone 2302 can alternatively include only a single notched corner 2361 along the front end 2304 of the cooking stone 2302. In still other examples, the cooking stone can additionally or alternatively include one or two notched corners 2316 respectively located along the rear end 2306 of the cooking stone 2302 (e.g., at the junction between the rear end 2306 and the right side 2308, and/or at the junction between the rear end 2306 and the left side 2310). The notched corners 2316 are respectively configured to improve the ease with which an end user can position the cooking stone 2302 onto and/or remove the cooking stone 2302 from the inset frame 102 of FIGS. 1-3.

Figure 24:
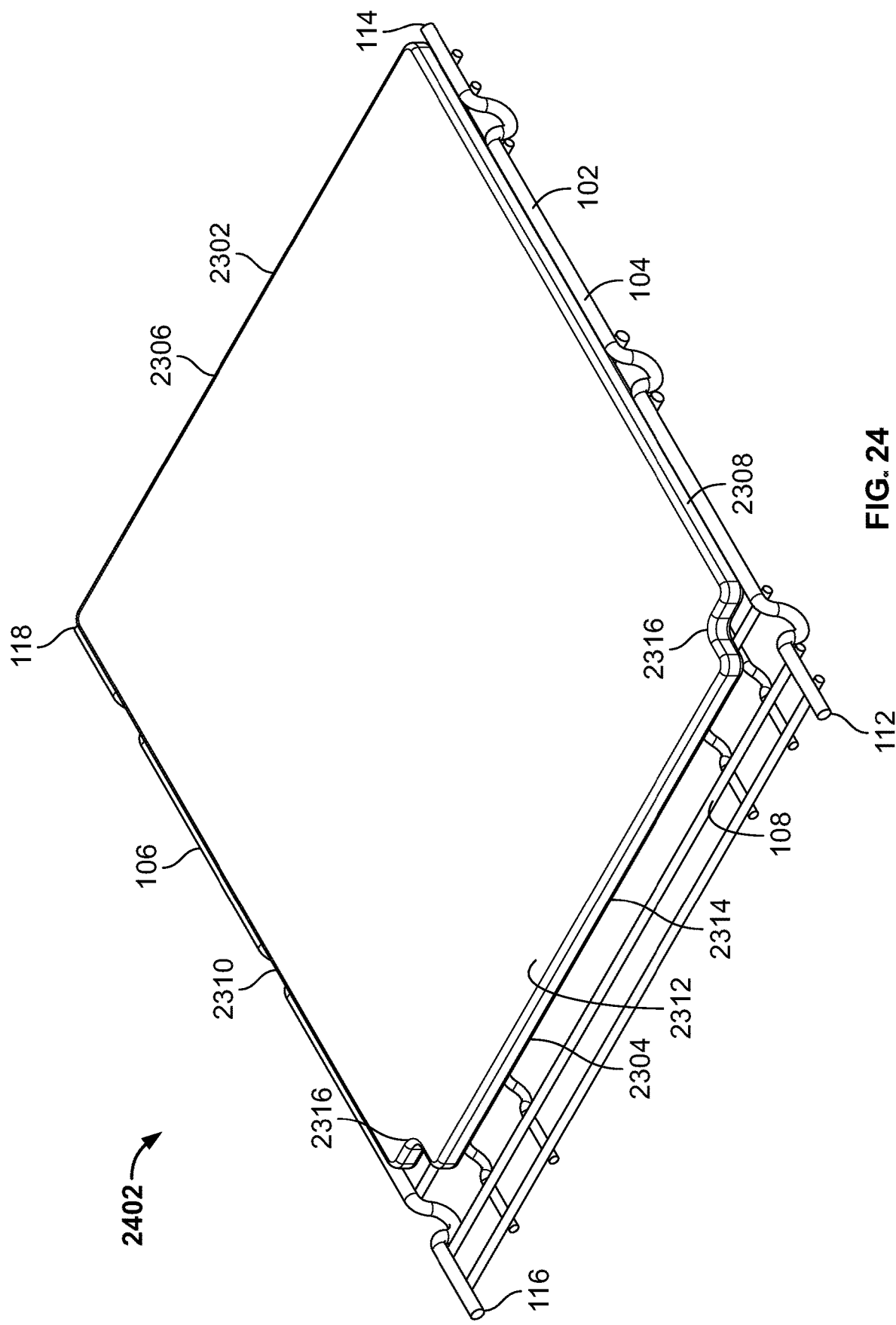
FIG. 24 is a perspective view of the cooking stone of FIG. 23, with the cooking stone shown positioned in an example first position on the inset frame of FIGS. 1-3.
Figure 25:
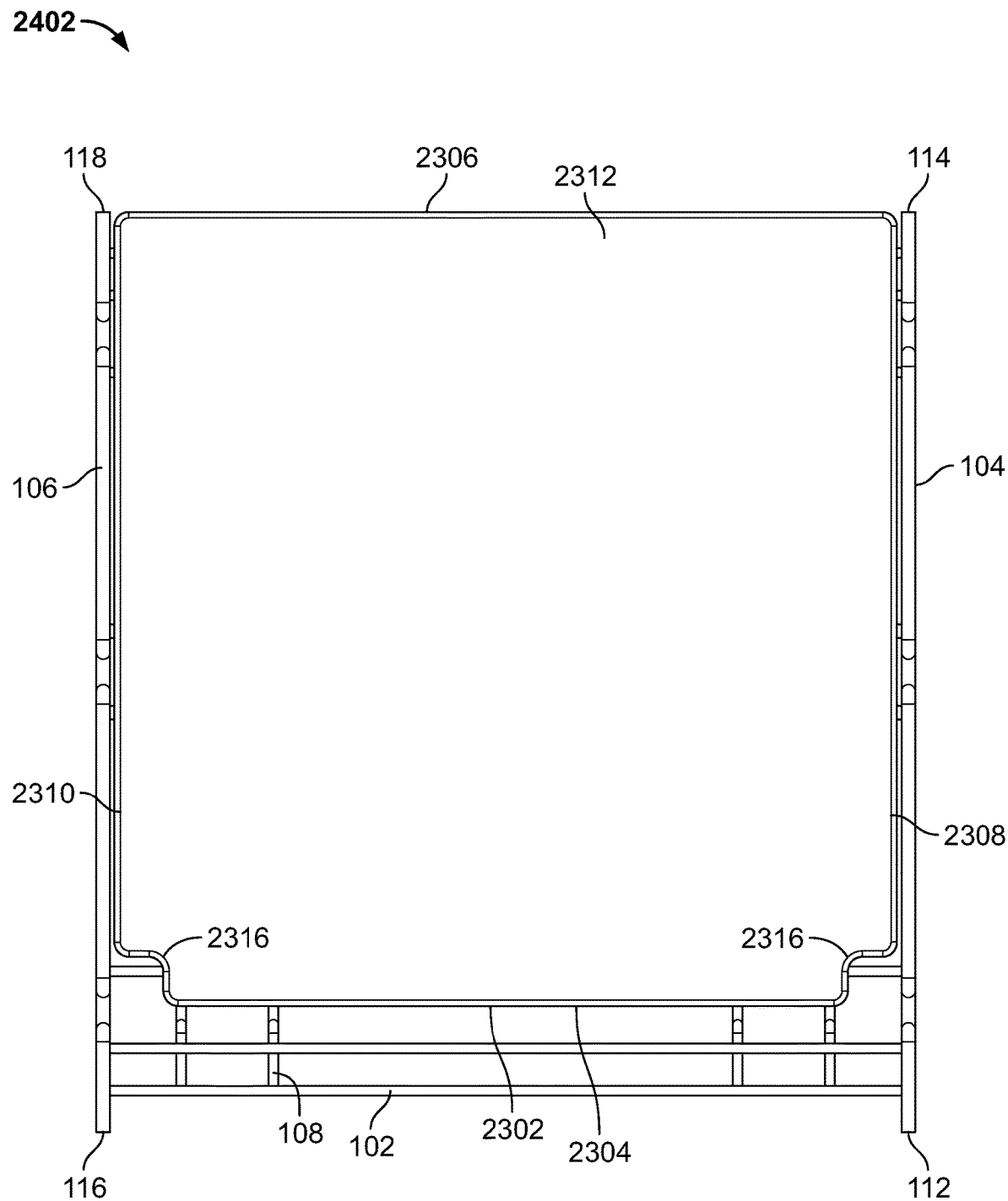
FIG. 25 is a top view of the cooking stone of FIGS. 23 and 24, with the cooking stone shown positioned in the first position on the inset frame of FIGS. 1-3 and 24.
Figure 26:
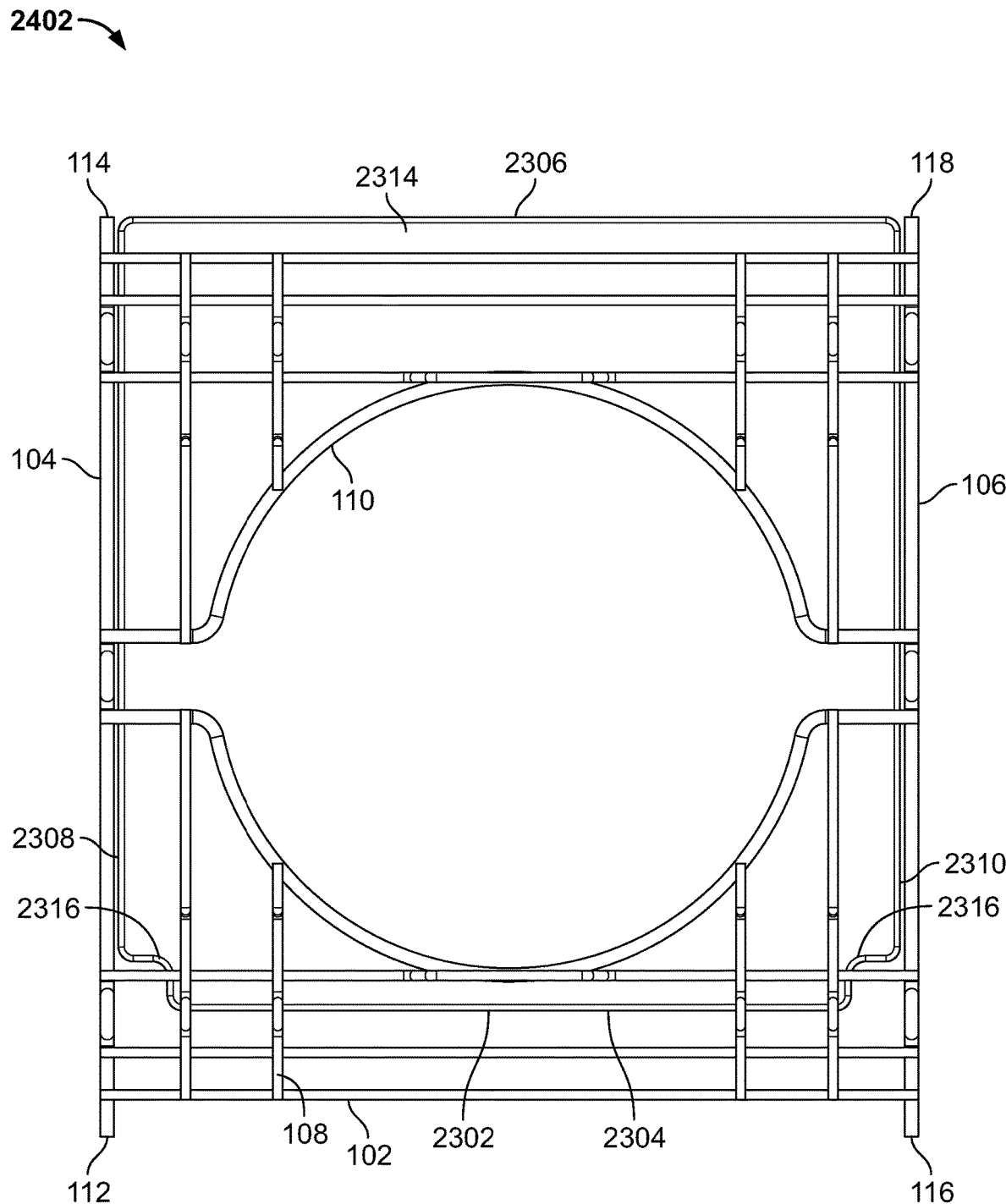
FIG. 26 is a bottom view of the cooking stone of FIGS. 23-25, with the cooking stone shown positioned in the first position on the inset frame of FIGS. 1-3, 24, and 25.

FIG. 24 is a perspective view of the cooking stone 2302 of FIG. 23, with the cooking stone 2302 shown positioned in an example first position 2402 on the inset frame 102 of FIGS. 1-3. FIG. 25 is a top view of the cooking stone 2302 of FIGS. 23 and 24, with the cooking stone 2302 shown positioned in the first position 2402 on the inset frame 102 of FIGS. 1-3 and 24. FIG. 26 is a bottom view of the cooking stone 2302 of FIGS. 23-25, with the cooking stone 2302 shown positioned in the first position 2402 on the inset frame 102 of FIGS. 1-3, 24, and 25. In the illustrated example of FIGS. 24-26, the support lattice 108 and/or, more generally, the inset frame 102 supports the bottom surface 2314 of the cooking stone 2302, with the bottom surface 2314 of the cooking stone 2302 extending fully over and/or across the central opening 110 of the support lattice 108. The width ($W_{CS}$) of the cooking stone 2302 substantially fills, covers, and/or occupies the width (W) of the inset frame 102. For example, as shown in FIGS. 24-26, the right side 2308 of the cooking stone 2302 is located and/or positioned adjacent the first support rod 104 of the inset frame 102, and the left side 2310 of the cooking stone 2302 is located and/or positioned adjacent the second support rod 106 of the inset frame 102. The first support rod 104 and the second support rod 106 of the inset frame 102 respectively provide lateral boundaries and/or mechanical stops that restrict and/or prevent lateral movement and/or sliding of the cooking stone 2302 relative to the inset frame 102. This benefit is accomplished as a result of the first support rod 104 and the second support rod 106 of the inset frame 102 both being elevated and/or raised above the planar support surface provided by the support lattice 108.

In the illustrated example of FIGS. 24-26, the length ($L_{CS}$) of the cooking stone 2302 is less than the length (L) of the inset frame 102. This difference in lengths enables the cooking stone 2302 to be located and/or positioned on the inset frame 102 in either the first position 2402 (e.g., a rearward position) shown in FIGS. 24-26 (and subsequently shown and described in connection with FIGS. 27-29), or in a second position (e.g., a forward position). When the cooking stone 2302 is located and/or positioned on the inset frame 102 in the first position 2402 shown in FIGS. 24-26, the rear end 2306 of the cooking stone 2302 is adjacent (e.g., flush with) the second end 114 of the first support rod 104 of the inset frame 102, and/or adjacent (e.g., flush with) the second end 118 of the second support rod 106 of the inset frame 102. The front end 2304 of the cooking stone 2302 is spaced apart from the first end 112 of the first support rod 104 of the inset frame 102, and/or spaced apart from the first end 116 of the second support rod 106 of the inset frame 102.

In other examples, the length ($L_{CS}$) of the cooking stone 2302 can instead substantially fill, cover, and/or occupy the length (L) of the inset frame 102, such that the cooking stone 2302 can only be located and/or positioned on the inset frame 102 in a single lengthwise position. In such other examples, the front end 2304 of the cooking stone 2302 is adjacent (e.g., flush with) the first end 112 of the first support rod 104 of the inset frame 102, and/or adjacent (e.g., flush with) the first end 116 of the second support rod 106 of the inset frame 102, and the rear end 2306 of the cooking stone 2302 is adjacent (e.g., flush with) the second end 114 of the first support rod 104 of the inset frame 102, and/or adjacent (e.g., flush with) the second end 118 of the second support rod 106 of the inset frame 102.

Figure 27:
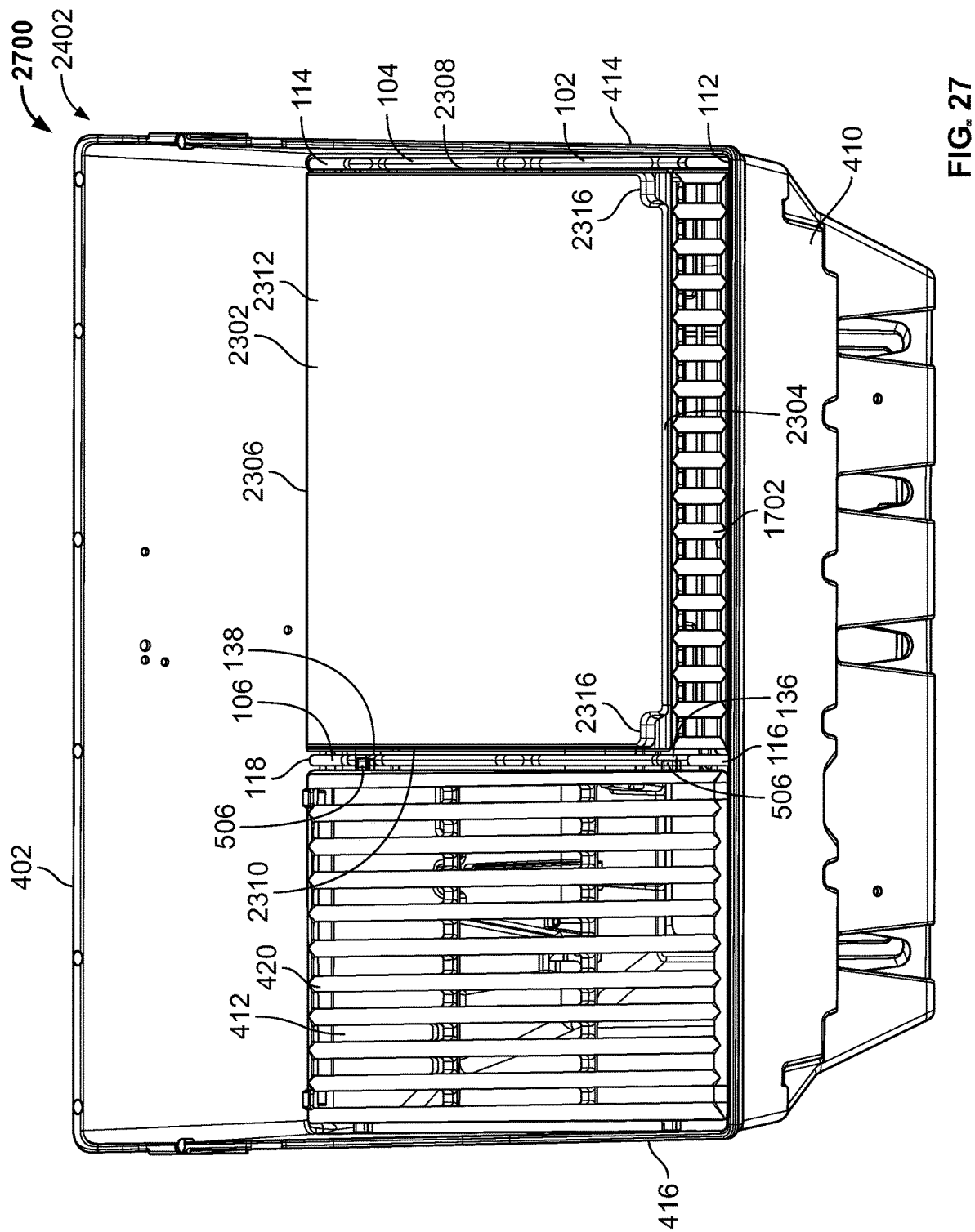
FIG. 27 is a perspective view of the cookbox of FIGS. 4-8 configured in an example fourth cookbox configuration in which the inset frame of FIGS. 1-3 and 24-26 is positioned in the cookbox, and the cooking stone of FIGS. 23-26 is positioned in the first position on the inset frame.
Figure 28:
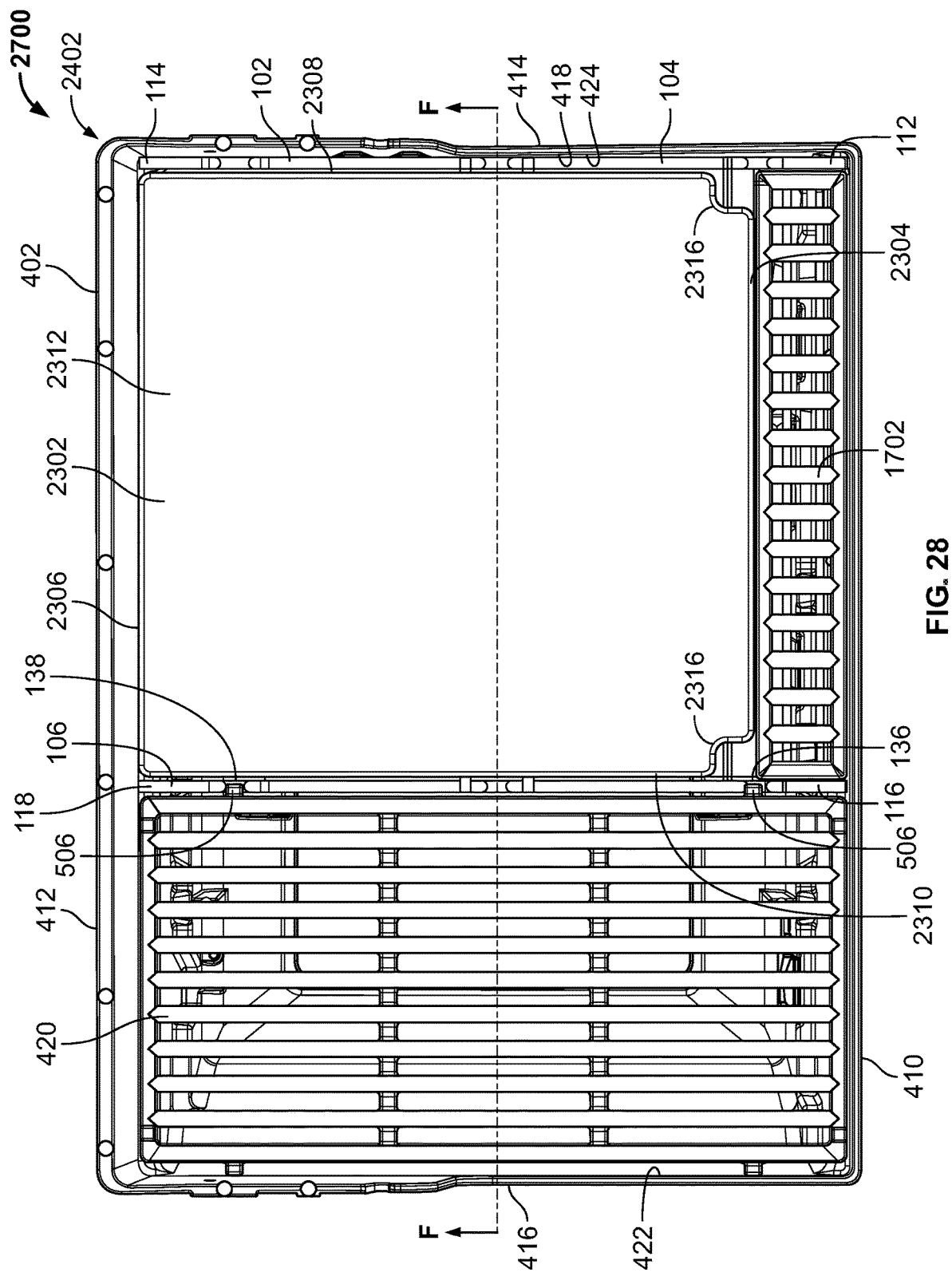
FIG. 28 is a top view of the fourth cookbox configuration of FIG. 27.
Figure 29:
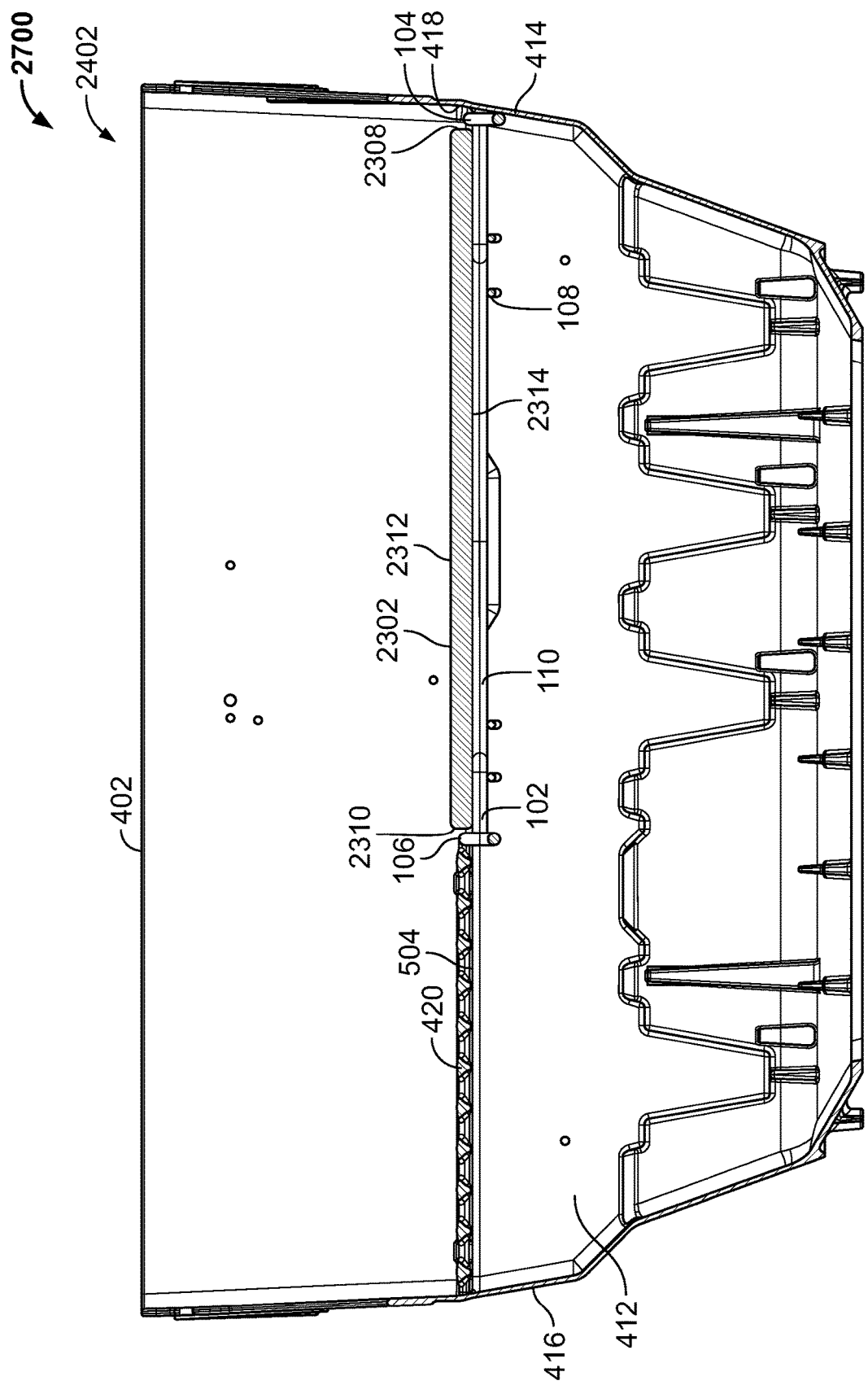
FIG. 29 is a cross-sectional view of the fourth cookbox configuration of FIGS. 27 and 28 taken along section F-F of FIG. 28.

FIG. 27 is a perspective view of the cookbox 402 of FIGS. 4-8 configured in an example fourth cookbox configuration 2700 in which the inset frame 102 of FIGS. 1-3 and 24-26 is positioned in the cookbox 402, and the cooking stone 2302 of FIGS. 23-26 is positioned in the first position 2402 on the inset frame 102. FIG. 28 is a top view of the fourth cookbox configuration 2700 of FIG. 27. FIG. 29 is a cross-sectional view of the fourth cookbox configuration 2700 of FIGS. 27 and 28 taken along section F-F of FIG. 28. As shown in FIGS. 27-29, the location and/or position of the inset frame 102 within the cookbox 402 is substantially the same as the location and/or position of the inset frame 102 within the cookbox 402 as shown and described above in connection with FIGS. 9-12. As further shown in FIGS. 27-29, the location and/or position of the cooking stone 2302 on the inset frame 102 is substantially the same as the location and/or position of the cooking stone 2302 on the inset frame 102 as shown and described above in connection with FIGS. 24-26.

In the illustrated example of FIGS. 27-29, the inset frame 102 and the cooking stone 2302 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the cooking stone 2302 respectively being located and/or positioned within the second section 424 of the opening 418 of the cookbox 402. The inset frame 102 supports, locates, and/or positions the cooking stone 2302 at a vertical elevation within the cookbox 402 that is substantially identical to a corresponding vertical elevation of the cooking grate 420 within the cookbox 402. This spatial arrangement advantageously enables the cooking grate 420 and the cooking stone 2302 to collectively provide a planar and substantially continuous cooking surface extending laterally across the opening 418 of the cookbox 402 (e.g., extending laterally between the right sidewall 414 and the left sidewall 416 of the cookbox 402).

As further shown in FIGS. 27-29, the filler grate 1702 described above in connection with FIGS. 17-22 is located and/or positioned on the inset frame 102 forward of the cooking stone 2302. In the illustrated example of FIGS. 27-29, the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the front end 2304 of the cooking stone 2302 on the one hand, and the first end 112 of the first support rod 104 and/or the first end 116 of the second support rod 106 of the inset frame 102 on the other hand. Thus, as shown in FIGS. 27-29, the filler grate 1702 substantially completely fills, covers, and/or occupies the forward portion of the inset frame 102 that is not already substantially completely filled, covered, and/or occupied by the cooking stone 2302 when the cooking stone 2302 is positioned on the inset frame 102 in the first position 2402 shown in FIGS. 24-29.

When the filler grate 1702 is positioned on the inset frame 102 in the forward position shown in FIGS. 27-29, the rear end 2004 of the filler grate 1702 is adjacent the front end 2304 of the cooking stone 2302, and the front end 2002 of the filler grate 1702 faces toward the first end 112 of the first support rod 104 and/or the first end 116 of the second support rod 106 of the inset frame 102. When the filler grate 1702 is positioned on the inset frame 102 in the forward position shown in FIGS. 27-29, the support flanges 2016 of the filler grate 1702 are located within the first recesses 142 of the second crosswise rods 122 of the inset frame 102. Locating the support flanges 2016 of the filler grate 1702 within the first recesses 142 of the second crosswise rods 122 of the inset frame 102 advantageously assists in properly positioning and/or stabilizing the filler grate 1702 relative to the inset frame 102, or relative to the cooking stone 2302 positioned on the inset frame 102 adjacent the filler grate 1702.

The cooking stone 2302 of FIGS. 23-29 can alternatively be positioned in a second position on the inset frame 102 that is generally opposite the first position 2402 of the cooking stone 2302 on the inset frame 102. When the cooking stone 2302 is located and/or positioned on the inset frame 102 in the second position, the front end 2304 of the cooking stone 2302 is adjacent (e.g., flush with) the first end 112 of the first support rod 104 of the inset frame 102, and/or adjacent (e.g., flush with) the first end 116 of the second support rod 106 of the inset frame 102. The rear end 2306 of the cooking stone 2302 is spaced apart from the second end 114 of the first support rod 104 of the inset frame 102, and/or spaced apart from the second end 118 of the second support rod 106 of the inset frame 102.

When the cooking stone 2302 is located and/or positioned on the inset frame 102 in the second position, the above-described filler grate 1702 can be located and/or positioned on the inset frame 102 rearward of the cooking stone 2302, whereby the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the rear end 2306 of the cooking stone 2302 on the one hand, and the second end 114 of the first support rod 104 and/or the second end 118 of the second support rod 106 of the inset frame 102 on the other hand. Thus, the filler grate 1702 can substantially completely fill, cover, and/or occupy the rearward portion of the inset frame 102 that is not already substantially completely filled, covered, and/or occupied by the cooking stone 2302 when the cooking stone 2302 is positioned on the inset frame 102 in the second position described above.

When the filler grate 1702 is positioned on the inset frame 102 in the rearward position, the rear end 2004 of the filler grate 1702 is reoriented to be adjacent the rear end 2306 of the cooking stone 2302, and the front end 2002 of the filler grate 1702 is reoriented to face toward the second end 114 of the first support rod 104 and/or the second end 118 of the second support rod 106 of the inset frame 102. When the filler grate 1702 is positioned on the inset frame 102 in the rearward position, the support flanges 2016 of the filler grate 1702 are located within the second recesses 144 of the second crosswise rods 122 of the inset frame 102. Locating the support flanges 2016 of the filler grate 1702 within the second recesses 144 of the second crosswise rods 122 of the inset frame 102 advantageously assists in properly positioning and/or stabilizing the filler grate 1702 relative to the inset frame 102, or relative to the cooking stone 2302 positioned on the inset frame 102 adjacent the filler grate 1702.

Figure 30:
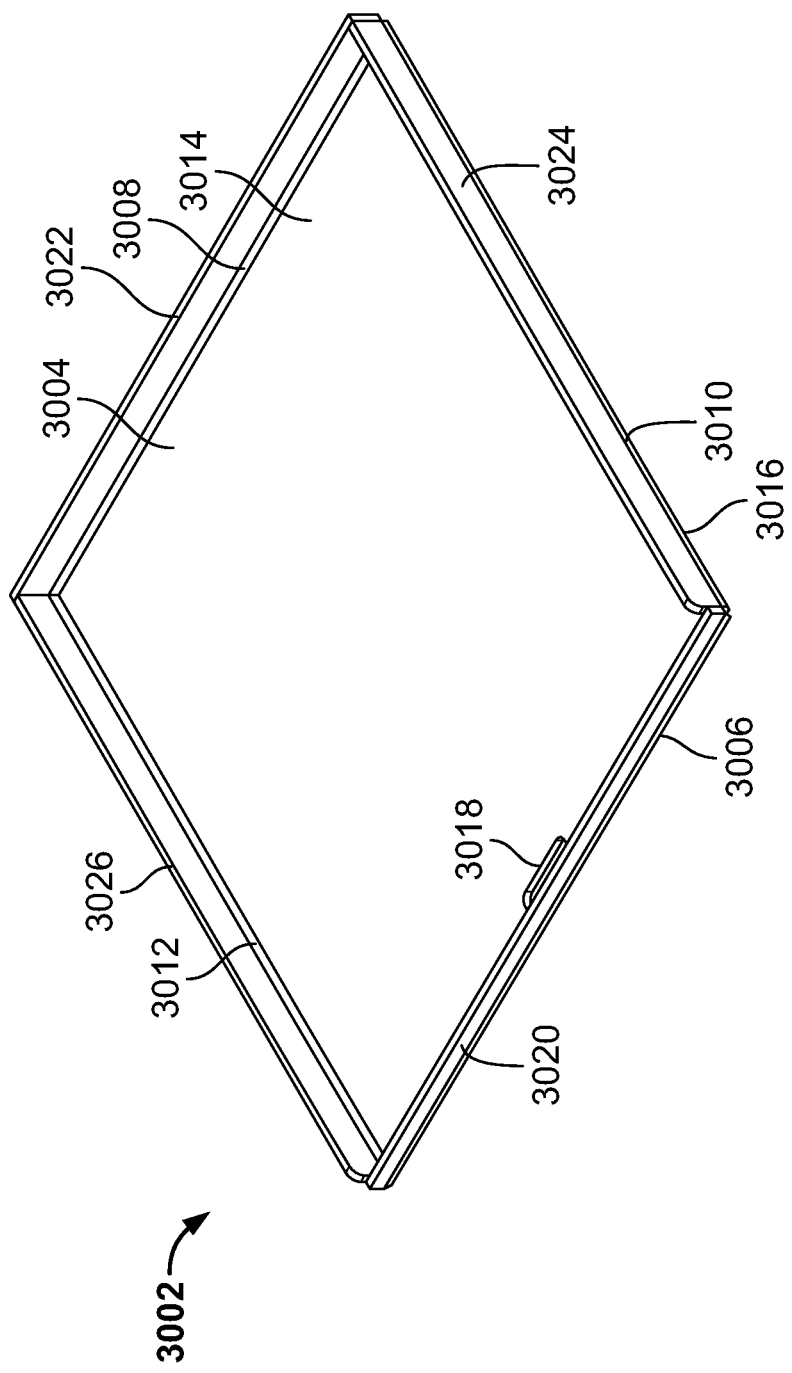
FIG. 30 is a perspective view of an example griddle constructed in accordance with teachings of this disclosure.

FIG. 30 is a perspective view of an example griddle 3002 constructed in accordance with teachings of this disclosure. The griddle 3002 of FIG. 30 includes an example base 3004 having an example front end 3006, an example rear end 3008 located opposite the front end 3006, an example right side 3010 extending between the front end 3006 and the rear end 3008, and an example left side 3012 located opposite the right side 3010 and extending between the front end 3006 and the rear end 3008. The base 3004 of the griddle 3002 has a length ($L_{GR}$) extending between and defined by the front end 3006 and the rear end 3008 of the base 3004 of the griddle 3002, and a width ($W_{GR}$) extending between and defined by the right side 3010 and the left side 3012 of the base 3004 of the griddle 3002. In the illustrated example of FIG. 30, the base 3004 of the griddle 3002 has a generally rectangular profile defined by the front end 3006, the rear end 3008, the right side 3010, and the left side 3012 of the base 3004 of the griddle 3002. In other examples, the base 3004 of the griddle 3002 can instead have a non-rectangular profile (e.g., a circular profile, an elliptical profile, a triangular profile, a trapezoidal profile, a hexagonal profile, etc.).

The base 3004 of the griddle 3002 of FIG. 30 further includes an example top surface 3014 extending between the front end 3006, the rear end 3008, the right side 3010, and the left side 3012 of the base 3004, as well as an example bottom surface 3016 located opposite the top surface 3014 and extending between the front end 3006, the rear end 3008, the right side 3010, and the left side 3012 of the base 3004. The base 3004 of the griddle 3002 is configured such that the top surface 3014 constitutes a surface for cooking one or more items of food (e.g., eggs, pancakes, toasted sandwiches, etc.) placed in contact with the top surface 3014 when the griddle 3002 is positioned within the cookbox 402 of the grill 400 (e.g., on the inset frame 102) over an underlying heat source.

The griddle 3002 of FIG. 30 further includes an example opening 3018 (e.g., a through hole) extending from the top surface 3014 through to the bottom surface 3016 of the base 3004 of the griddle 3002. The opening 3018 facilitates the removal and/or drainage of grease and/or other cooking byproducts from the top surface 3014 of the base 3004 of the griddle 3002. In the illustrated example of FIG. 30, the opening 3018 is located proximate the front end 3006 of the base 3004 of the griddle 3002. In other examples, the opening 3018 can instead be located proximate the rear end 3008, the right side 3010, or the left side 3012 of the base 3004 of the griddle 3002.

The griddle 3002 of FIG. 30 further includes an example front wall 3020, an example rear wall 3022 located opposite the front wall 3020, an example right sidewall 3024 extending between the front wall 3020 and the rear wall 2022, and an example left sidewall 3026 located opposite the right sidewall 3024 and extending between the front wall 3020 and the rear wall 3022. The front wall 3020 extends upwardly from the front end 3006 of the base 3004 of the griddle 3002. The rear wall 3022 extends upwardly from the rear end 3008 of the base 3004 of the griddle 3002. The right sidewall 3024 extends upwardly from the right side 3010 of the base 3004 of the griddle 3002. The left sidewall 3026 extends upwardly from the left side 3012 of the base 3004 of the griddle 3002. In the illustrated example of FIG. 30, the front wall 3020, the rear wall 3022, the right sidewall 3024, and the left sidewall 3026 provide corresponding vertical boundaries to the base 3004 of the griddle 3002, with such vertical boundaries assisting to prevent any food item(s) that are being cooked on the top surface 3014 of the base 3004 of the griddle 3002 from moving beyond the front end 3006, the rear end 3008, the right side 3010, and/or the left side 3012 of the base 3004 of the griddle 3002. In other examples, one or more of the front wall 3020, the rear wall 3022, the right sidewall 3024, and/or the left sidewall 3026 may be omitted from the griddle 3002.

Figure 31:
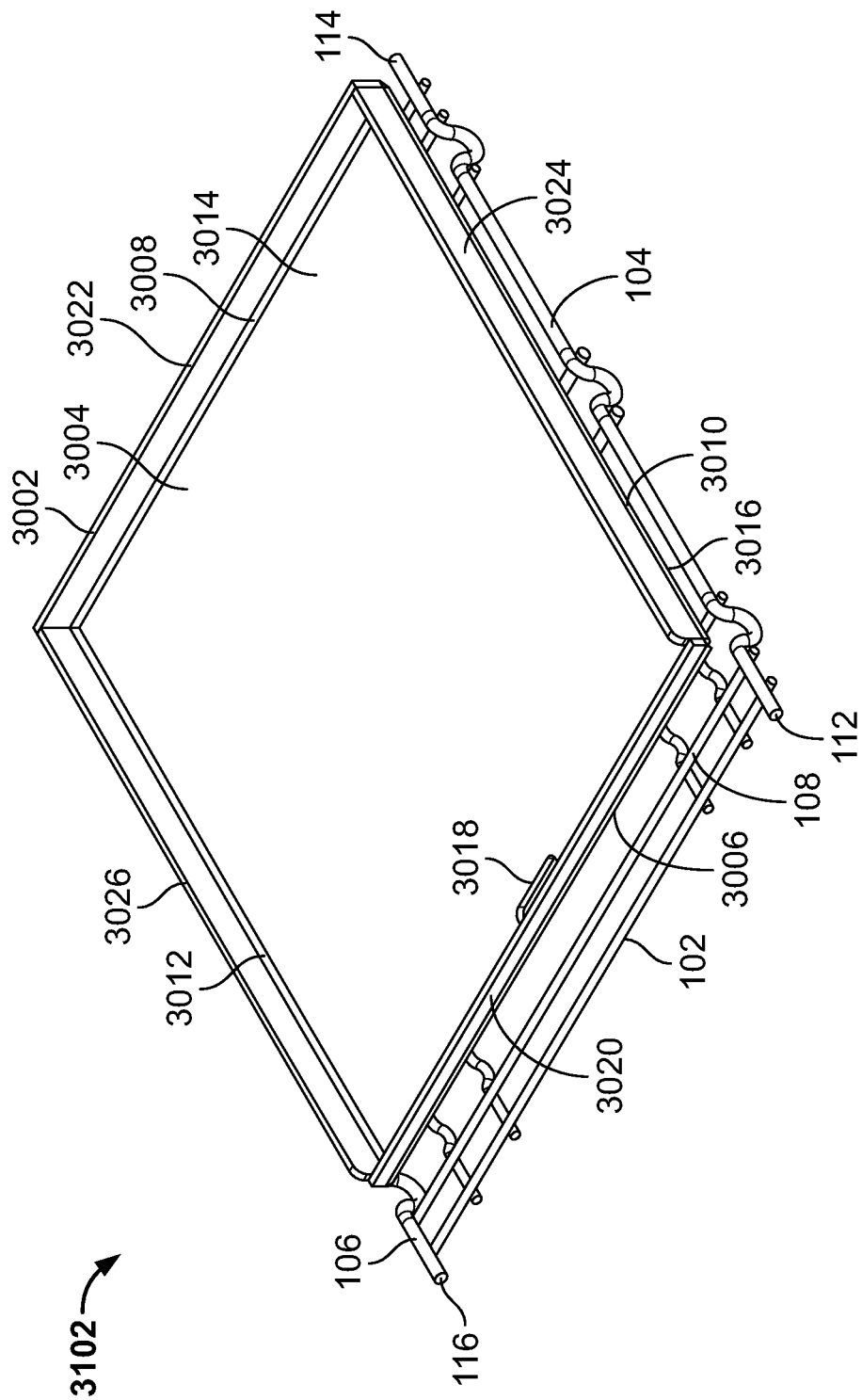
FIG. 31 is a perspective view of the griddle of FIG. 30, with the griddle shown positioned in an example first position on the inset frame of FIGS. 1-3.
Figure 32:
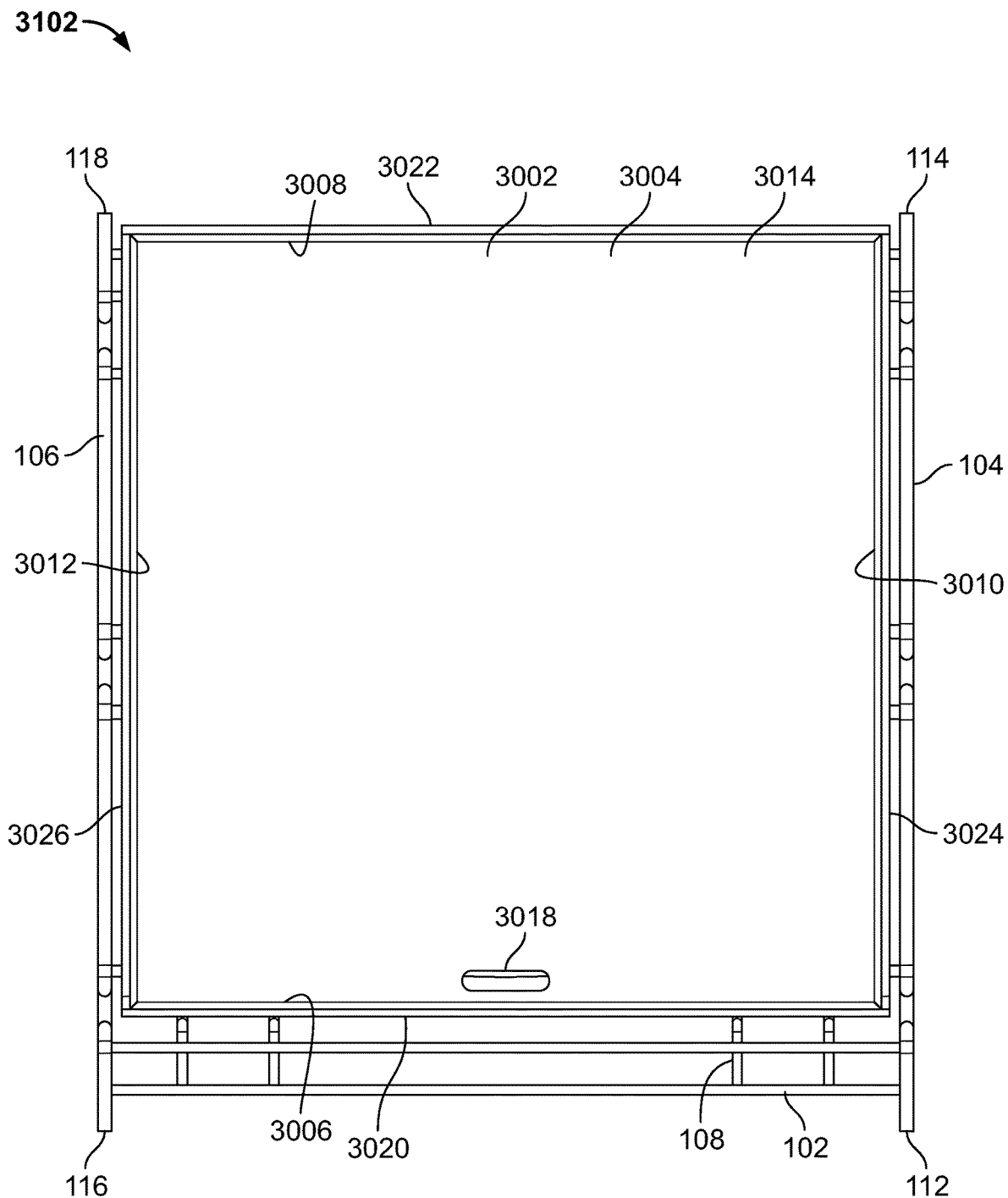
FIG. 32 is a top view of the griddle of FIGS. 30 and 31, with the griddle shown positioned in the first position on the inset frame of FIGS. 1-3 and 31.
Figure 33:
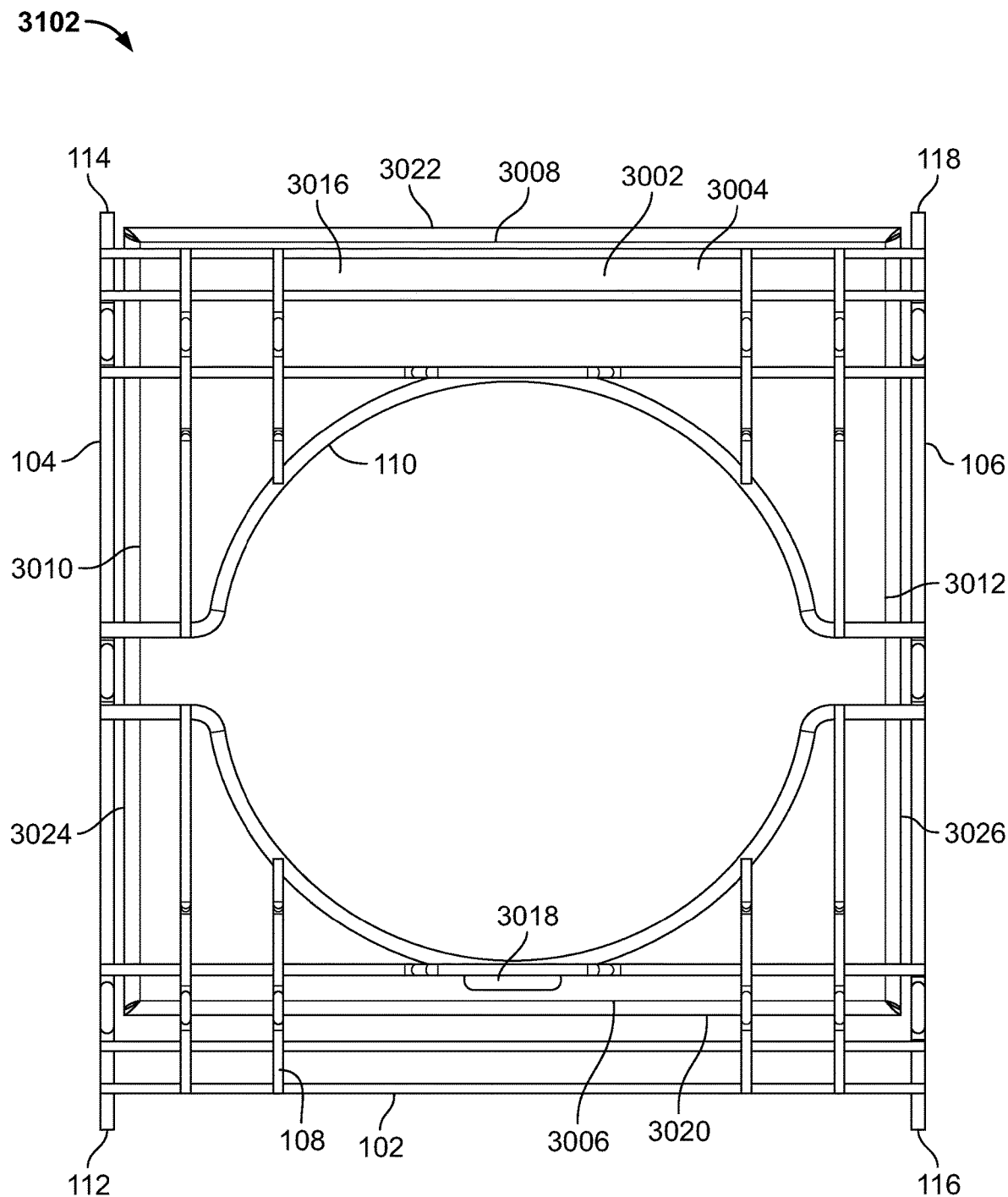
FIG. 33 is a bottom view of the griddle of FIGS. 30-32, with the griddle shown positioned in the first position on the inset frame of FIGS. 1-3, 31, and 32.

FIG. 31 is a perspective view of the griddle 3002 of FIG. 30, with the griddle 3002 shown positioned in an example first position 3102 on the inset frame 102 of FIGS. 1-3. FIG. 32 is a top view of the griddle 3002 of FIGS. 30 and 31, with the griddle 3002 shown positioned in the first position 3102 on the inset frame 102 of FIGS. 1-3 and 31. FIG. 33 is a bottom view of the griddle 3002 of FIGS. 30-32, with the griddle 3002 shown positioned in the first position 3102 on the inset frame 102 of FIGS. 1-3, 31, and 32. In the illustrated example of FIGS. 31-33, the support lattice 108 and/or, more generally, the inset frame 102 supports the bottom surface 3016 of the base 3004 of the griddle 3002, with the bottom surface 3016 of the base 3004 of the griddle 3002 extending fully over and/or across the central opening 110 of the support lattice 108. The width ($W_{GR}$) of the base 3004 of the griddle 3002 substantially fills, covers, and/or occupies the width (W) of the inset frame 102. For example, as shown in FIGS. 31-33, the right side 3010 of the base 3004 of the griddle 3002 is located and/or positioned adjacent the first support rod 104 of the inset frame 102, and the left side 3012 of the base 3004 of the griddle 3002 is located and/or positioned adjacent the second support rod 106 of the inset frame 102. The first support rod 104 and the second support rod 106 of the inset frame 102 respectively provide lateral boundaries and/or mechanical stops that restrict and/or prevent lateral movement and/or sliding of the base 3004 of the griddle 3002 relative to the inset frame 102. This benefit is accomplished as a result of the first support rod 104 and the second support rod 106 of the inset frame 102 both being elevated and/or raised above the planar support surface provided by the support lattice 108.

In the illustrated example of FIGS. 31-33, the length ($L_{GR}$) of the base 3004 of the griddle 3002 is less than the length (L) of the inset frame 102. This difference in lengths enables the base 3004 of the griddle 3002 to be located and/or positioned on the inset frame 102 in either the first position 3102 (e.g., a rearward position) shown in FIGS. 31-33 (and subsequently shown and described in connection with FIGS. 34-36), or in a second position (e.g., a forward position). When the base 3004 of the griddle 3002 is located and/or positioned on the inset frame 102 in the first position 3102 shown in FIGS. 31-33, the rear end 3008 of the base 3004 of the griddle 3002 is adjacent (e.g., flush with) the second end 114 of the first support rod 104 of the inset frame 102, and/or adjacent (e.g., flush with) the second end 118 of the second support rod 106 of the inset frame 102. The front end 3006 of the base 3004 of the griddle 3002 is spaced apart from the first end 112 of the first support rod 104 of the inset frame 102, and/or spaced apart from the first end 116 of the second support rod 106 of the inset frame 102.

In other examples, the length ($L_{GR}$) of the base 3004 of the griddle 3002 can instead substantially fill, cover, and/or occupy the length (L) of the inset frame 102, such that the base 3004 of the griddle 3002 can only be located and/or positioned on the inset frame 102 in a single lengthwise position. In such other examples, the front end 3006 of the base 3004 of the griddle 3002 is adjacent (e.g., flush with) the first end 112 of the first support rod 104 of the inset frame 102, and/or adjacent (e.g., flush with) the first end 116 of the second support rod 106 of the inset frame 102, and the rear end 3008 of the base 3004 of the griddle 3002 is adjacent (e.g., flush with) the second end 114 of the first support rod 104 of the inset frame 102, and/or adjacent (e.g., flush with) the second end 118 of the second support rod 106 of the inset frame 102.

Figure 34:
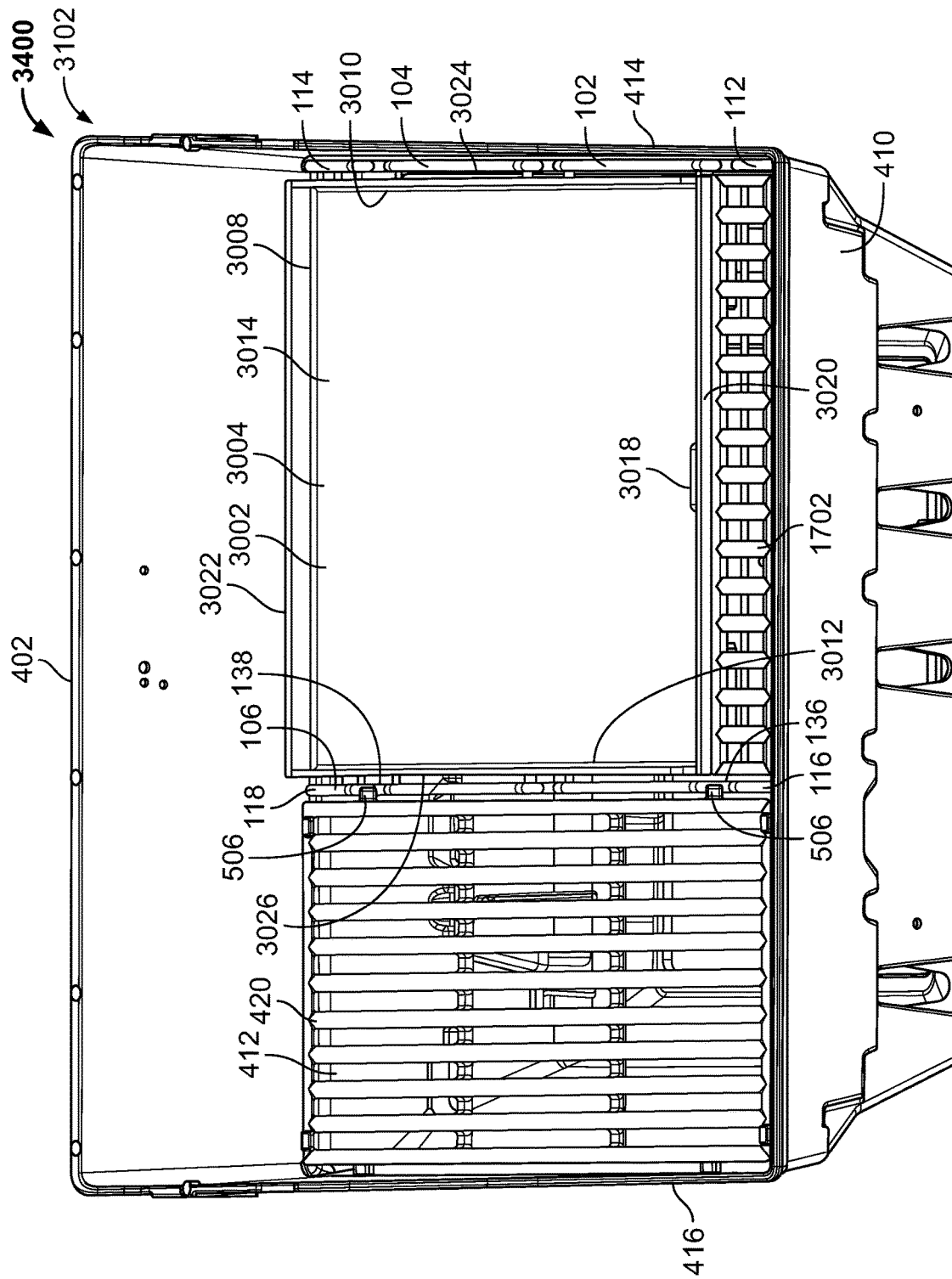
FIG. 34 is a perspective view of the cookbox of FIGS. 4-8 configured in an example fifth cookbox configuration in which the inset frame of FIGS. 1-3 and 31-33 is positioned in the cookbox, and the griddle of FIGS. 30-33 is positioned in the first position on the inset frame.
Figure 35:
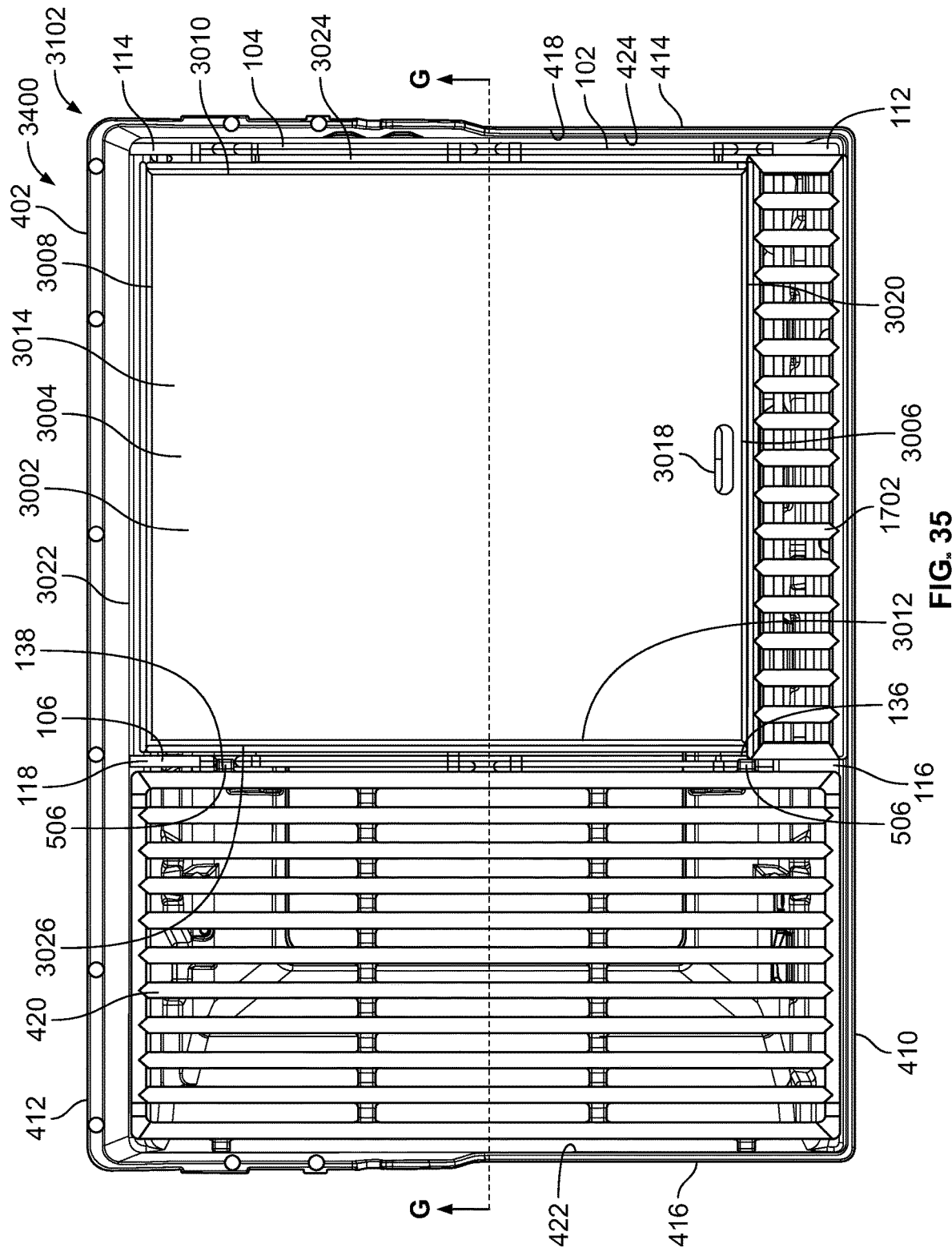
FIG. 35 is a top view of the fifth cookbox configuration of FIG. 34.
Figure 36:
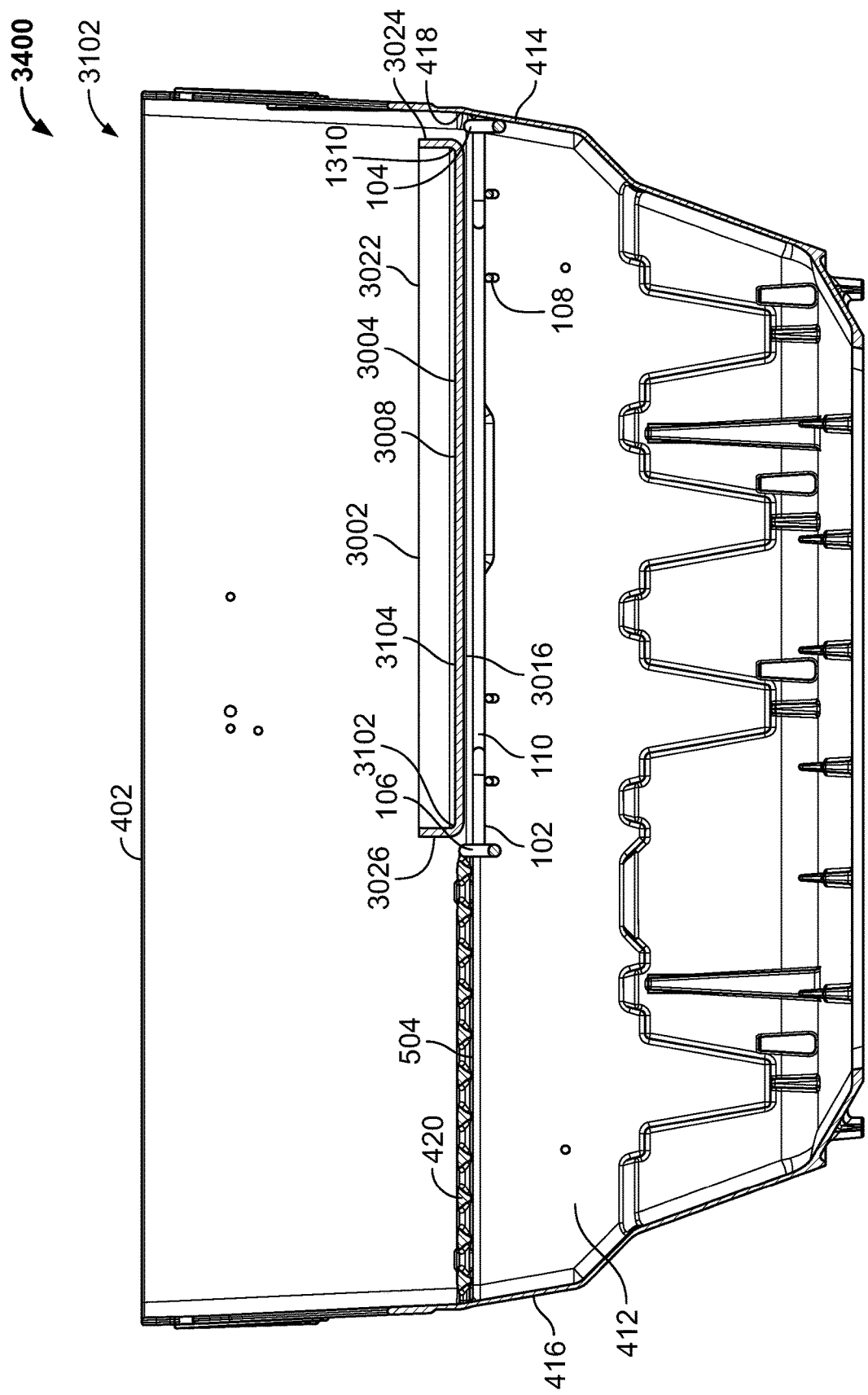
FIG. 36 is a cross-sectional view of the fifth cookbox configuration of FIGS. 34 and 35 taken along section G-G of FIG. 35.

FIG. 34 is a perspective view of the cookbox 402 of FIGS. 4-8 configured in an example fifth cookbox configuration 3400 in which the inset frame 102 of FIGS. 1-3 and 31-33 is positioned in the cookbox 402, and the griddle 3002 of FIGS. 30-33 is positioned in the first position 3102 on the inset frame 102. FIG. 35 is a top view of the fifth cookbox configuration 3400 of FIG. 34. FIG. 36 is a cross-sectional view of the fifth cookbox configuration 3400 of FIGS. 34 and 35 taken along section G-G of FIG. 35. As shown in FIGS. 34-36, the location and/or position of the inset frame 102 within the cookbox 402 is substantially the same as the location and/or position of the inset frame 102 within the cookbox 402 as shown and described above in connection with FIGS. 9-12. As further shown in FIGS. 34-36, the location and/or position of the griddle 3002 on the inset frame 102 is substantially the same as the location and/or position of the griddle 3002 on the inset frame 102 as shown and described above in connection with FIGS. 31-33.

In the illustrated example of FIGS. 34-36, the inset frame 102 and the griddle 3002 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the griddle 3002 respectively being located and/or positioned within the second section 424 of the opening 418 of the cookbox 402. The inset frame 102 supports, locates, and/or positions the base 3004 of the griddle 3002 at a vertical elevation within the cookbox 402 that is substantially identical to a corresponding vertical elevation of the cooking grate 420 within the cookbox 402. This spatial arrangement advantageously enables the cooking grate 420 and the griddle 3002 to collectively provide co-planar cooking surfaces arranged laterally across the opening 418 of the cookbox 402.

As further shown in FIGS. 34-36, the filler grate 1702 described above in connection with FIGS. 17-22 is located and/or positioned on the inset frame 102 forward of the griddle 3002. In the illustrated example of FIGS. 34-36, the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the front end 3006 of the base 3004 of the griddle 3002 on the one hand, and the first end 112 of the first support rod 104 and/or the first end 116 of the second support rod 106 of the inset frame 102 on the other hand. Thus, as shown in FIGS. 34-36, the filler grate 1702 substantially completely fills, covers, and/or occupies the forward portion of the inset frame 102 that is not already substantially completely filled, covered, and/or occupied by the base 3004 of the griddle 3002 when the griddle 3002 is positioned on the inset frame 102 in the first position 3102 shown in FIGS. 31-36.

When the filler grate 1702 is positioned on the inset frame 102 in the forward position shown in FIGS. 34-36, the rear end 2004 of the filler grate 1702 is adjacent the front end 3006 of the base 3004 of the griddle 3002, and the front end 2002 of the filler grate 1702 faces toward the first end 112 of the first support rod 104 and/or the first end 116 of the second support rod 106 of the inset frame 102. When the filler grate 1702 is positioned on the inset frame 102 in the forward position shown in FIGS. 34-36, the support flanges 2016 of the filler grate 1702 are located within the first recesses 142 of the second crosswise rods 122 of the inset frame 102. Locating the support flanges 2016 of the filler grate 1702 within the first recesses 142 of the second crosswise rods 122 of the inset frame 102 advantageously assists in properly positioning and/or stabilizing the filler grate 1702 relative to the inset frame 102, or relative to the griddle 3002 positioned on the inset frame 102 adjacent the filler grate 1702.

The griddle 3002 of FIGS. 30-36 can alternatively be positioned in a second position on the inset frame 102 that is generally opposite the first position 3102 of the griddle 3002 on the inset frame 102. When the griddle 3002 is located and/or positioned on the inset frame 102 in the second position, the front end 3006 of the base 3004 of the griddle 3002 is adjacent (e.g., flush with) the first end 112 of the first support rod 104 of the inset frame 102, and/or adjacent (e.g., flush with) the first end 116 of the second support rod 106 of the inset frame 102. The rear end 3008 of the base 3004 of the griddle 3002 is spaced apart from the second end 114 of the first support rod 104 of the inset frame 102, and/or spaced apart from the second end 118 of the second support rod 106 of the inset frame 102.

When the griddle 3002 is located and/or positioned on the inset frame 102 in the second position, the above-described filler grate 1702 can be located and/or positioned on the inset frame 102 rearward of the griddle 3002, whereby the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the rear end 3008 of the base 3004 of the griddle 3002 on the one hand, and the second end 114 of the first support rod 104 and/or the second end 118 of the second support rod 106 of the inset frame 102 on the other hand. Thus, the filler grate 1702 can substantially completely fill, cover, and/or occupy the rearward portion of the inset frame 102 that is not already substantially completely filled, covered, and/or occupied by the base 3004 of the griddle 3002 when the griddle 3002 is positioned on the inset frame 102 in the second position described above.

When the filler grate 1702 is positioned on the inset frame 102 in the rearward position, the rear end 2004 of the filler grate 1702 is reoriented to be adjacent the rear end 3008 of the base 3004 of the griddle 3002, and the front end 2002 of the filler grate 1702 is reoriented to face toward the second end 114 of the first support rod 104 and/or the second end 118 of the second support rod 106 of the inset frame 102. When the filler grate 1702 is positioned on the inset frame 102 in the rearward position, the support flanges 2016 of the filler grate 1702 are located within the second recesses 144 of the second crosswise rods 122 of the inset frame 102. Locating the support flanges 2016 of the filler grate 1702 within the second recesses 144 of the second crosswise rods 122 of the inset frame 102 advantageously assists in properly positioning and/or stabilizing the filler grate 1702 relative to the inset frame 102, or relative to the griddle 3002 positioned on the inset frame 102 adjacent the filler grate 1702.

Figure 37:
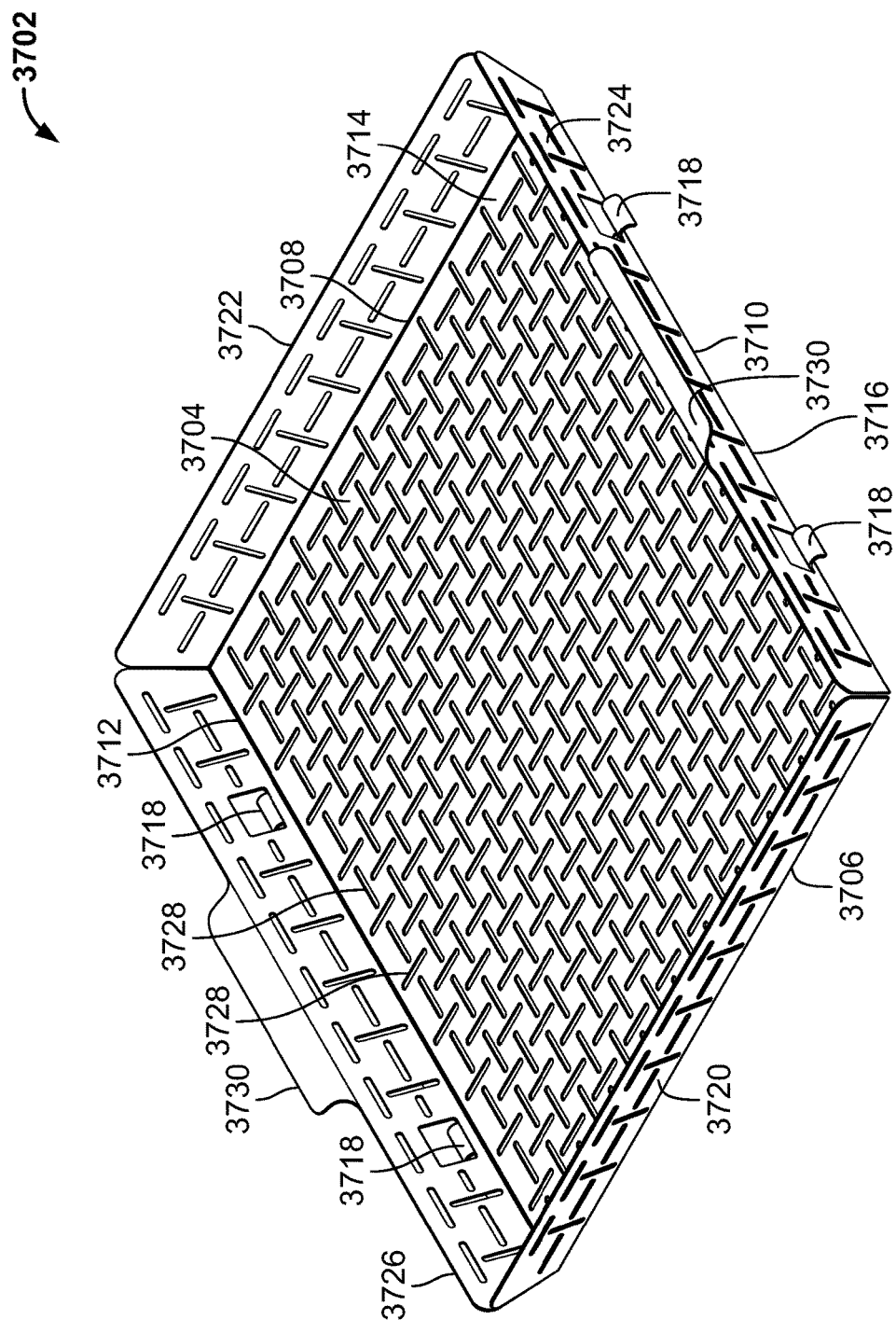
FIG. 37 is a perspective view of an example grilling basket constructed in accordance with teachings of this disclosure.

FIG. 37 is a perspective view of an example grilling basket 3702 constructed in accordance with teachings of this disclosure. The grilling basket 3702 of FIG. 37 includes an example base 3704 having an example front end 3706, an example rear end 3708 located opposite the front end 3706, an example right side 3710 extending between the front end 3706 and the rear end 3708, and an example left side 3712 located opposite the right side 3710 and extending between the front end 3706 and the rear end 3708. The base 3704 of the grilling basket 3002 has a length ($L_{GB}$) extending between and defined by the front end 3706 and the rear end 3708 of the base 3704 of the grilling basket 3702, and a width ($W_{GB}$) extending between and defined by the right side 3710 and the left side 3712 of the base 3704 of the grilling basket 3702. In the illustrated example of FIG. 37, the base 3704 of the grilling basket 3702 has a generally rectangular profile defined by the front end 3706, the rear end 3708, the right side 3710, and the left side 3712 of the base 3704 of the grilling basket 3702. In other examples, the base 3704 of the grilling basket 3702 can instead have a non-rectangular profile (e.g., a circular profile, an elliptical profile, a triangular profile, a trapezoidal profile, a hexagonal profile, etc.).

The base 3704 of the grilling basket 3702 of FIG. 37 further includes an example top surface 3714 extending between the front end 3706, the rear end 3708, the right side 3710, and the left side 3712 of the base 3704, as well as an example bottom surface 3716 located opposite the top surface 3714 and extending between the front end 3706, the rear end 3708, the right side 3710, and the left side 3712 of the base 3704. The base 3704 of the grilling basket 3702 is configured such that the top surface 3714 constitutes a surface for cooking one or more items of food (e.g., vegetables, chicken wings, shrimp, etc.) placed in contact with the top surface 3714 when the grilling basket 3702 is positioned within the cookbox 402 of the grill 400 (e.g., on the inset frame 102) over an underlying heat source.

The grilling basket 3702 of FIG. 37 further includes an example front wall 3720, an example rear wall 3722 located opposite the front wall 3720, an example right sidewall 3724 extending between the front wall 3720 and the rear wall 2722, and an example left sidewall 3726 located opposite the right sidewall 3724 and extending between the front wall 3720 and the rear wall 3722. The front wall 3720 extends upwardly from the front end 3706 of the base 3704 of the grilling basket 3702. The rear wall 3722 extends upwardly from the rear end 3708 of the base 3704 of the grilling basket 3702. The right sidewall 3724 extends upwardly from the right side 3710 of the base 3704 of the grilling basket 3702. The left sidewall 3726 extends upwardly from the left side 3712 of the base 3704 of the grilling basket 3702. In the illustrated example of FIG. 37, the front wall 3720, the rear wall 3722, the right sidewall 3724, and the left sidewall 3726 provide corresponding vertical boundaries to the base 3704 of the grilling basket 3702, with such vertical boundaries assisting to prevent any food item(s) that are being cooked on the top surface 3714 of the base 3704 of the grilling basket 3702 from escaping the grilling basket 3702.

The grilling basket 3702 of FIG. 37 further includes example feet 3718 extending outwardly from the right sidewall 3724 (e.g., proximate the right side 3710 of the base 3704) and from the left sidewall 3726 (e.g., proximate the left side 3712 of the base 3704) of the grilling basket 3702. In the illustrated example of FIG. 37, the grilling basket includes a first pair of the feet 3718 located along the right side 3710 of the base 3704 of the grilling basket 3702, and a second pair of the feet 3718 located along the left side 3712 of the base 3704 of the grilling basket 3702. The feet 3718 are respectively configured to be positioned on and/or to attach to the first support rod 104 and/or the second support rod 106 of the inset frame 102, thereby stabilizing the base 3704 of the grilling basket 3702 relative to the inset frame 102. The feet 3718 accordingly function as mechanical stops that restrict and/or prevent lateral movement and/or sliding of the base 3704 of the grilling basket 3702 relative to the inset frame 102.

The grilling basket 3702 of FIG. 37 further includes example openings 3728 (e.g., through holes) located on the base 3004, the front wall 3720, the rear wall 3722, the right sidewall 3724, and the left sidewall 3726 of the grilling basket 3702 and extending respectively therethrough. The openings 3728 are configured to facilitate the passage of heated air into the interior of the grilling basket 3702, and also facilitate the removal and/or drainage of grease and/or other cooking byproducts from within the interior of the grilling basket 3702. The grilling basket 3702 of FIG. 37 further includes example handles 3730 extending outwardly from the right sidewall 3724 and the left sidewall 3726 of the grilling basket 3702. The handles 3730 are configured to improve the ease with which an end user can position the grilling basket 3702 onto and/or remove the grilling basket 3702 from the inset frame 102 of FIGS. 1-3.

Figure 38:
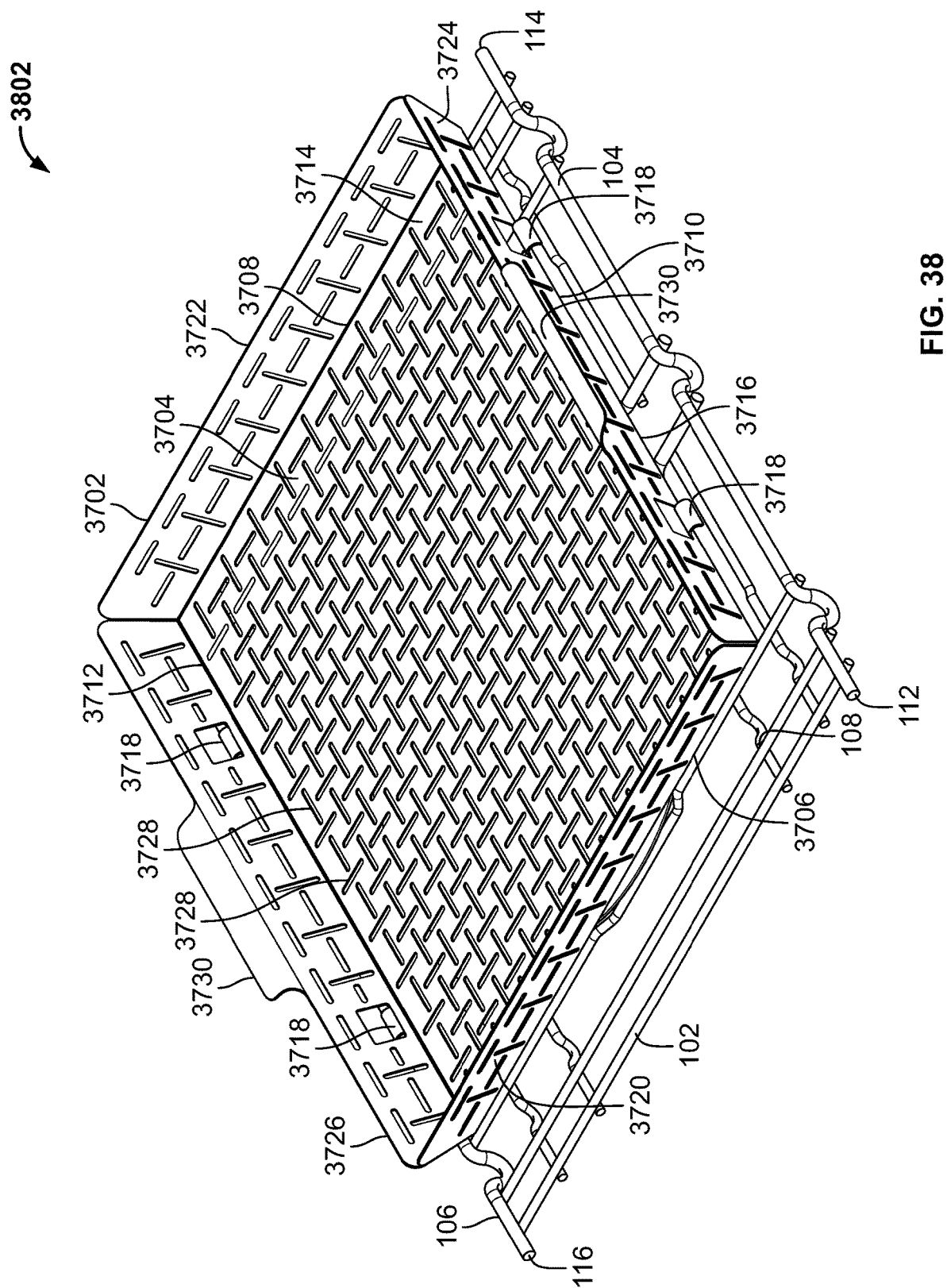
FIG. 38 is a perspective view of the grilling basket of FIG. 37, with the grilling basket shown positioned in an example first position on the inset frame of FIGS. 1-3.
Figure 39:
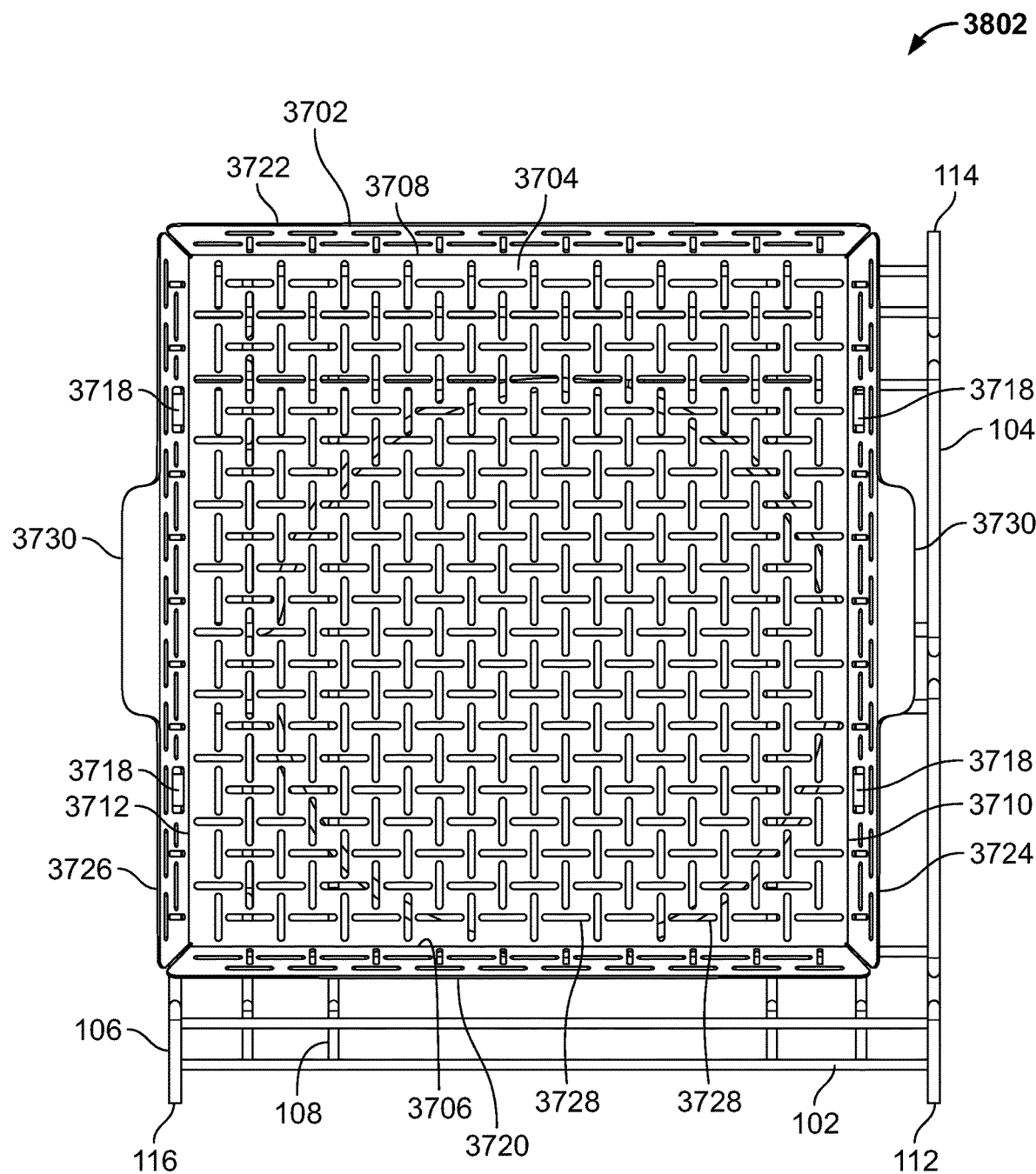
FIG. 39 is a top view of the grilling basket of FIGS. 37 and 38, with the grilling basket shown positioned in the first position on the inset frame of FIGS. 1-3 and 38.
Figure 40:
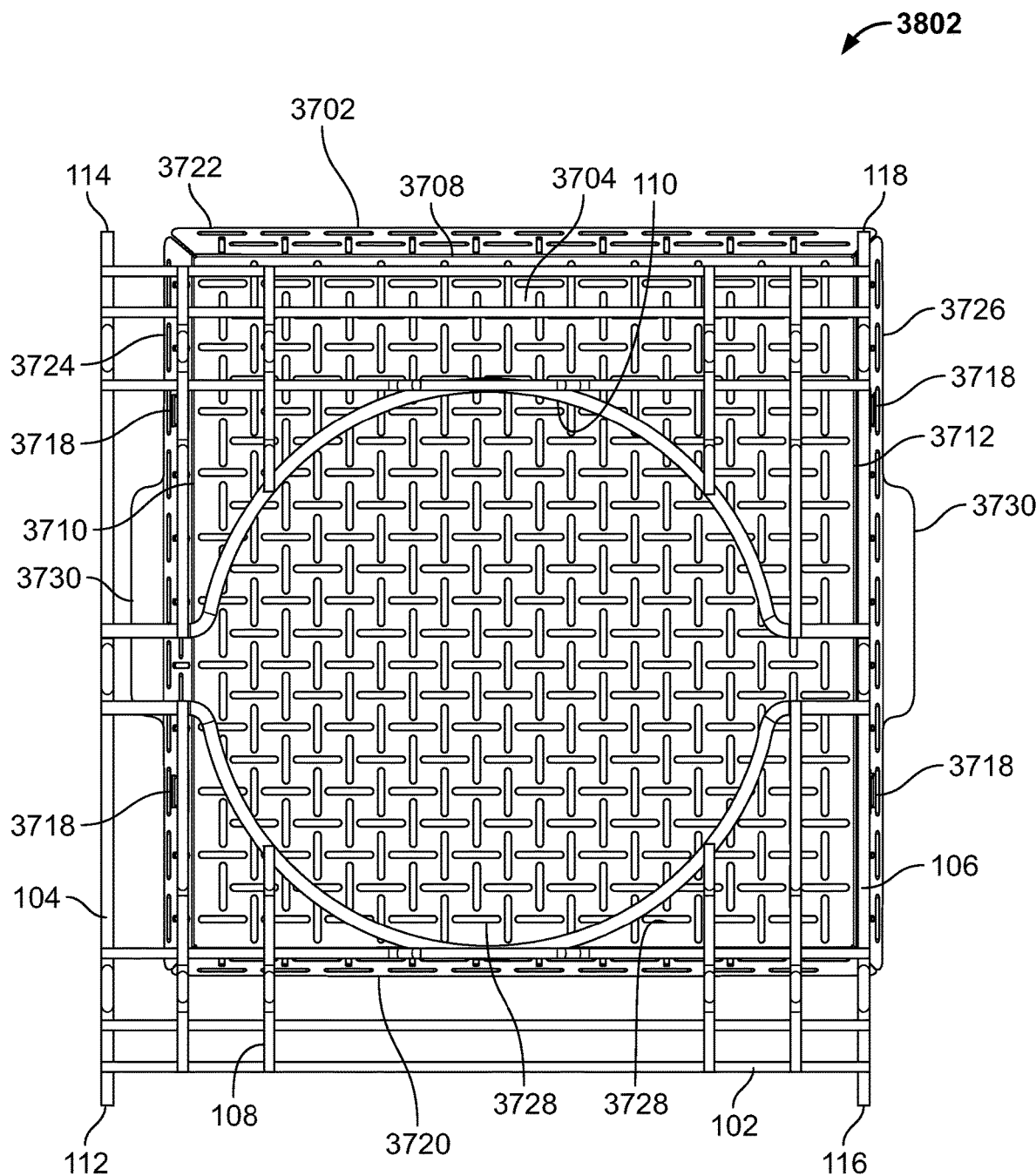
FIG. 40 is a bottom view of the grilling basket of FIGS. 37-39, with the grilling basket shown positioned in the first position on the inset frame of FIGS. 1-3, 38, and 39.

FIG. 38 is a perspective view of the grilling basket 3702 of FIG. 37, with the grilling basket 3702 shown positioned in an example first position 3802 on the inset frame 102 of FIGS. 1-3. FIG. 39 is a top view of the grilling basket 3702 of FIGS. 37 and 38, with the grilling basket 3702 shown positioned in the first position 3802 on the inset frame 102 of FIGS. 1-3 and 38. FIG. 40 is a bottom view of the grilling basket 3702 of FIGS. 37-39, with the grilling basket 3702 shown positioned in the first position 3802 on the inset frame 102 of FIGS. 1-3, 38, and 39. In the illustrated example of FIGS. 38-40, the support lattice 108 and/or, more generally, the inset frame 102 supports the bottom surface 3716 of the base 3704 of the grilling basket 3702, with the bottom surface 3716 of the base 3704 of the grilling basket 3702 extending fully over and/or across the central opening 110 of the support lattice 108. The width ($W_{GB}$) of the base 3704 of the grilling basket 3702 generally fills, covers, and/or occupies the width (W) of the inset frame 102. For example, as shown in FIGS. 38-40, the right side 3710 of the base 3704 of the grilling basket 3702 is located and/or positioned proximate the first support rod 104 of the inset frame 102, and the left side 3712 of the base 3704 of the grilling basket 3702 is located and/or positioned adjacent the second support rod 106 of the inset frame 102. The second pair of feet 3718 located along the left side 3712 of the base 3704 of the grilling basket 3702 are positioned on and/or to attached to the second support rod 106 of the inset frame 102, thereby stabilizing the base 3704 of the grilling basket 3702 relative to the inset frame 102. As described above, the feet 3718 of the grilling basket 3702 function as mechanical stops that restrict and/or prevent lateral movement and/or sliding of the base 3704 of the grilling basket 3702 relative to the inset frame 102.

In the illustrated example of FIGS. 38-40, the length ($L_{GB}$) of the base 3704 of the grilling basket 3702 is less than the length (L) of the inset frame 102. This difference in lengths enables the base 3704 of the grilling basket 3702 to be located and/or positioned on the inset frame 102 in either the first position 3802 (e.g., a rearward position) shown in FIGS. 38-40 (and subsequently shown and described in connection with FIGS. 41-43), or in a second position (e.g., a forward position). When the base 3704 of the grilling basket 3702 is located and/or positioned on the inset frame 102 in the first position 3802 shown in FIGS. 38-40, the rear end 3708 of the base 3704 of the grilling basket 3702 is adjacent (e.g., flush with) the second end 114 of the first support rod 104 of the inset frame 102, and/or adjacent (e.g., flush with) the second end 118 of the second support rod 106 of the inset frame 102. The front end 3706 of the base 3704 of the grilling basket 3702 is spaced apart from the first end 112 of the first support rod 104 of the inset frame 102, and/or spaced apart from the first end 116 of the second support rod 106 of the inset frame 102.

In other examples, the length ($L_{GB}$) of the base 3704 of the grilling basket 3702 can instead substantially fill, cover, and/or occupy the length (L) of the inset frame 102, such that the base 3704 of the grilling basket 3702 can only be located and/or positioned on the inset frame 102 in a single lengthwise position. In such other examples, the front end 3706 of the base 3704 of the grilling basket 3702 is adjacent (e.g., flush with) the first end 112 of the first support rod 104 of the inset frame 102, and/or adjacent (e.g., flush with) the first end 116 of the second support rod 106 of the inset frame 102, and the rear end 3708 of the base 3704 of the grilling basket 3702 is adjacent (e.g., flush with) the second end 114 of the first support rod 104 of the inset frame 102, and/or adjacent (e.g., flush with) the second end 118 of the second support rod 106 of the inset frame 102.

Figure 41:
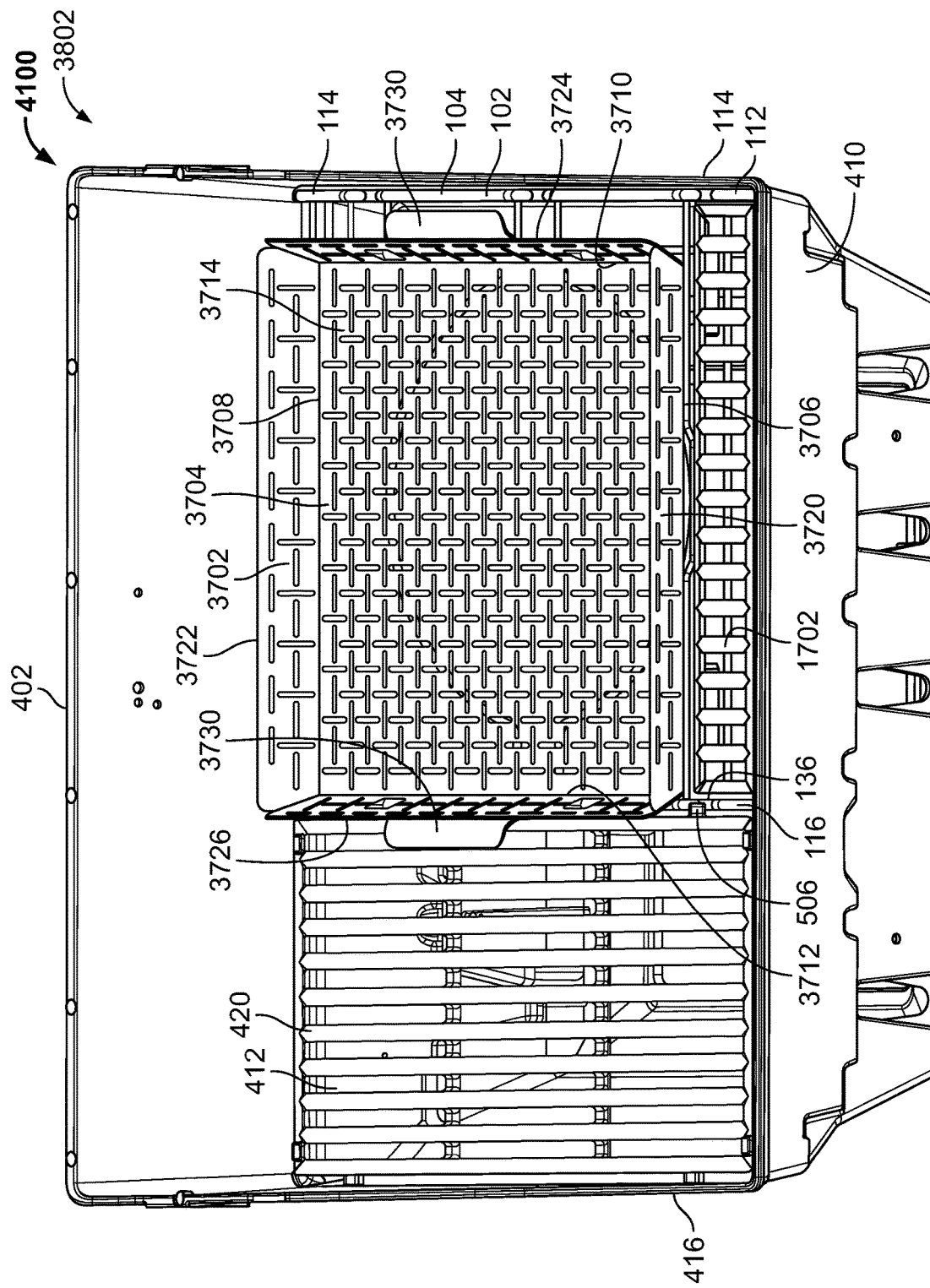
FIG. 41 is a perspective view of the cookbox of FIGS. 4-8 configured in an example sixth cookbox configuration in which the inset frame of FIGS. 1-3 and 38-40 is positioned in the cookbox, and the grilling basket of FIGS. 37-40 is positioned in the first position on the inset frame.
Figure 42:
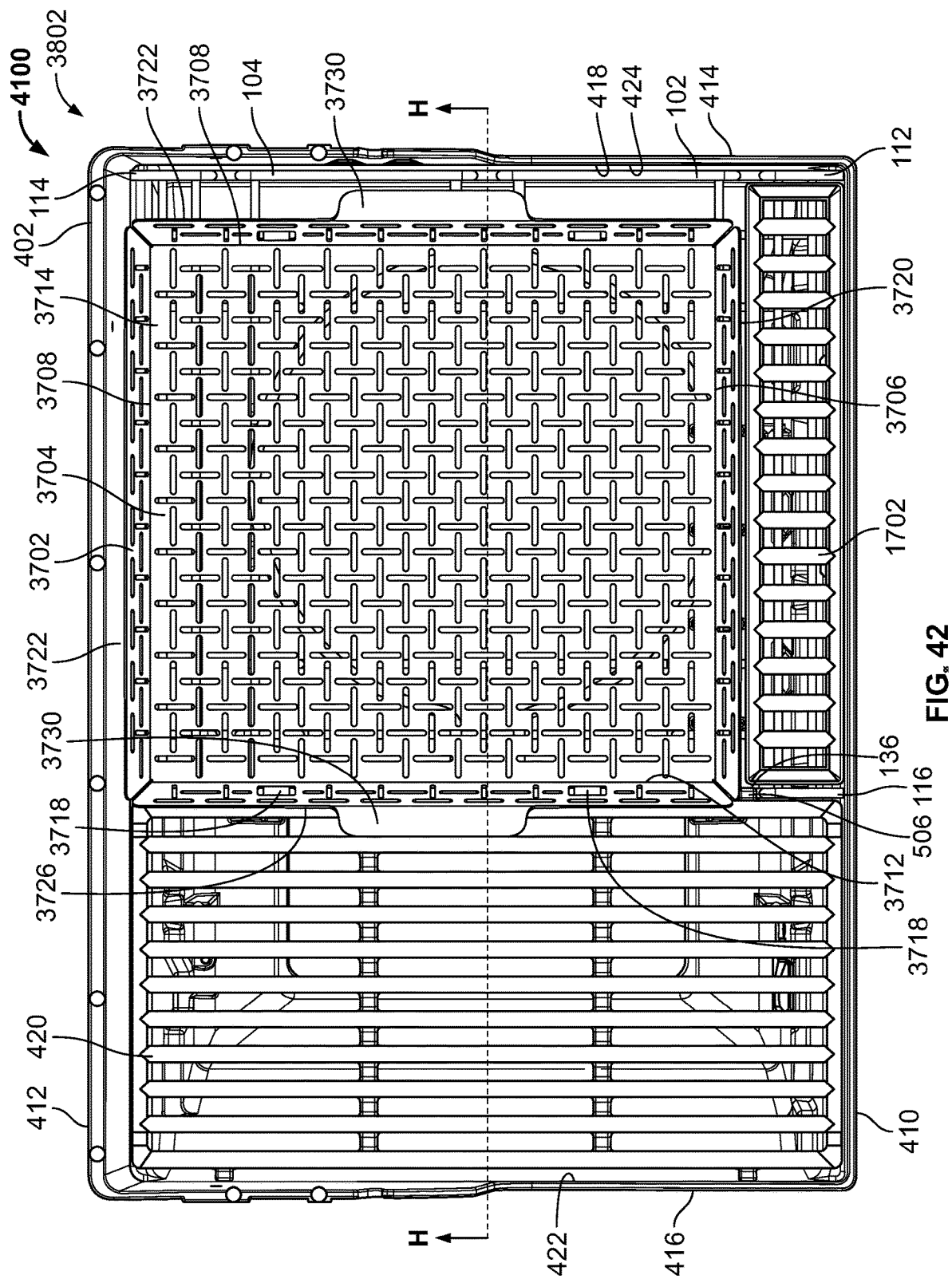
FIG. 42 is a top view of the sixth cookbox configuration of FIG. 41.
Figure 43:
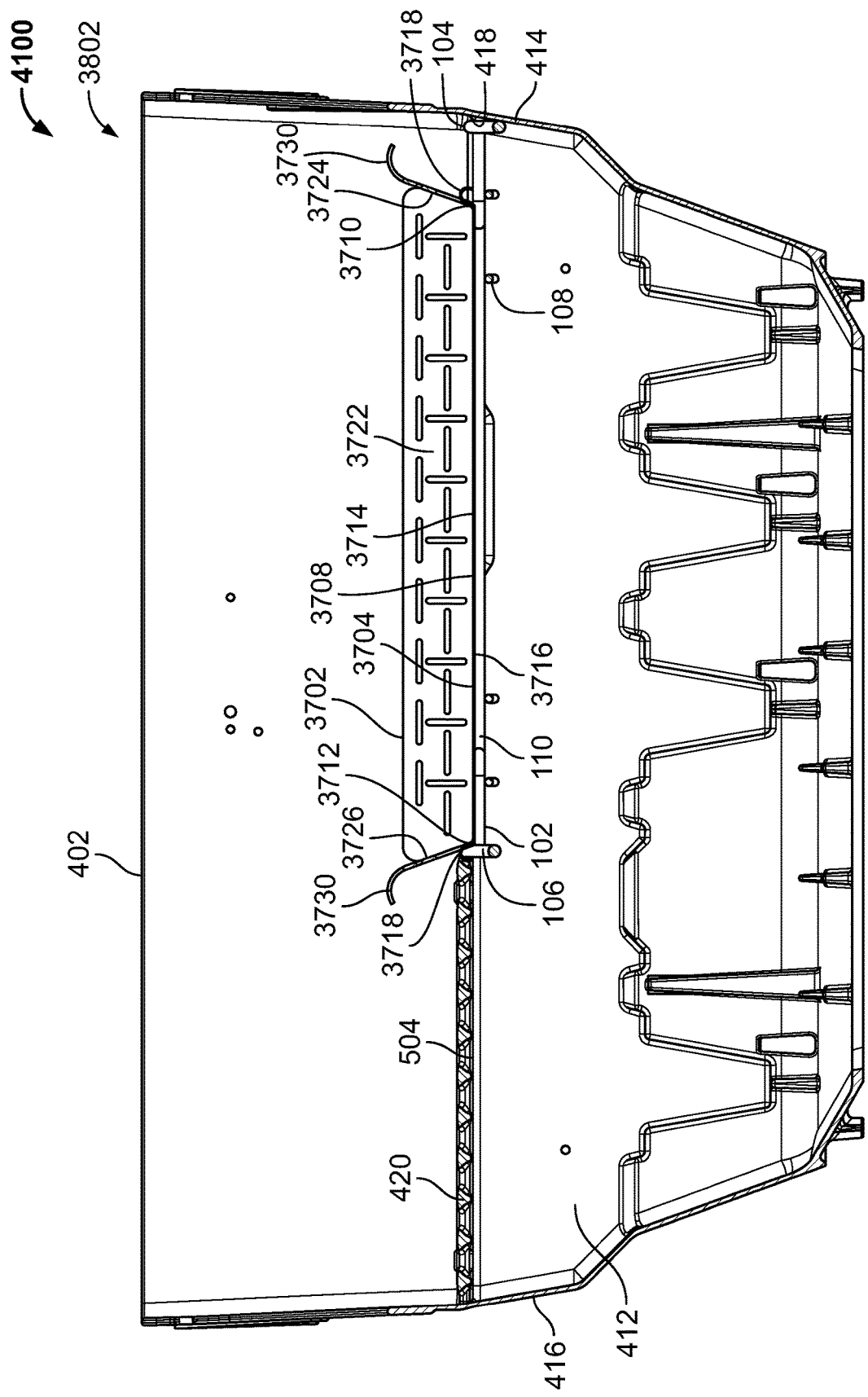
FIG. 43 is a cross-sectional view of the sixth cookbox configuration of FIGS. 41 and 42 taken along section H-H of FIG. 42.

FIG. 41 is a perspective view of the cookbox 402 of FIGS. 4-8 configured in an example sixth cookbox configuration 4100 in which the inset frame 102 of FIGS. 1-3 and 38-40 is positioned in the cookbox 402, and the grilling basket 3702 of FIGS. 37-40 is positioned in the first position 3802 on the inset frame 102. FIG. 42 is a top view of the sixth cookbox configuration 4100 of FIG. 41. FIG. 43 is a cross-sectional view of the sixth cookbox configuration 4100 of FIGS. 41 and 42 taken along section H-H of FIG. 42. As shown in FIGS. 41-43, the location and/or position of the inset frame 102 within the cookbox 402 is substantially the same as the location and/or position of the inset frame 102 within the cookbox 402 as shown and described above in connection with FIGS. 9-12. As further shown in FIGS. 41-43, the location and/or position of the grilling basket 3702 on the inset frame 102 is substantially the same as the location and/or position of the grilling basket 3702 on the inset frame 102 as shown and described above in connection with FIGS. 38-40.

In the illustrated example of FIGS. 41-43, the inset frame 102 and the grilling basket 3702 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the grilling basket 3702 respectively being located and/or positioned within the second section 424 of the opening 418 of the cookbox 402. The inset frame 102 supports, locates, and/or positions the base 3704 of the grilling basket 3702 at a vertical elevation within the cookbox 402 that is substantially identical to a corresponding vertical elevation of the cooking grate 420 within the cookbox 402. This spatial arrangement advantageously enables the cooking grate 420 and the grilling basket 3702 to collectively provide co-planar cooking surfaces arranged laterally across the opening 418 of the cookbox 402.

As further shown in FIGS. 41-43, the filler grate 1702 described above in connection with FIGS. 17-22 is located and/or positioned on the inset frame 102 forward of the grilling basket 3702. In the illustrated example of FIGS. 41-43, the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the front end 3706 of the base 3704 of the grilling basket 3702 on the one hand, and the first end 112 of the first support rod 104 and/or the first end 116 of the second support rod 106 of the inset frame 102 on the other hand. Thus, as shown in FIGS. 41-43, the filler grate 1702 substantially completely fills, covers, and/or occupies the forward portion of the inset frame 102 that is not already substantially completely filled, covered, and/or occupied by the base 3704 of the grilling basket 3702 when the grilling basket 3702 is positioned on the inset frame 102 in the first position 3802 shown in FIGS. 38-43.

When the filler grate 1702 is positioned on the inset frame 102 in the forward position shown in FIGS. 41-43, the rear end 2004 of the filler grate 1702 is adjacent the front end 3706 of the base 3704 of the grilling basket 3702, and the front end 2002 of the filler grate 1702 faces toward the first end 112 of the first support rod 104 and/or the first end 116 of the second support rod 106 of the inset frame 102. When the filler grate 1702 is positioned on the inset frame 102 in the forward position shown in FIGS. 41-43, the support flanges 2016 of the filler grate 1702 are located within the first recesses 142 of the second crosswise rods 122 of the inset frame 102. Locating the support flanges 2016 of the filler grate 1702 within the first recesses 142 of the second crosswise rods 122 of the inset frame 102 advantageously assists in properly positioning and/or stabilizing the filler grate 1702 relative to the inset frame 102, or relative to the grilling basket 3702 positioned on the inset frame 102 adjacent the filler grate 1702.

The grilling basket 3702 of FIGS. 37-43 can alternatively be positioned in a second position on the inset frame 102 that is generally opposite the first position 3802 of the grilling basket 3702 on the inset frame 102. When the grilling basket 3702 is located and/or positioned on the inset frame 102 in the second position, the front end 3706 of the base 3704 of the grilling basket 3702 is adjacent (e.g., flush with) the first end 112 of the first support rod 104 of the inset frame 102, and/or adjacent (e.g., flush with) the first end 116 of the second support rod 106 of the inset frame 102. The rear end 3708 of the base 3704 of the grilling basket 3702 is spaced apart from the second end 114 of the first support rod 104 of the inset frame 102, and/or spaced apart from the second end 118 of the second support rod 106 of the inset frame 102.

When the grilling basket 3702 is located and/or positioned on the inset frame 102 in the second position, the above-described filler grate 1702 can be located and/or positioned on the inset frame 102 rearward of the grilling basket 3702, whereby the width ($W_{FG}$) of the filler grate 1702 substantially fills, covers, and/or occupies the width (W) of the inset frame 102, and the length ($L_{FG}$) of the filler grate 1702 substantially fills, covers, and/or occupies the spacing and/or gap that exists between the rear end 3708 of the base 3704 of the grilling basket 3702 on the one hand, and the second end 114 of the first support rod 104 and/or the second end 118 of the second support rod 106 of the inset frame 102 on the other hand. Thus, the filler grate 1702 can substantially completely fill, cover, and/or occupy the rearward portion of the inset frame 102 that is not already substantially completely filled, covered, and/or occupied by the base 3704 of the grilling basket 3702 when the grilling basket 3702 is positioned on the inset frame 102 in the second position described above.

When the filler grate 1702 is positioned on the inset frame 102 in the rearward position, the rear end 2004 of the filler grate 1702 is reoriented to be adjacent the rear end 3708 of the base 3704 of the grilling basket 3702, and the front end 2002 of the filler grate 1702 is reoriented to face toward the second end 114 of the first support rod 104 and/or the second end 118 of the second support rod 106 of the inset frame 102. When the filler grate 1702 is positioned on the inset frame 102 in the rearward position, the support flanges 2016 of the filler grate 1702 are located within the second recesses 144 of the second crosswise rods 122 of the inset frame 102. Locating the support flanges 2016 of the filler grate 1702 within the second recesses 144 of the second crosswise rods 122 of the inset frame 102 advantageously assists in properly positioning and/or stabilizing the filler grate 1702 relative to the inset frame 102, or relative to the grilling basket 3702 positioned on the inset frame 102 adjacent the filler grate 1702.

Figure 44:
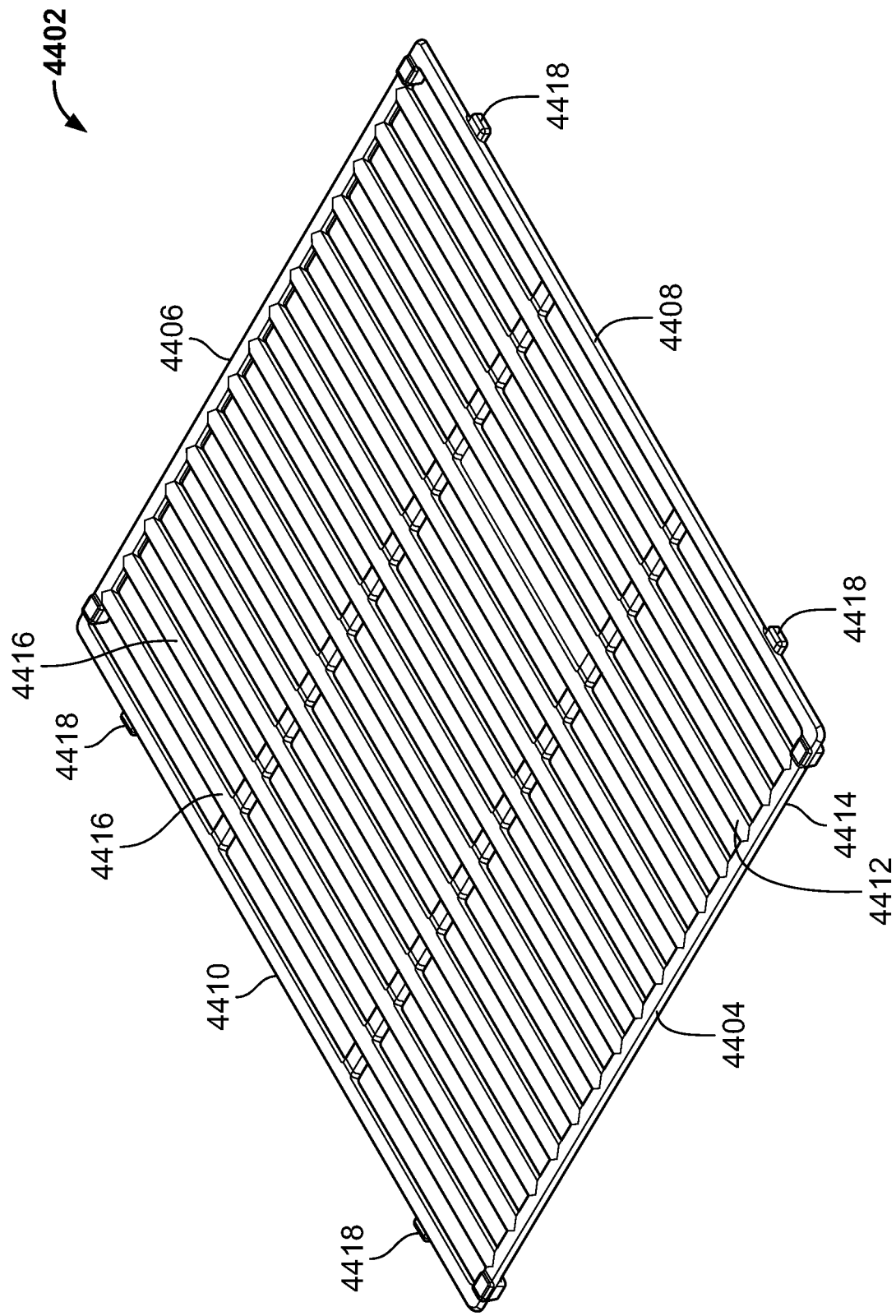
FIG. 44 is a perspective view of an example cooking grate constructed in accordance with teachings of this disclosure.

FIG. 44 is a perspective view of an example cooking grate 4402 constructed in accordance with teachings of this disclosure. The cooking grate 4402 of FIG. 44 includes an example front end 4404, an example rear end 4406 located opposite the front end 4404, an example right side 4408 extending between the front end 4404 and the rear end 4406, and an example left side 4410 located opposite the right side 4408 and extending between the front end 4404 and the rear end 4406. The cooking grate 4402 has a length ($L_{CG}$) extending between and defined by the front end 4404 and the rear end 4406 of the cooking grate 4402, and a width ($W_{CG}$) extending between and defined by the right side 4408 and the left side 4410 of the cooking grate 4402. In the illustrated example of FIG. 44, the cooking grate 4402 has a generally rectangular profile defined by the front end 4404, the rear end 4406, the right side 4408, and the left side 4410 of the cooking grate 4402. In other examples, the cooking grate 4402 can instead have a non-rectangular profile (e.g., a circular profile, an elliptical profile, a triangular profile, a trapezoidal profile, a hexagonal profile, etc.).

The cooking grate 4402 of FIG. 44 further includes an example top surface 4412 extending between the front end 4404, the rear end 4406, the right side 4408, and the left side 4410, as well as an example bottom surface 4414 located opposite the top surface 4412 and extending between the front end 4404, the rear end 4406, the right side 4408, and the left side 4410. The cooking grate 4402 is configured such that the top surface 4412 constitutes a surface for cooking (e.g., grilling) one or more items of food (e.g., hamburgers, chicken, vegetables, etc.) placed in contact with the top surface 4412 when the cooking grate 4402 is positioned within the cookbox 402 of the grill 400 (e.g., on the inset frame 102) over an underlying heat source. The cooking grate 4402 further includes example linear rods 4416 extending between the front end 4404 and the rear end 4406 of the cooking grate 4402, with respective ones of the linear rods 4416 being spaced apart from one another between the right side 4408 and the left side 4410 of the cooking grate 4402.

In the illustrated example of FIG. 44, the right side 4408 and the left side 4410 of the cooking grate 4402 respectively include example spacer tabs 4418 extending outwardly therefrom (e.g., away from the right side 4408 of the cooking grate 4402, and away from the left side 4410 of the cooking grate 4402). The spacer tabs 4418 of the cooking grate 4402 are configured such that respective ones of the spacer tabs 4418 existing along the right side 4408 of the cooking grate 4402 are to be located within corresponding ones of the first recess 130 and the second recess 132 of the first support rod 104 of the inset frame 102, and such that respective ones of the spacer tabs 4418 existing along the left side 4410 of the cooking grate 4402 are to be located within corresponding ones of the first recess 136 and the second recess 138 of the second support rod 106 of the inset frame 102, as further described below.

Figure 45:
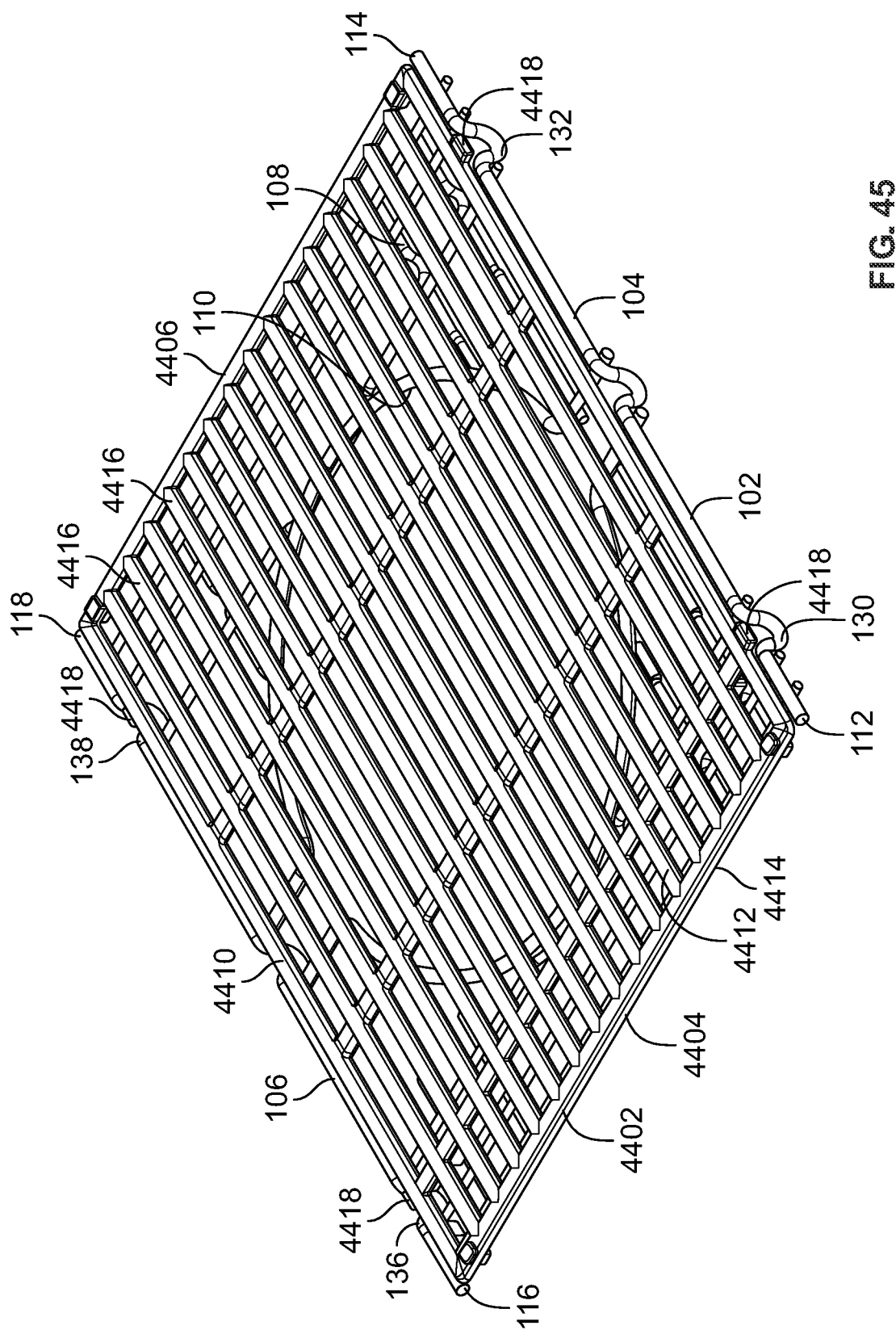
FIG. 45 is a perspective view of the cooking grate of FIG. 44, with the cooking grate shown positioned on the inset frame of FIGS. 1-3.
Figure 46:
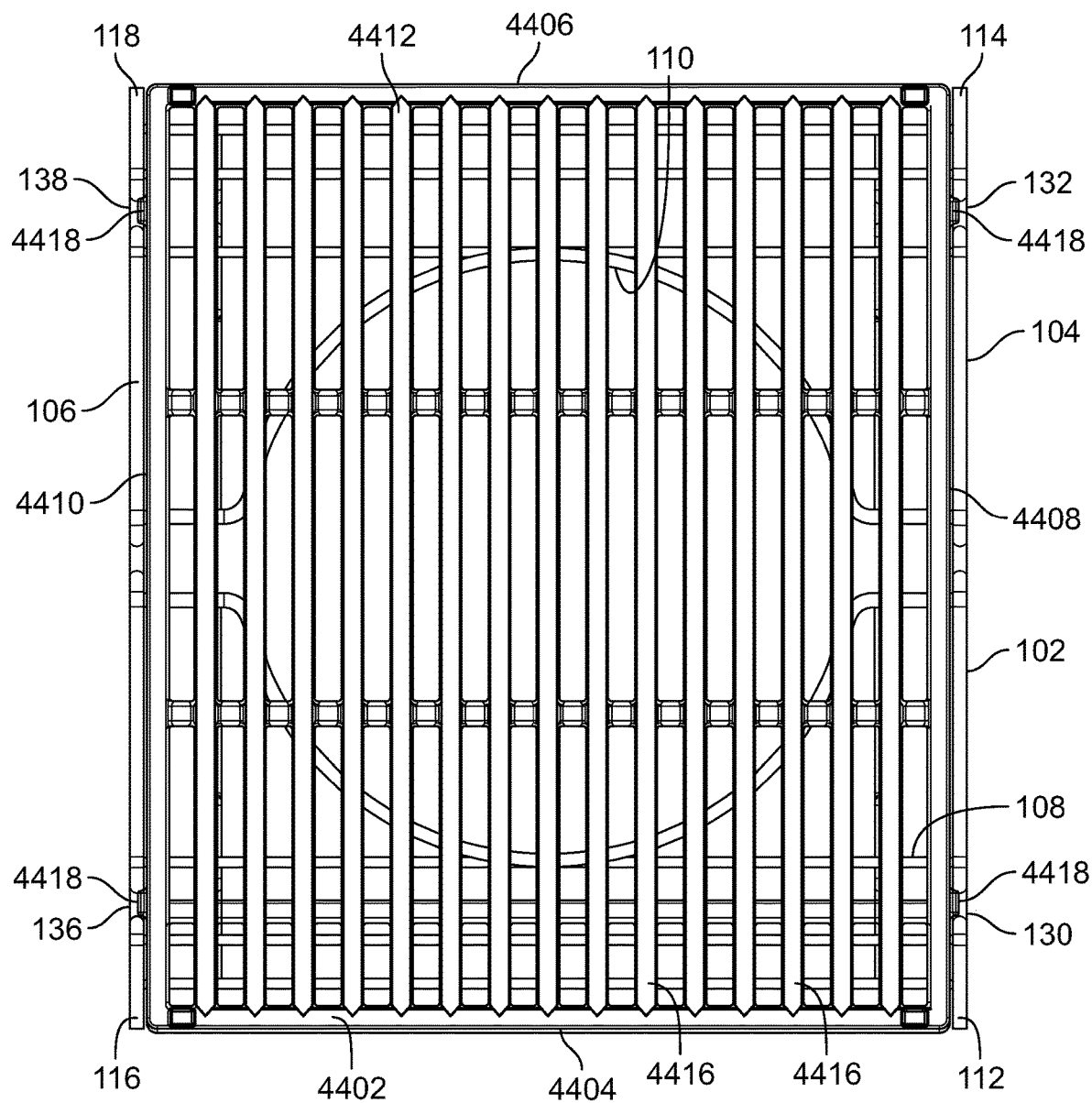
FIG. 46 is a top view of the cooking grate of FIGS. 44 and 45, with the cooking grate shown positioned on the inset frame of FIGS. 1-3 and 45.
Figure 47:
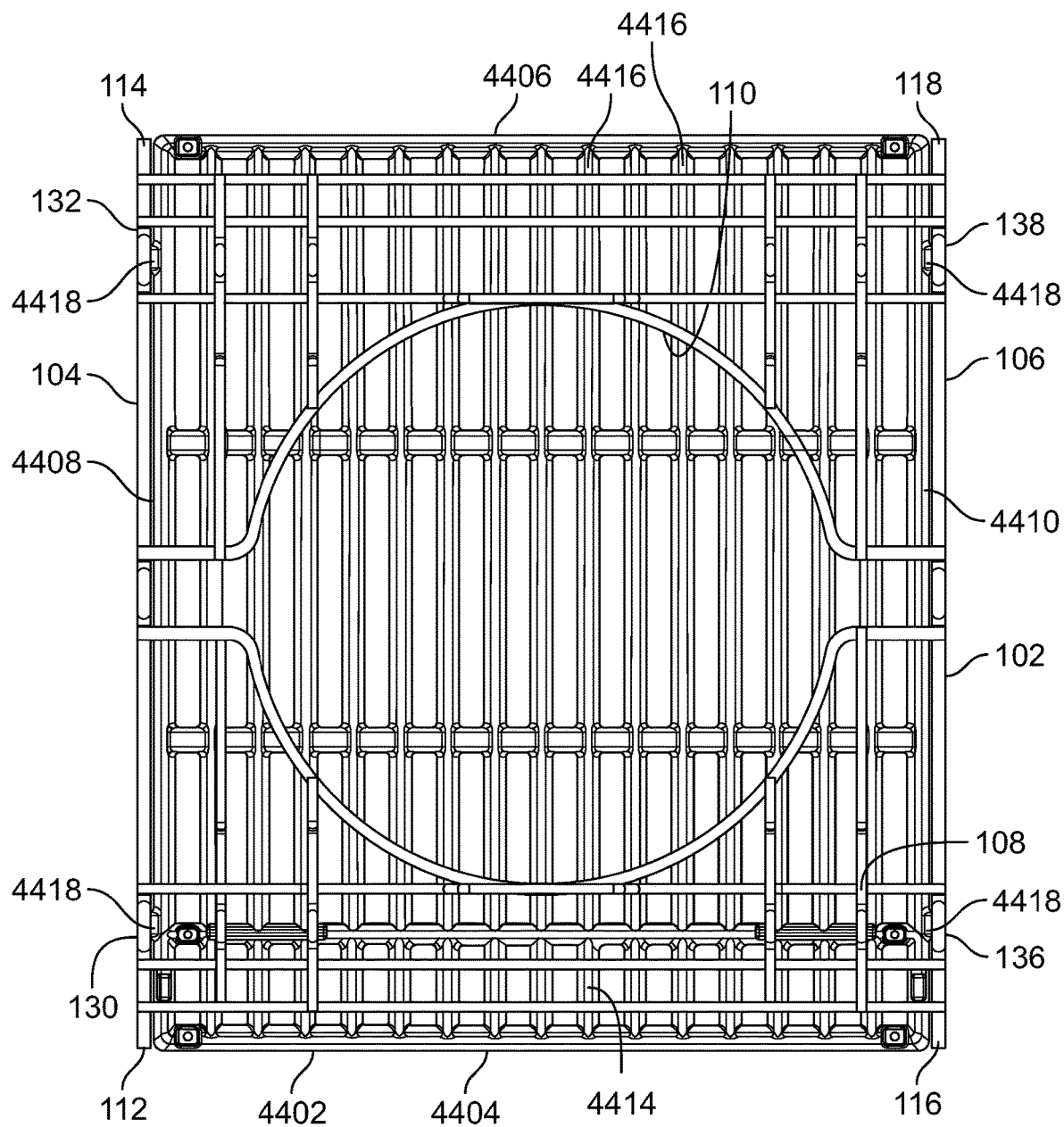
FIG. 47 is a bottom view of the cooking grate of FIGS. 44-46, with the cooking grate shown positioned on the inset frame of FIGS. 1-3, 45, and 46.

FIG. 45 is a perspective view of the cooking grate 4402 of FIG. 44, with the cooking grate 4402 shown positioned on the inset frame 102 of FIGS. 1-3. FIG. 46 is a top view of the cooking grate 4402 of FIGS. 44 and 45, with the cooking grate 4402 shown positioned on the inset frame 102 of FIGS. 1-3 and 45. FIG. 47 is a bottom view of the cooking grate 4402 of FIGS. 44-46, with the cooking grate 4402 shown positioned on the inset frame 102 of FIGS. 1-3, 45, and 46. In the illustrated example of FIGS. 45-47, the support lattice 108 and/or, more generally, the inset frame 102 supports the bottom surface 4414 of the cooking grate 4402, with the bottom surface 4414 of the cooking grate 4402 extending fully over and/or across the central opening 110 of the support lattice 108. The width ($W_{CG}$) of the cooking grate 4402 substantially fills, covers, and/or occupies the width (W) of the inset frame 102. For example, as shown in FIGS. 45-47, the right side 4408 of the cooking grate 4402 is located and/or positioned adjacent the first support rod 104 of the inset frame 102, and the left side 4410 of the cooking grate 4402 is located and/or positioned adjacent the second support rod 106 of the inset frame 102. The first support rod 104 and the second support rod 106 of the inset frame 102 respectively provide lateral boundaries and/or mechanical stops that restrict and/or prevent lateral movement and/or sliding of the cooking grate 4402 relative to the inset frame 102. This benefit is accomplished as a result of the first support rod 104 and the second support rod 106 of the inset frame 102 both being elevated and/or raised above the planar support surface provided by the support lattice 108.

In the illustrated example of FIGS. 45-47, the length ($L_{CG}$) of the cooking grate 4402 substantially fills, covers, and/or occupies the length (L) of the inset frame 102, such that the cooking grate 4402 can only be located and/or positioned on the inset frame 102 in a single lengthwise position. Thus, when the cooking grate 4402 is located and/or positioned on the inset frame 102, the front end 4404 of the cooking grate 4402 is adjacent (e.g., flush with) the first end 112 of the first support rod 104 of the inset frame 102, and/or adjacent (e.g., flush with) the first end 116 of the second support rod 106 of the inset frame 102, and the rear end 4406 of the cooking grate 4402 is adjacent (e.g., flush with) the second end 114 of the first support rod 104 of the inset frame 102, and/or adjacent (e.g., flush with) the second end 118 of the second support rod 106 of the inset frame 102.

As further shown in FIGS. 45-47, respective ones of the spacer tabs 4418 existing along the right side 4408 of the cooking grate 4402 are located within corresponding ones of the first recess 130 and the second recess 132 of the first support rod 104 of the inset frame 102, and respective ones of the spacer tabs 4418 existing along the left side 4410 of the cooking grate 4402 are located within corresponding ones of the first recess 136 and the second recess 138 of the second support rod 106 of the inset frame 102 when the cooking grate 4402 is located and/or positioned on the inset frame 102.

Figure 48:
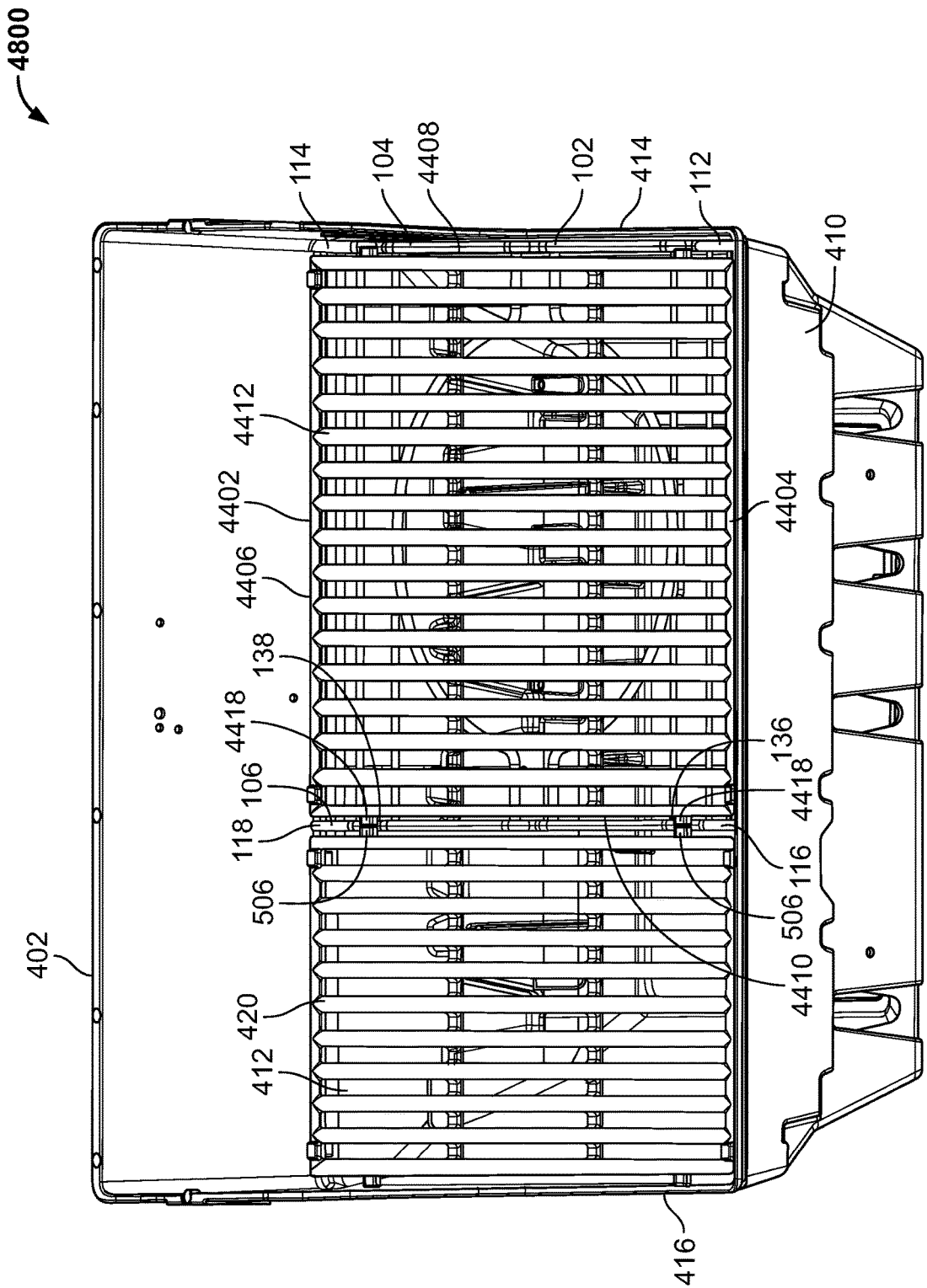
FIG. 48 is a perspective view of the cookbox of FIGS. 4-8 configured in an example seventh cookbox configuration in which the inset frame of FIGS. 1-3 and 45-47 is positioned in the cookbox, and the cooking grate of FIGS. 44-47 is positioned on the inset frame.
Figure 49:
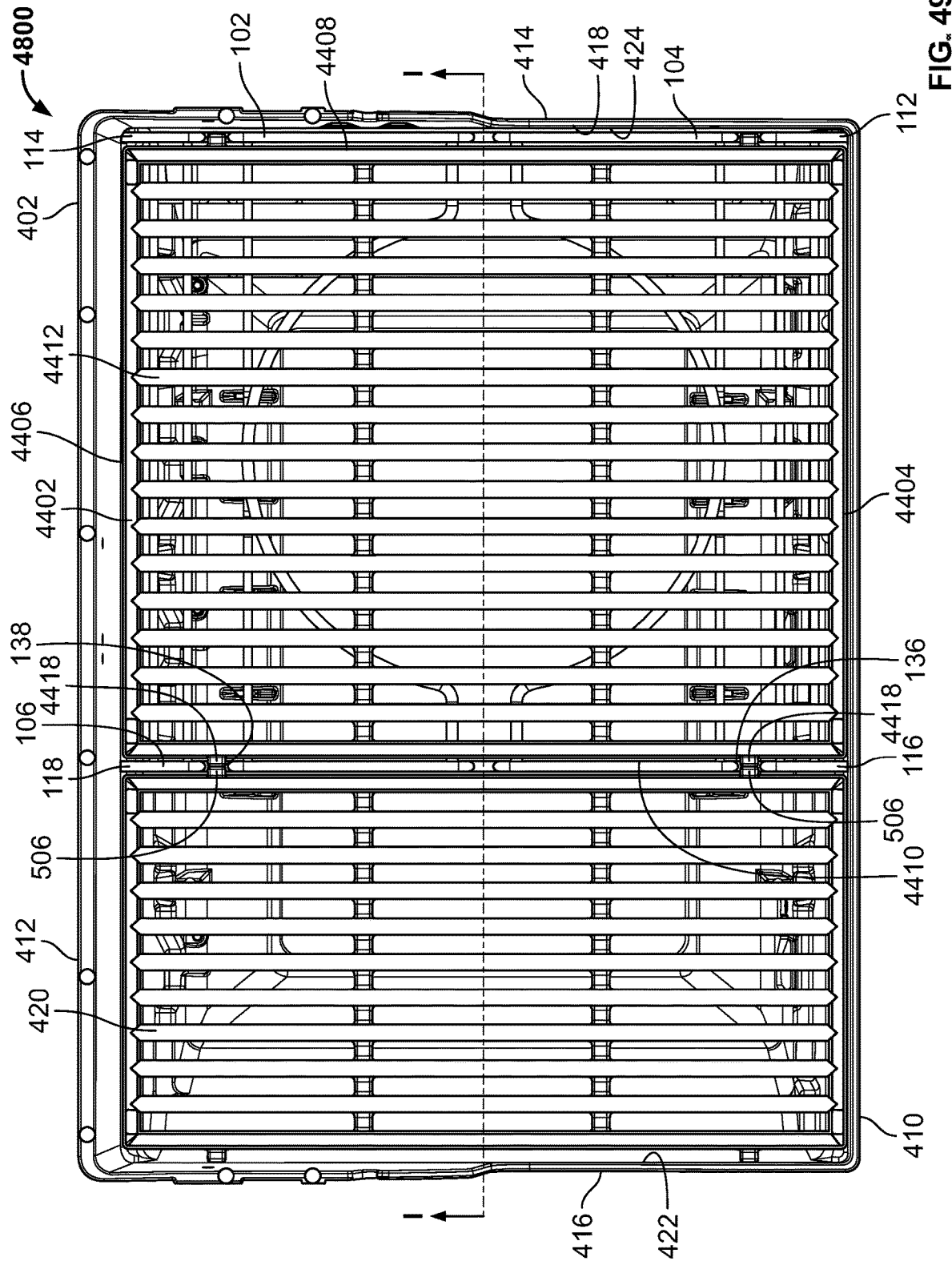
FIG. 49 is a top view of the seventh cookbox configuration of FIG. 48.
Figure 50:
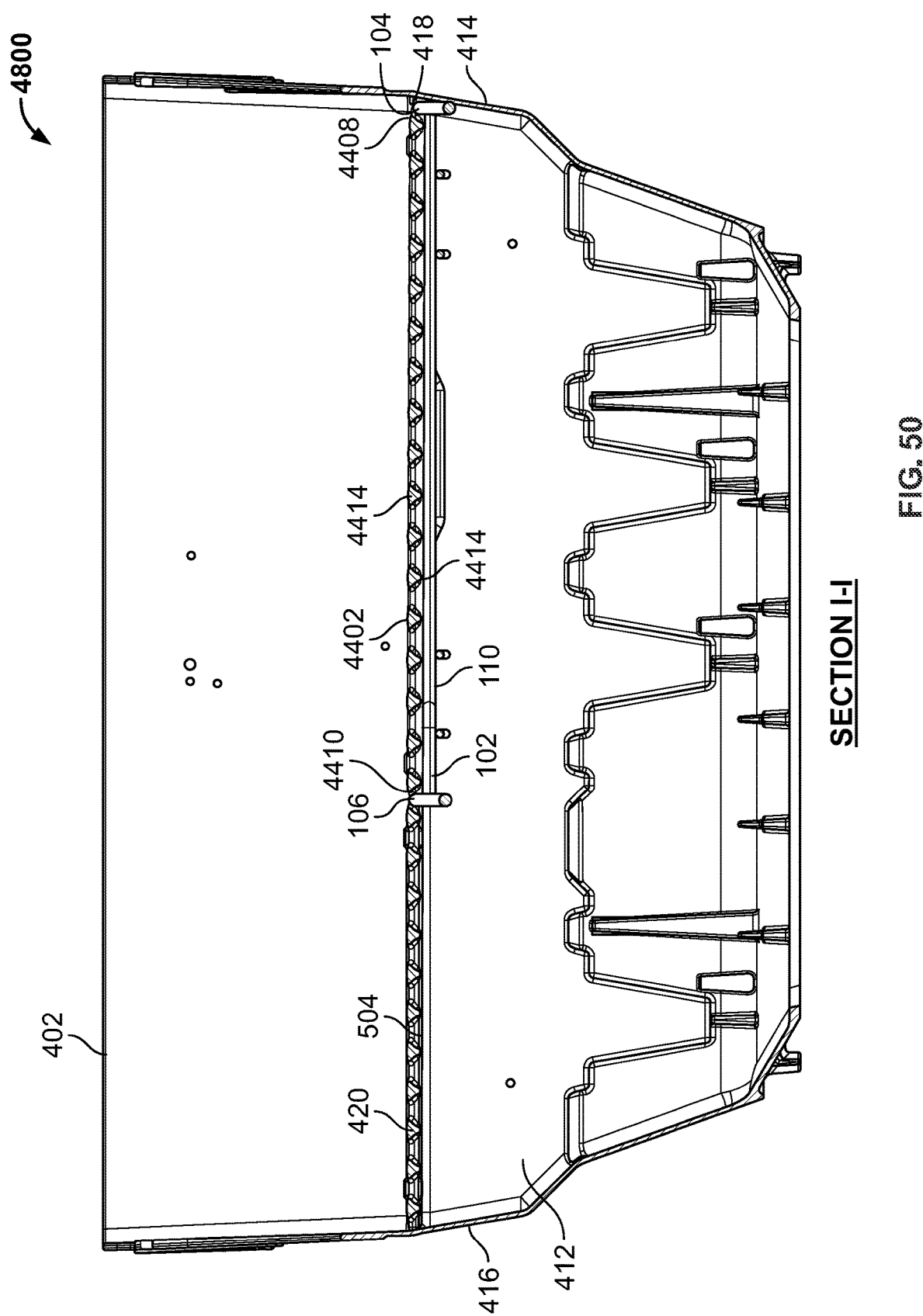
FIG. 50 is a cross-sectional view of the seventh cookbox configuration of FIGS. 48 and 49 taken along section I-I of FIG. 49.

FIG. 48 is a perspective view of the cookbox of FIGS. 4-8 configured in an example seventh cookbox configuration in which the inset frame of FIGS. 1-3 and 45-47 is positioned in the cookbox, and the cooking grate of FIGS. 44-47 is positioned on the inset frame. FIG. 49 is a top view of the seventh cookbox configuration of FIG. 48. FIG. 50 is a cross-sectional view of the seventh cookbox configuration of FIGS. 48 and 49 taken along section I-I of FIG. 49. As shown in FIGS. 48-50, the location and/or position of the inset frame 102 within the cookbox 402 is substantially the same as the location and/or position of the inset frame 102 within the cookbox 402 as shown and described above in connection with FIGS. 9-12. As further shown in FIGS. 48-50, the location and/or position of the cooking grate 4402 on the inset frame 102 is substantially the same as the location and/or position of the cooking grate 4402 on the inset frame 102 as shown and described above in connection with FIGS. 45-47.

In the illustrated example of FIGS. 48-50, the inset frame 102 and the cooking grate 4402 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the cooking grate 4402 respectively being located and/or positioned within the second section 424 of the opening 418 of the cookbox 402. The inset frame 102 supports, locates, and/or positions the cooking grate 4402 at a vertical elevation within the cookbox 402 that is substantially identical to a corresponding vertical elevation of the cooking grate 420 within the cookbox 402. This spatial arrangement advantageously enables the cooking grate 420 (e.g., a first cooking grate) and the cooking grate 4402 (e.g., a second cooking grate) to collectively provide a planar and substantially continuous cooking surface extending laterally across the opening 418 of the cookbox 402 (e.g., extending laterally between the right sidewall 414 and the left sidewall 416 of the cookbox 402).

When the cooking grate 4402 is located and/or positioned on the inset frame 102 as shown in FIGS. 48-50, respective ones of the spacer tabs 4418 existing along the right side 4408 of the cooking grate 4402 are located within corresponding ones of the first recess 130 and the second recess 132 of the first support rod 104 of the inset frame 102, and respective ones of the spacer tabs 4418 existing along the left side 4410 of the cooking grate 4402 are located within corresponding ones of the first recess 136 and the second recess 138 of the second support rod 106 of the inset frame 102 when the cooking grate 4402 is located and/or positioned on the inset frame 102. Respective ones of the spacer tabs 506 existing along the right side of the cooking grate 420 are also located within corresponding ones of the first recess 136 and the second recess 138 of the second support rod 106 of the inset frame 102, such that the right-side spacer tabs 506 of the cooking grate 420 abut, contact, or are otherwise adjacent to the left-side spacer tabs 4418 of the cooking grate 4402. Locating such the spacer tabs 4418 of the cooking grate 4402 and the spacer tabs 506 of the cooking grate 420 in the above-described manner illustrated in FIGS. 48-50 advantageously assists in properly positioning the cooking grate 4402 and/or the cooking grate 420 relative to the inset frame 102, and/or relative to one another within the cookbox 402.

Figure 51:
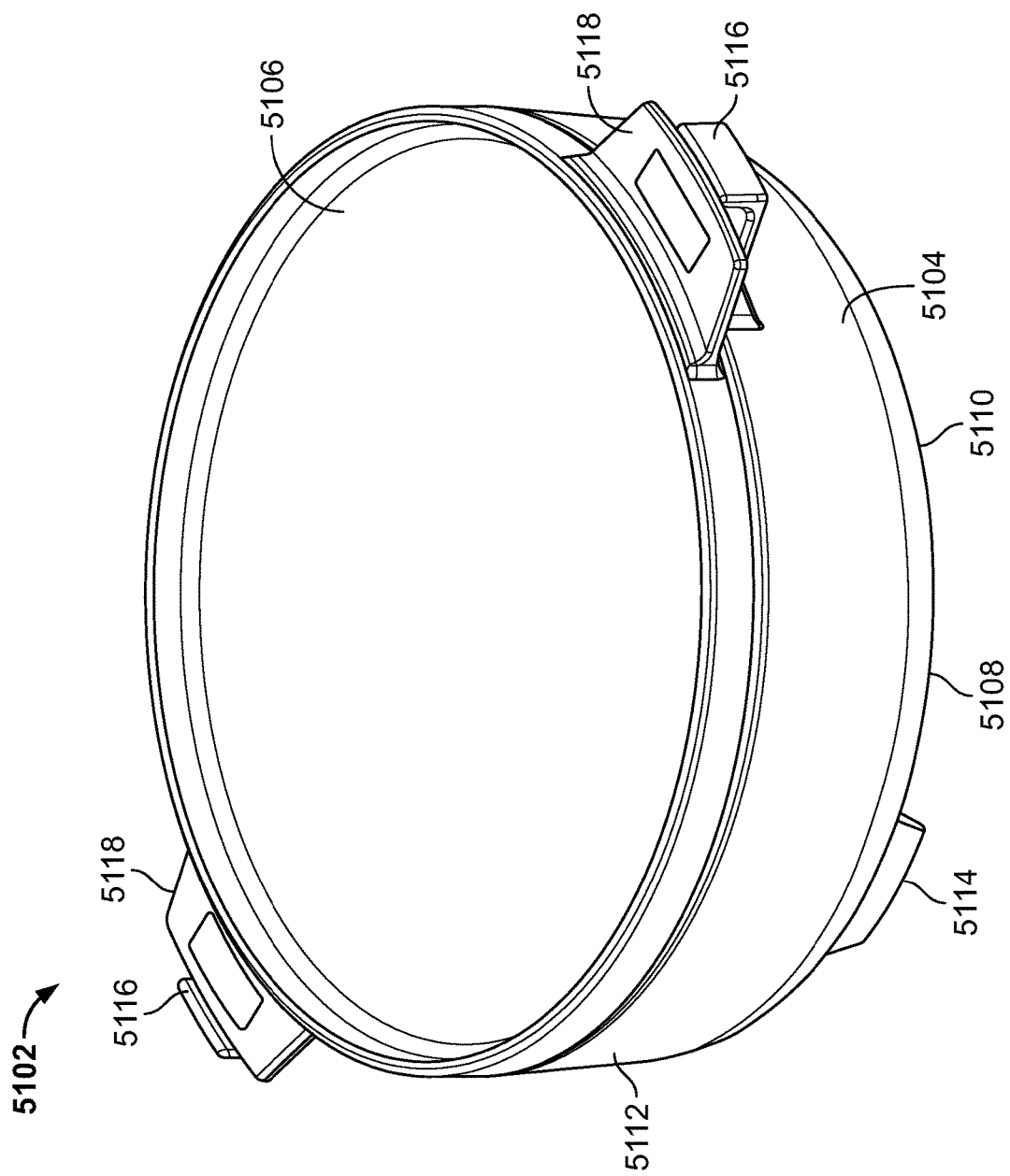
FIG. 51 is a perspective view of an example Dutch oven constructed in accordance with teachings of this disclosure.

FIG. 51 is a perspective view of an example Dutch oven 5102 constructed in accordance with teachings of this disclosure. The Dutch oven 5102 of FIG. 51 includes an example pot 5104 and an example lid 5106, both of which have a generally circular profile. The pot 5104 of the Dutch oven 5102 includes an example base 5108 having an example bottom surface 5110, and further includes an example sidewall 5112 extending upwardly from the base 5108 and culminating in a rim. In the illustrated example of FIG. 51, the bottom surface 5110 of the base 5108 of the pot 5104 has a circumference that is greater than a corresponding circumference defined by the central opening 110 of the inset frame 102. The pot 5104 of the Dutch oven 5102 further includes example docking feet 5114 extending downwardly from the bottom surface 5110 of the base 5108 of the pot 5104, with the docking feet 5114 located and/or positioned radially inward from the circumference of the bottom surface 5110. The docking feet 5114 of the pot 5104 are configured to complement the central opening 110 of the inset frame 102, as further described below. The Dutch oven 5102 of FIG. 51 further includes example handles 5116 coupled to and extending outwardly from (e.g., radially away from) the sidewall 5112 of the pot 5104, as well as example handles 5118 coupled to and extending outwardly from (e.g., radially away from) a peripheral edge of the lid 5106. The handles 5116 of the pot 5104 are configured to improve the ease with which an end user can position the pot 5104 onto and/or remove the pot 5104 from the inset frame 102 of FIGS. 1-3. The handles 5118 of the lid 5106 are configured to improve the ease with which an end user can position the lid 5106 onto and/or remove the lid 5106 from the pot 5104.

Figure 52:
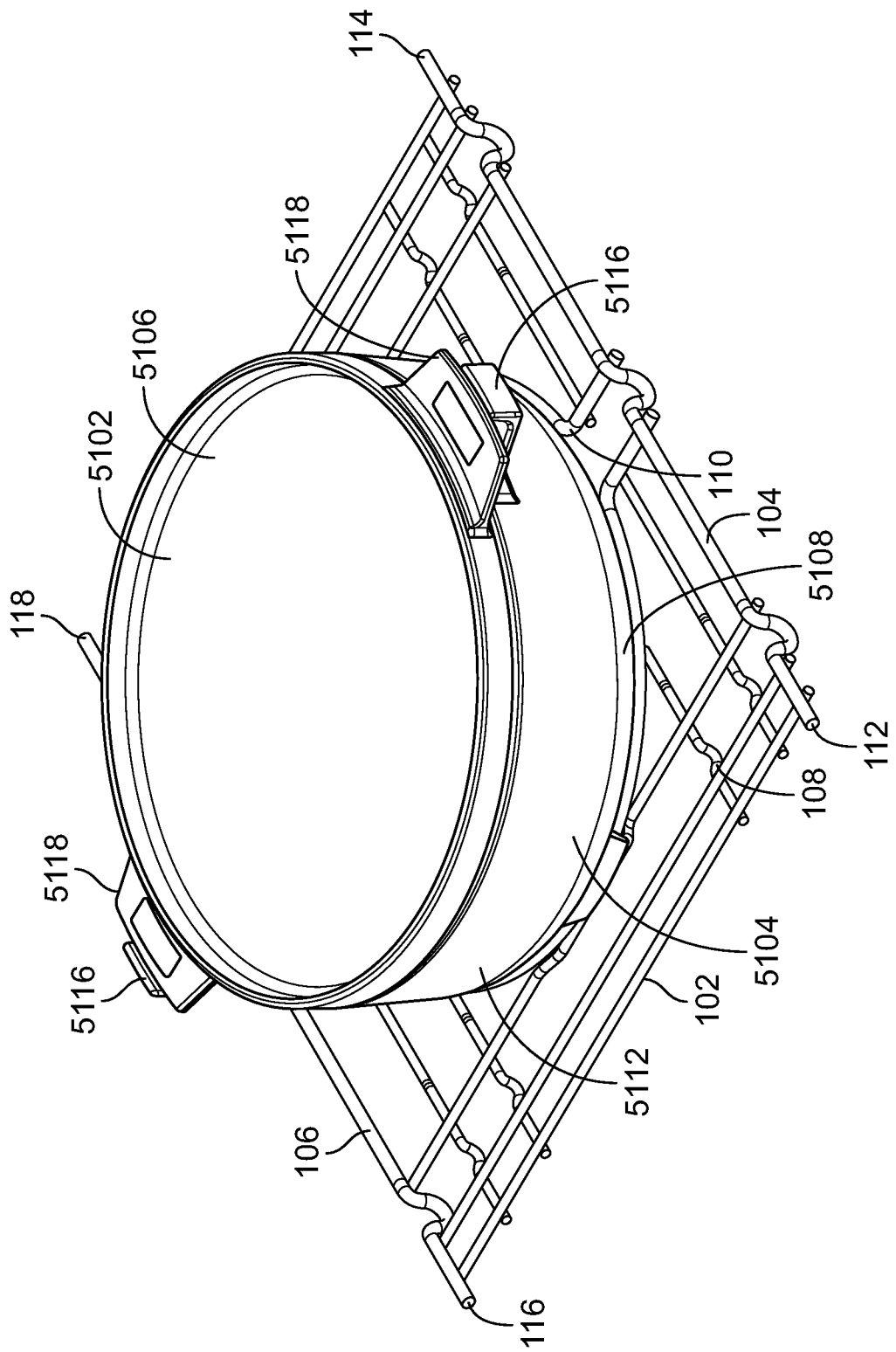
FIG. 52 is a perspective view of the Dutch oven of FIG. 51, with the Dutch oven shown positioned on the inset frame of FIGS. 1-3.
Figure 53:
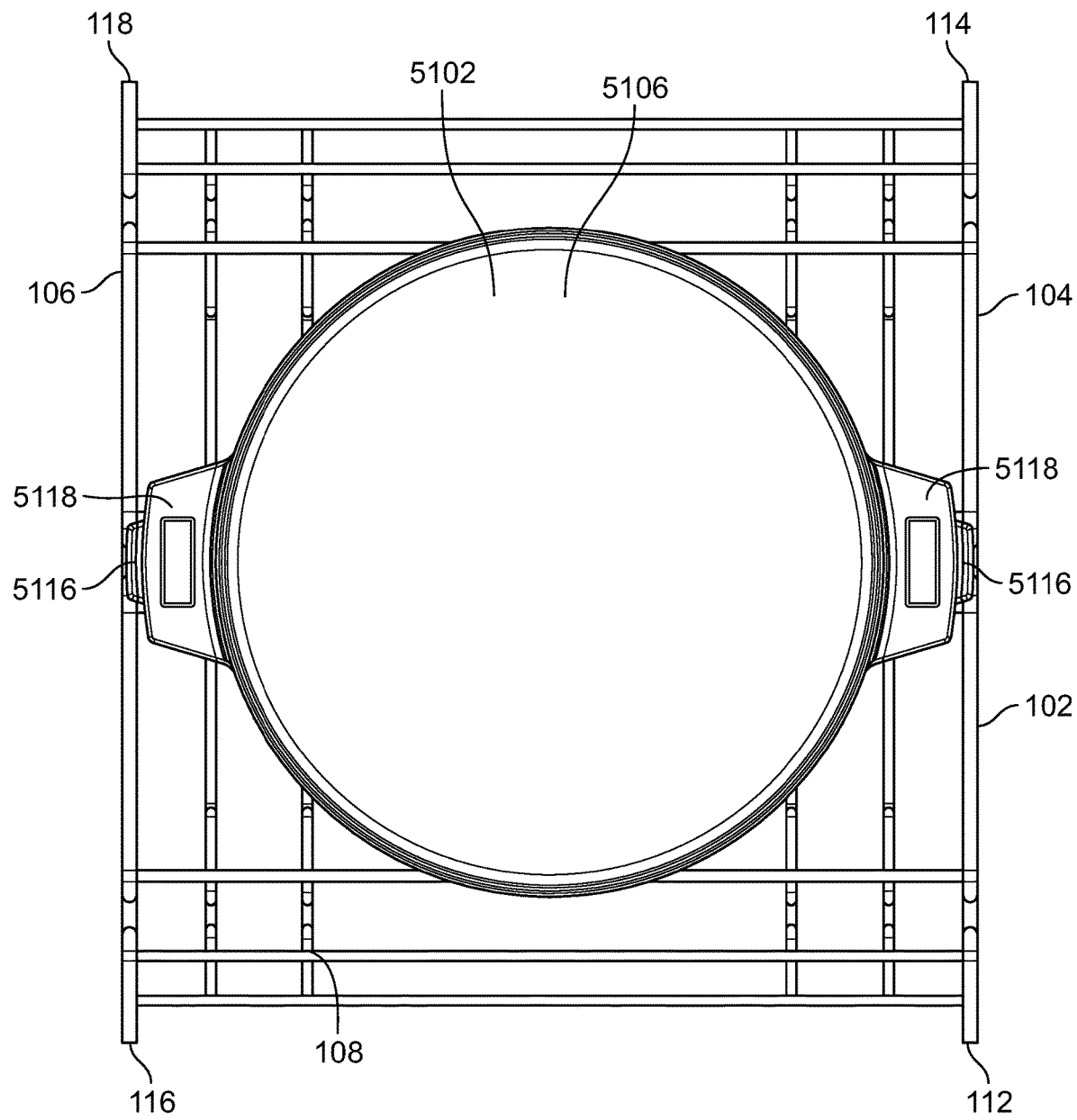
FIG. 53 is a top view of the Dutch oven of FIGS. 51 and 52, with the Dutch oven shown positioned on the inset frame of FIGS. 1-3 and 52.
Figure 54:
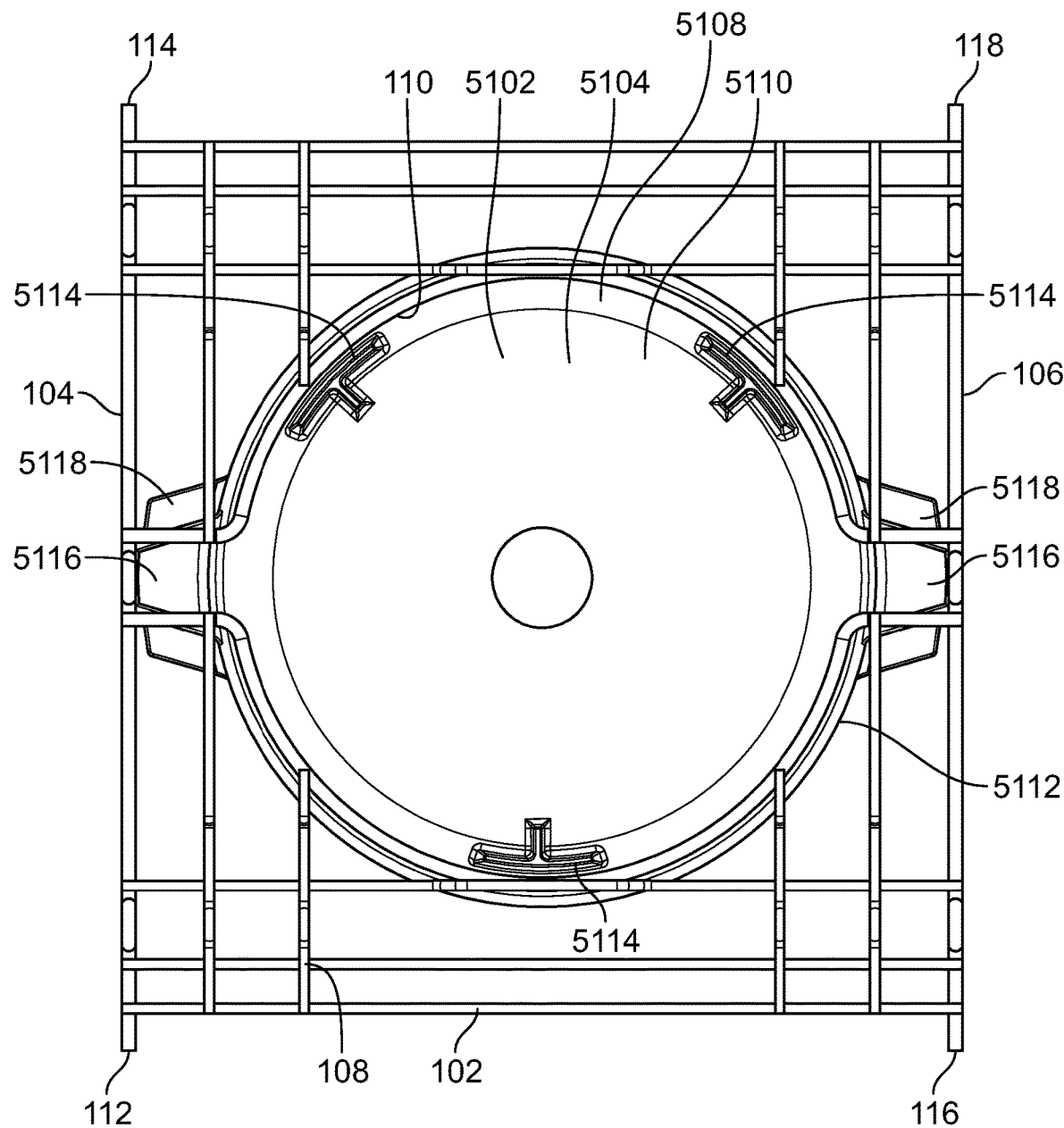
FIG. 54 is a bottom view of the Dutch oven of FIGS. 51-53, with the Dutch oven shown positioned on the inset frame of FIGS. 1-3, 52, and 53.

FIG. 52 is a perspective view of the Dutch oven 5102 of FIG. 51, with the Dutch oven 5102 shown positioned on the inset frame 102 of FIGS. 1-3. FIG. 53 is a top view of the Dutch oven 5102 of FIGS. 51 and 52, with the Dutch oven 5102 shown positioned on the inset frame 102 of FIGS. 1-3 and 52. FIG. 54 is a bottom view of the Dutch oven 5102 of FIGS. 51-53, with the Dutch oven 5102 shown positioned on the inset frame 102 of FIGS. 1-3, 52, and 53. In the illustrated example of FIGS. 52-54, the support lattice 108 and/or, more generally, the inset frame 102 supports the bottom surface 5110 of the Dutch oven 5102, with the bottom surface 5110 of the Dutch oven 5102 extending fully over and/or across the central opening 110 of the support lattice 108. The docking feet 5114 of the Dutch oven 5102 are located and/or positioned within the central opening 110 of the inset frame 102. The curved rods 126 of the support lattice 108 that define and/or form the central opening 110 of the inset frame respectively provide circumferential boundaries and/or mechanical stops that restrict and/or prevent movement and/or sliding of the docking feet 5114 and/or, more generally, movement and/or sliding of the pot 5104 of the Dutch oven 5102 relative to the inset frame 102. This benefit is accomplished as a result of the docking feet 5114 being configured to complement the circumference of the central opening 110 of the inset frame 102.

Figure 55:
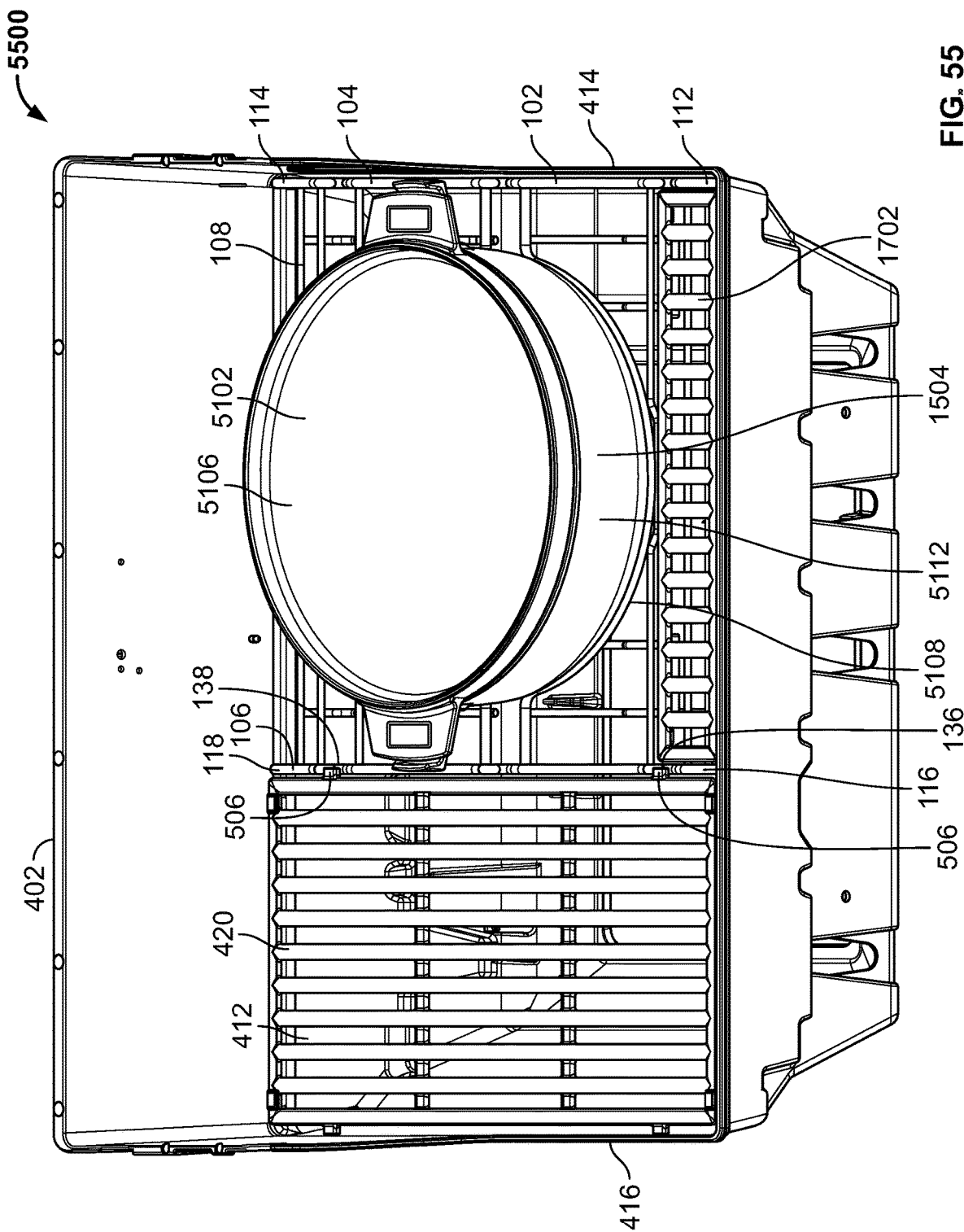
FIG. 55 is a perspective view of the cookbox of FIGS. 4-8 configured in an example eighth cookbox configuration in which the inset frame of FIGS. 1-3 and 52-54 is positioned in the cookbox, and the Dutch oven of FIGS. 51-54 is positioned on the inset frame.
Figure 56:
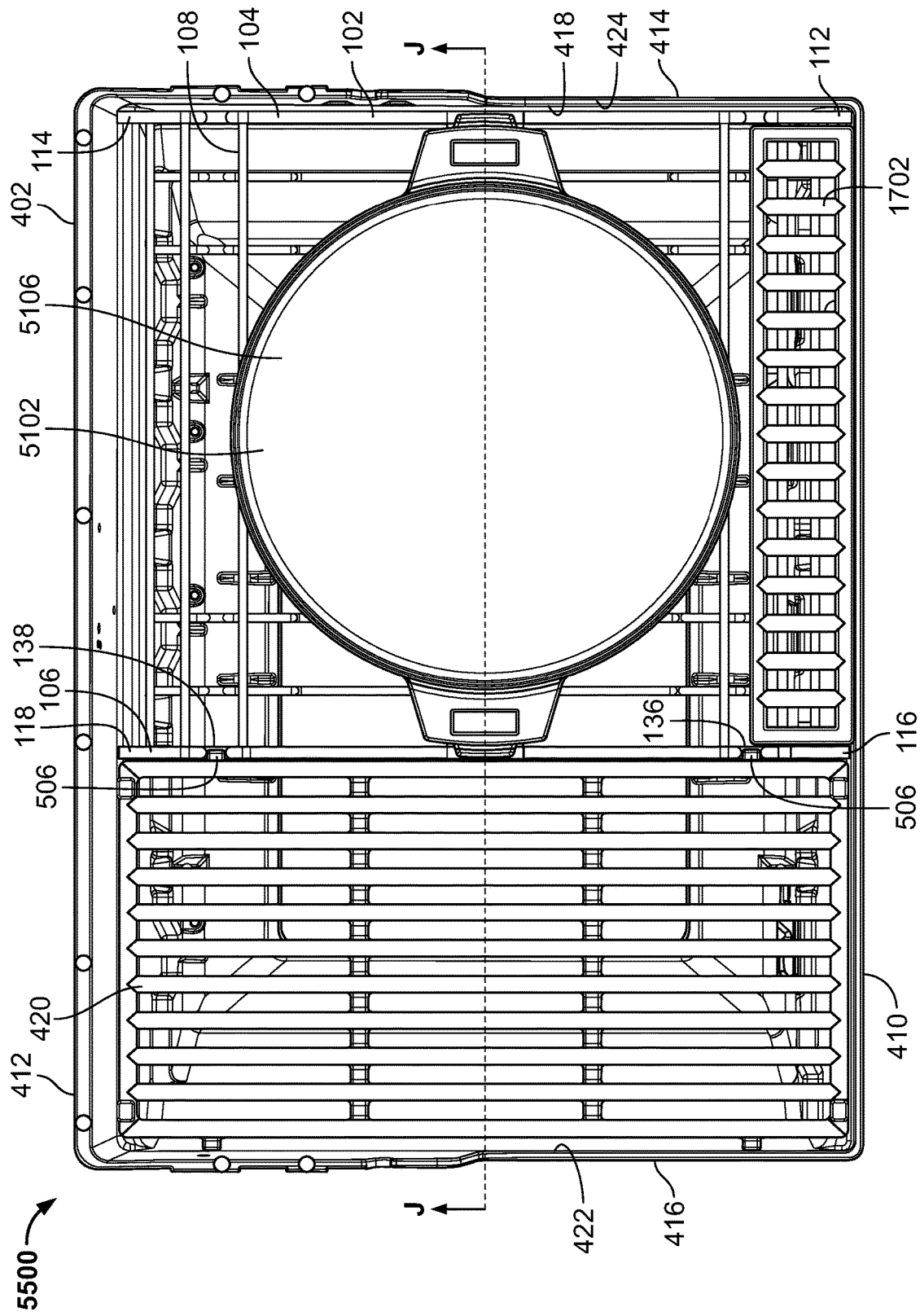
FIG. 56 is a top view of the eighth cookbox configuration of FIG. 55.
Figure 57:
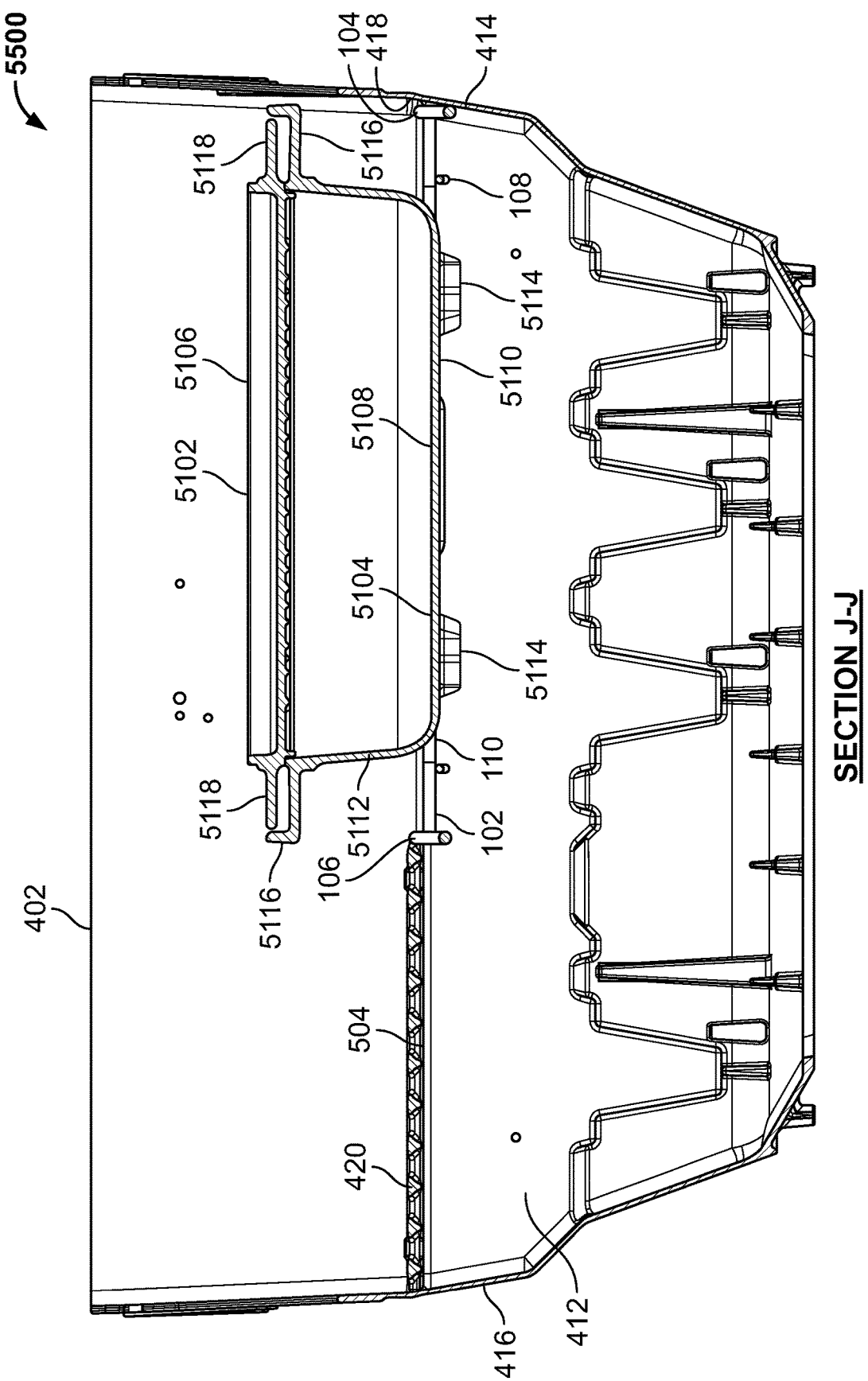
FIG. 57 is a cross-sectional view of the eighth cookbox configuration of FIGS. 55 and 56 taken along section J-J of FIG. 56.

FIG. 55 is a perspective view of the cookbox 402 of FIGS. 4-8 configured in an example eighth cookbox configuration 5500 in which the inset frame 102 of FIGS. 1-3 and 52-54 is positioned in the cookbox 402, and the Dutch oven 5102 of FIGS. 51-54 is positioned on the inset frame 102. FIG. 56 is a top view of the eighth cookbox configuration 5500 of FIG. 55. FIG. 57 is a cross-sectional view of the eighth cookbox configuration 5500 of FIGS. 55 and 56 taken along section E-E of FIG. 56. As shown in FIGS. 55-57, the location and/or position of the inset frame 102 within the cookbox 402 is substantially the same as the location and/or position of the inset frame 102 within the cookbox 402 as shown and described above in connection with FIGS. 9-12. As further shown in FIGS. 55-57, the location and/or position of the Dutch oven 5102 on the inset frame 102 is substantially the same as the location and/or position of the Dutch oven 5102 on the inset frame 102 as shown and described above in connection with FIGS. 52-54.

In the illustrated example of FIGS. 55-57, the inset frame 102 and the Dutch oven 5102 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102 and the Dutch oven 5102 respectively being located and/or positioned within the second section 424 of the opening 418 of the cookbox 402. The inset frame 102 supports, locates, and/or positions the pot 5104 of the Dutch oven 5102 at a vertical elevation within the cookbox 402 that is substantially identical to a corresponding vertical elevation of the cooking grate 420 within the cookbox 402. This spatial arrangement advantageously enables the cooking grate 420 and the pot 5104 of the Dutch oven 5102 to collectively provide co-planar cooking surfaces arranged laterally across the opening 418 of the cookbox 402.

As further shown in FIGS. 55-57, the inset frame 102 additionally supports the above-described filler grate 1702, with the filler grate 1702 being located and/or positioned on the inset frame 102 forward of the pot 5104 of the Dutch oven 5102. In other examples, the filler grate 1702 can instead be located and/or positioned on the inset frame 102 rearward of the pot 5104 of the Dutch oven 5102. In still other examples, a first instance of the filler grate 1702 can be located and/or positioned on the inset frame 102 forward of the pot 5104 of the Dutch oven 5102 while a second instance of the filler grate 1702 is also located and/or positioned on the inset frame 102 rearward of the pot 5104 of the Dutch oven 5102.

The Dutch oven 5102 shown and described above in connection with FIGS. 51-57 provides one example of a rounded and/or circular cooking accessory that can be supported, located, and/or positioned within the cookbox 402 of the grill 400 via the inset frame 102, wherein the cooking accessory has a base and/or docking feet that is/are dimensioned to complement the central opening 110 of the inset frame 102. The inset frame 102 is advantageously configured to accommodate and/or support other, similarly sized and/or similarly shaped rounded and/or circular cooking accessories in an interchangeable manner. For example, with the Dutch oven 5102 of FIGS. 51-57 removed from the inset frame 102, the inset frame 102 can instead accommodate and/or support a rounded and/or circular wok having a base and/or docking feet that is/are dimensioned to complement the central opening 110 of the inset frame 102. As another example, with the Dutch oven 5102 of FIGS. 51-57 removed from the inset frame 102, the inset frame 102 can instead accommodate and/or support a rounded and/or circular grilling basket having a base and/or docking feet that is/are dimensioned to complement the central opening 110 of the inset frame 102. As yet another example, with the Dutch oven 5102 of FIGS. 51-57 removed from the inset frame 102, the inset frame 102 can instead accommodate and/or support a rounded and/or circular pot (other than the pot 5104 of the Dutch oven 5102) having a base and/or docking feet that is/are dimensioned to complement the central opening 110 of the inset frame 102.

Figure 58:
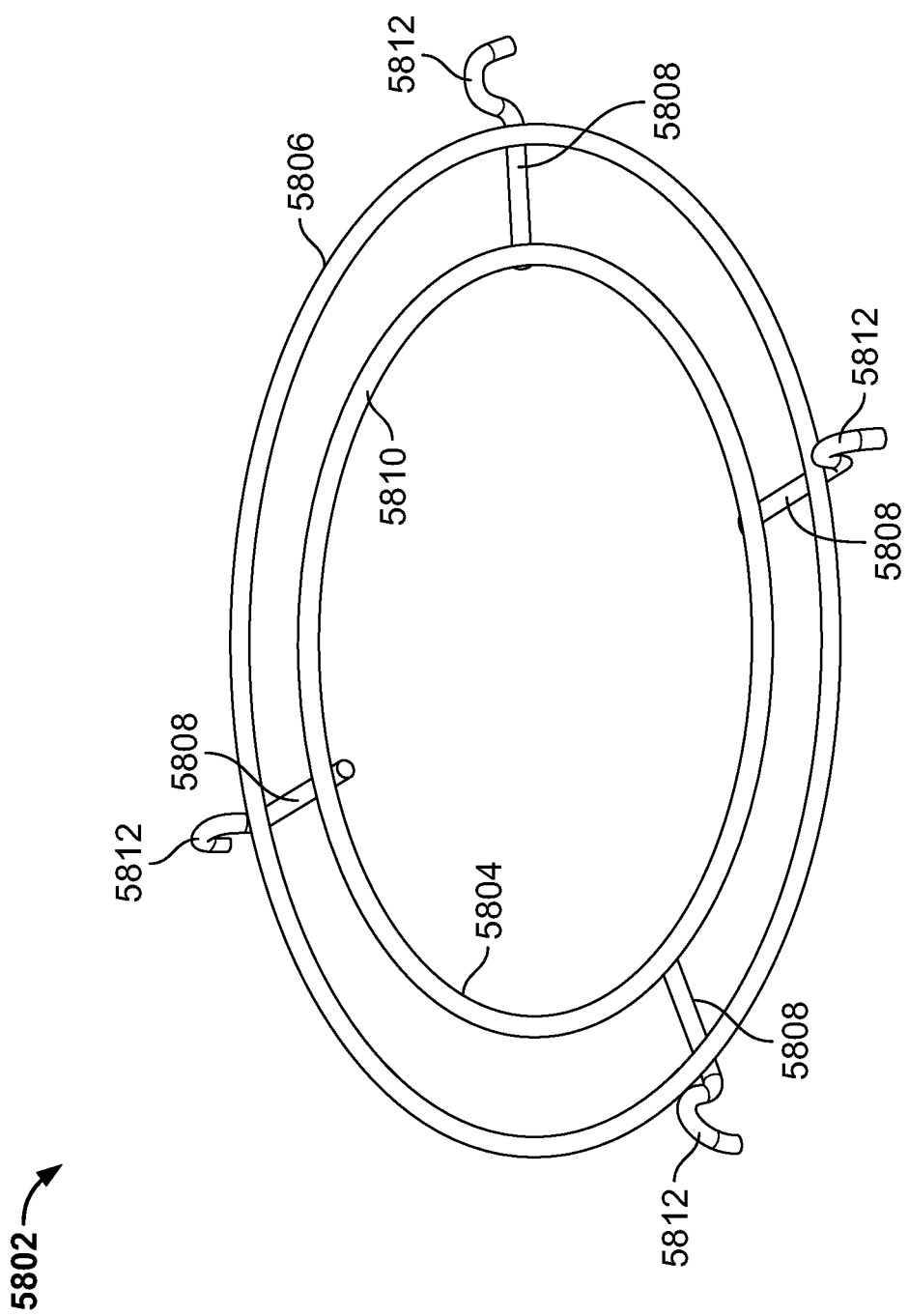
FIG. 58 is a perspective view of an example filler ring constructed in accordance with the teachings of this disclosure.
Figure 59:
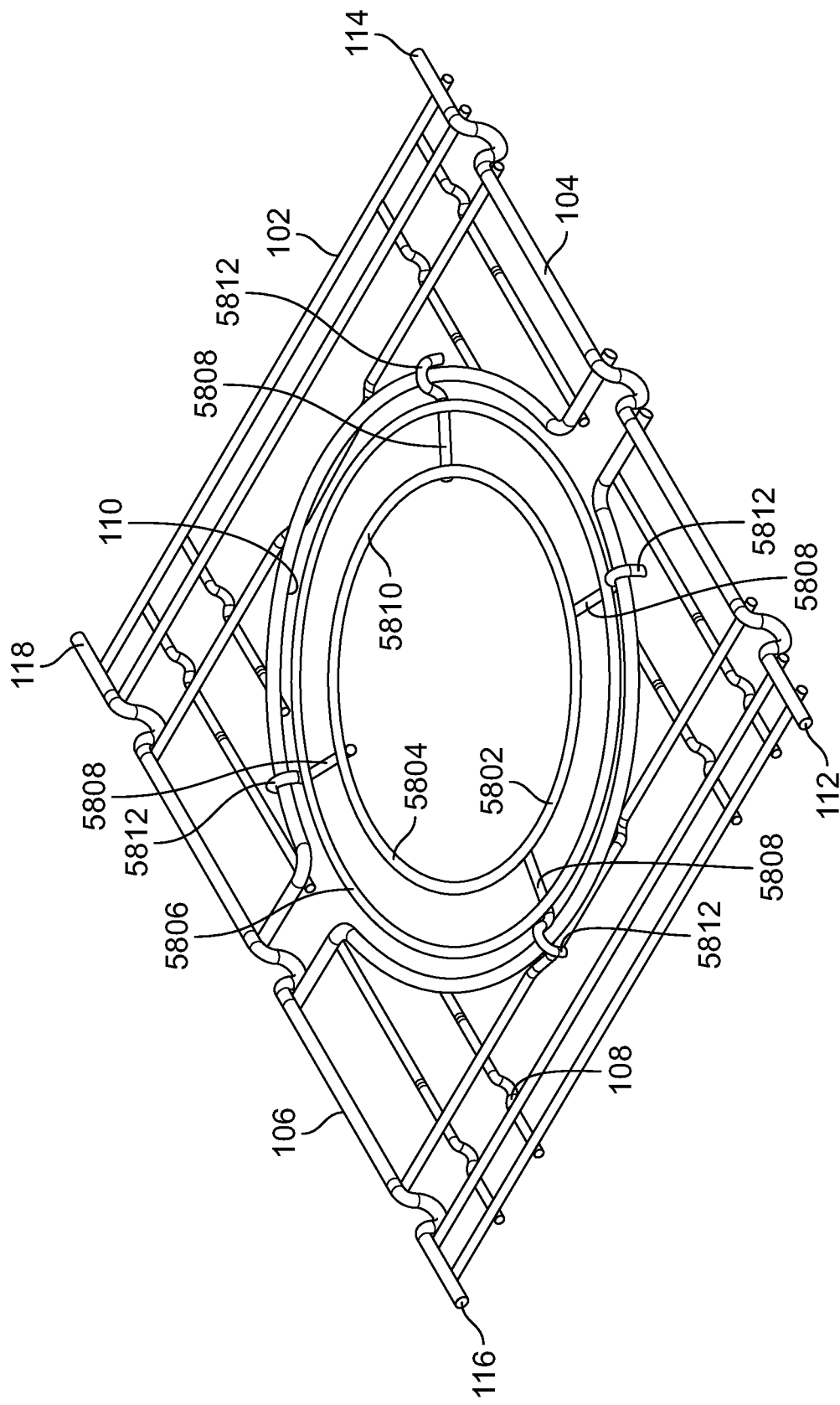
FIG. 59 is a perspective view of the filler ring of FIG. 58, with the filler ring shown positioned on the inset frame of FIGS. 1-3.

In some examples (e.g., when using a wok in conjunction with the inset frame 102), the sizing of the central opening 110 (e.g., the circumference of the central opening 110) of the inset frame 102 may be larger than desired relative to the sizing of a base (e.g., the circumference of the base) of a cooking accessory to be located and/or positioned within or relative to the central opening 110 of the inset frame 102. In such examples, the use of a filler ring to be positioned within the central opening 110 of the inset frame may be advantageous. FIG. 58 is a perspective view of an example filler ring 5802 constructed in accordance with the teachings of this disclosure. FIG. 59 is a perspective view of the filler ring 5802 of FIG. 58, with the filler ring 5802 shown positioned on the inset frame 102 of FIGS. 1-3. In the illustrated example of FIGS. 58 and 59, the filler ring 5802 includes an example inner ring 5804, an example outer ring 5806 circumscribing the inner ring 5804, and example support rods 5808 coupled to and extending between the inner ring 5804 and the outer ring 5806. The inner ring 5804 of the filler ring 5802 defines an example central opening 5810 of the filler ring 5802. Each one of the support rods 5808 of the filler ring 5802 extends outwardly (e.g., radially) beyond the outer ring 5806 of the filler ring 5802 and includes an example hook 5812 configured to be located and/or positioned on one of the curved rods 126 of the inset frame 102 that collectively form the central opening 110 of the inset frame 102, as generally shown in FIG. 59. When the filler ring 5802 is located and/or positioned on the inset frame 102 as shown in FIG. 59, the central opening 5810 provided by the inner ring 5804 of the filler ring 5802 provides a circumferential reduction relative to the central opening 110 provided by the curved rods 126 of the inset frame 102.

Figure 60:
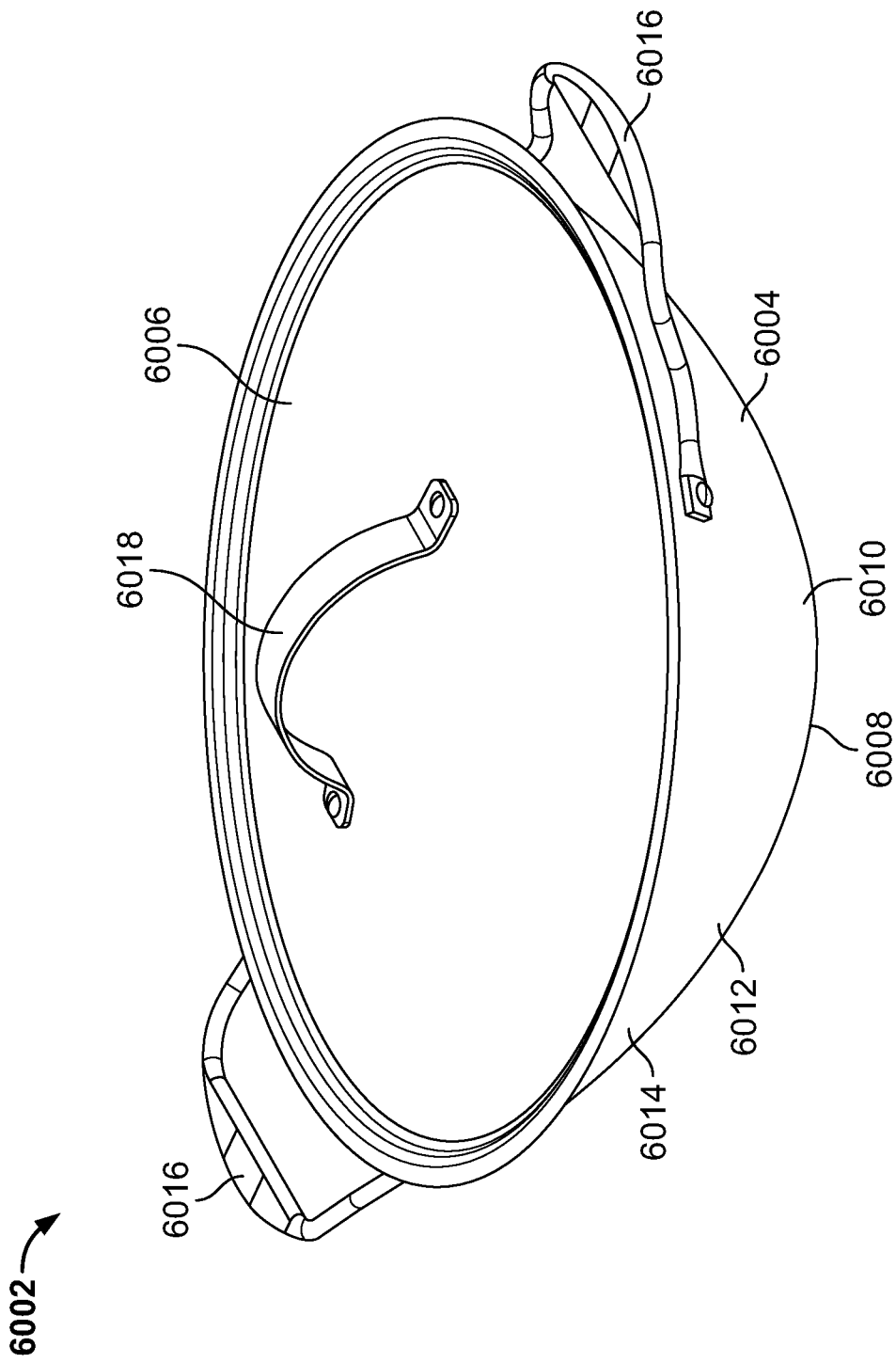
FIG. 60 is a perspective view of an example wok constructed in accordance with teachings of this disclosure.

FIG. 60 is a perspective view of an example wok 6002 constructed in accordance with teachings of this disclosure. The wok 6002 of FIG. 60 includes an example pot 6004 and an example lid 6006, both of which have a generally circular profile, The pot 6004 of the wok 6002 includes an example base 6008 having an example bottom surface 6010, and further includes an example sidewall 6012 having an example outer surface 6014 that extends upwardly and outwardly from the base 6008 and culminates in a rim. In the illustrated example of FIG. 60, the bottom surface 6010 of the base 6008 of the pot 6004 has a circumference that is less than a corresponding circumference defined by the central opening 110 of the inset frame 102, and also less than a corresponding circumference defined by the central opening 5810 of the filler ring 5802. The wok 6002 is accordingly structured such that the outer surface 6014 of the sidewall 6012 of the pot 6004 will contact and/or be seated within the central opening 5810 of the filler ring 5802, and such that the bottom surface 6010 of the base 6008 of the pot 6004 will generally be located and/or positioned below the central opening 5810 of the filler ring 5802. The wok 6002 of FIG. 60 further includes example handles 6016 coupled to and extending outwardly from (e.g., radially away from) the sidewall 6012 of the pot 6004, as well as an example handle 6018 coupled to and extending upwardly from an upper surface of the lid 6006. The handles 6016 of the pot 6004 are configured to improve the ease with which an end user can position the pot 6004 onto, remove the pot 6004 from, and/or maneuver the pot 6004 within the filler ring 5802 of FIGS.

58 and 59. The handle 6018 of the lid 6006 is configured to improve the ease with which an end user can position the lid 6006 onto and/or remove the lid 6006 from the pot 6004.

Figure 61:
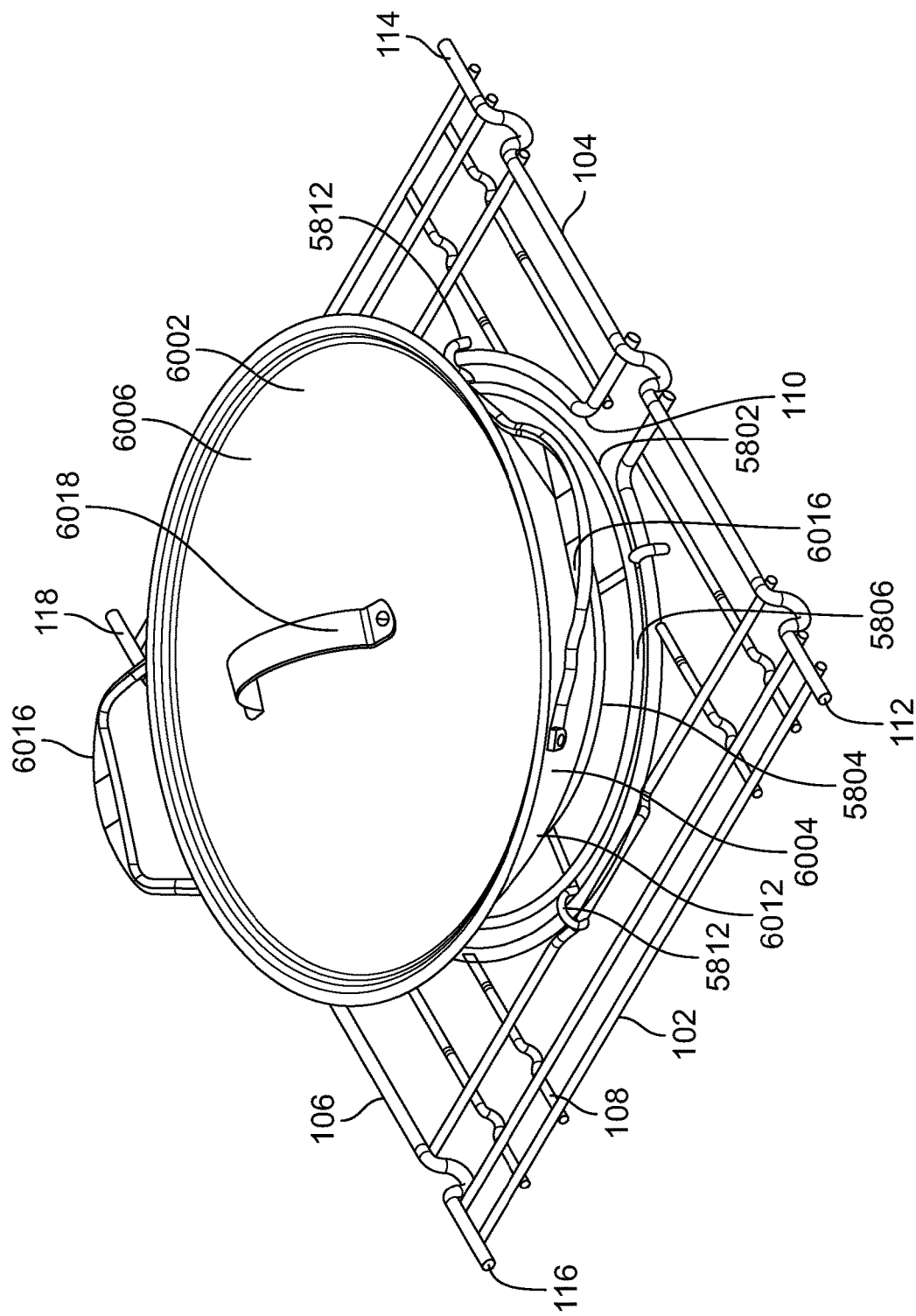
FIG. 61 is a perspective view of the wok of FIG. 60, with the wok shown positioned on the filler ring of FIGS. 58 and 59, and with the filler ring shown positioned on the inset frame of FIGS. 1-3 and 59.
Figure 62:
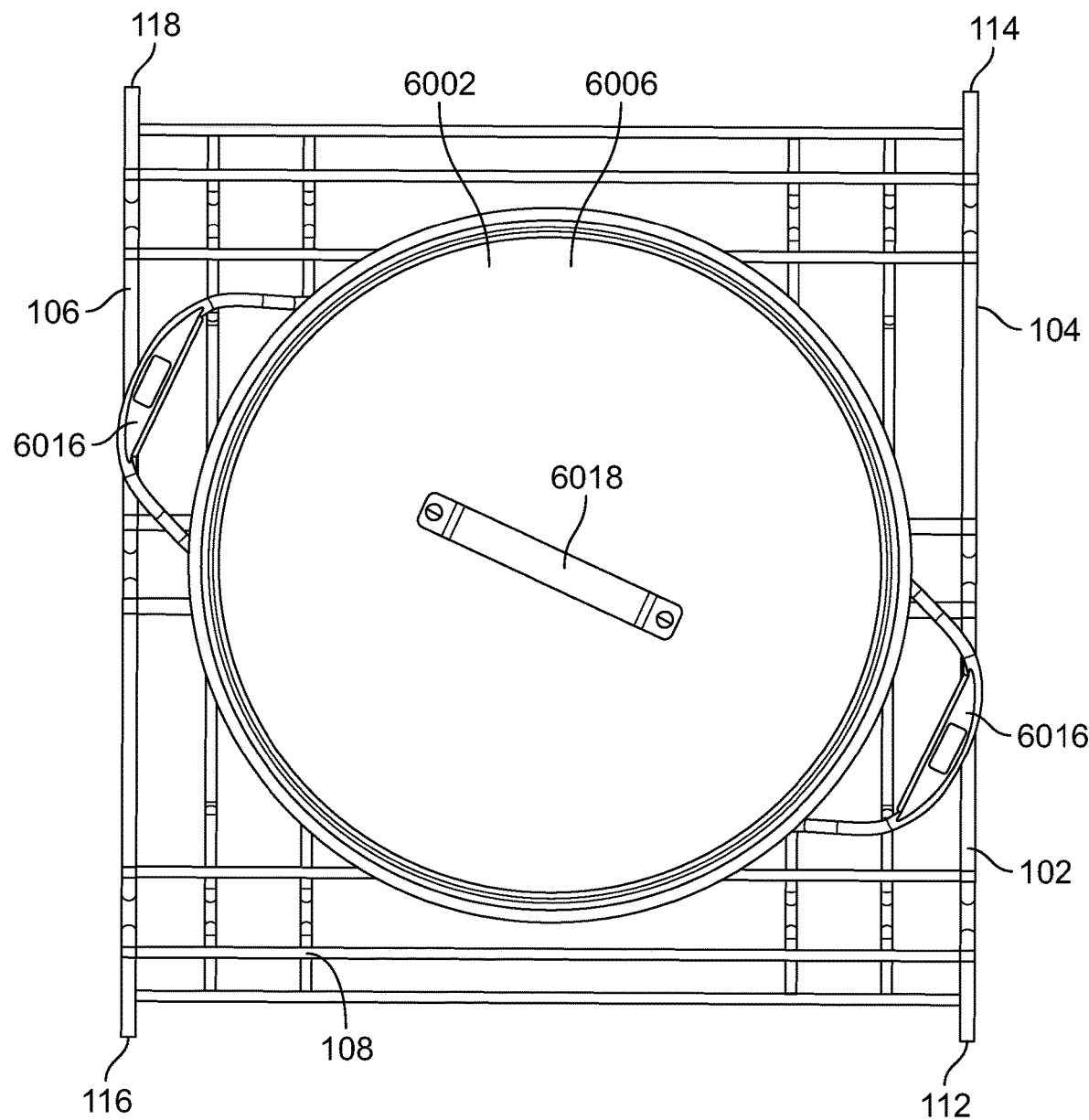
FIG. 62 is a top view of the wok of FIGS. 60 and 61, with the wok shown positioned on the filler ring of FIGS. 58, 59, and 61, and with the filler ring shown positioned on the inset frame of FIGS. 1-3, 59, and 61.
Figure 63:
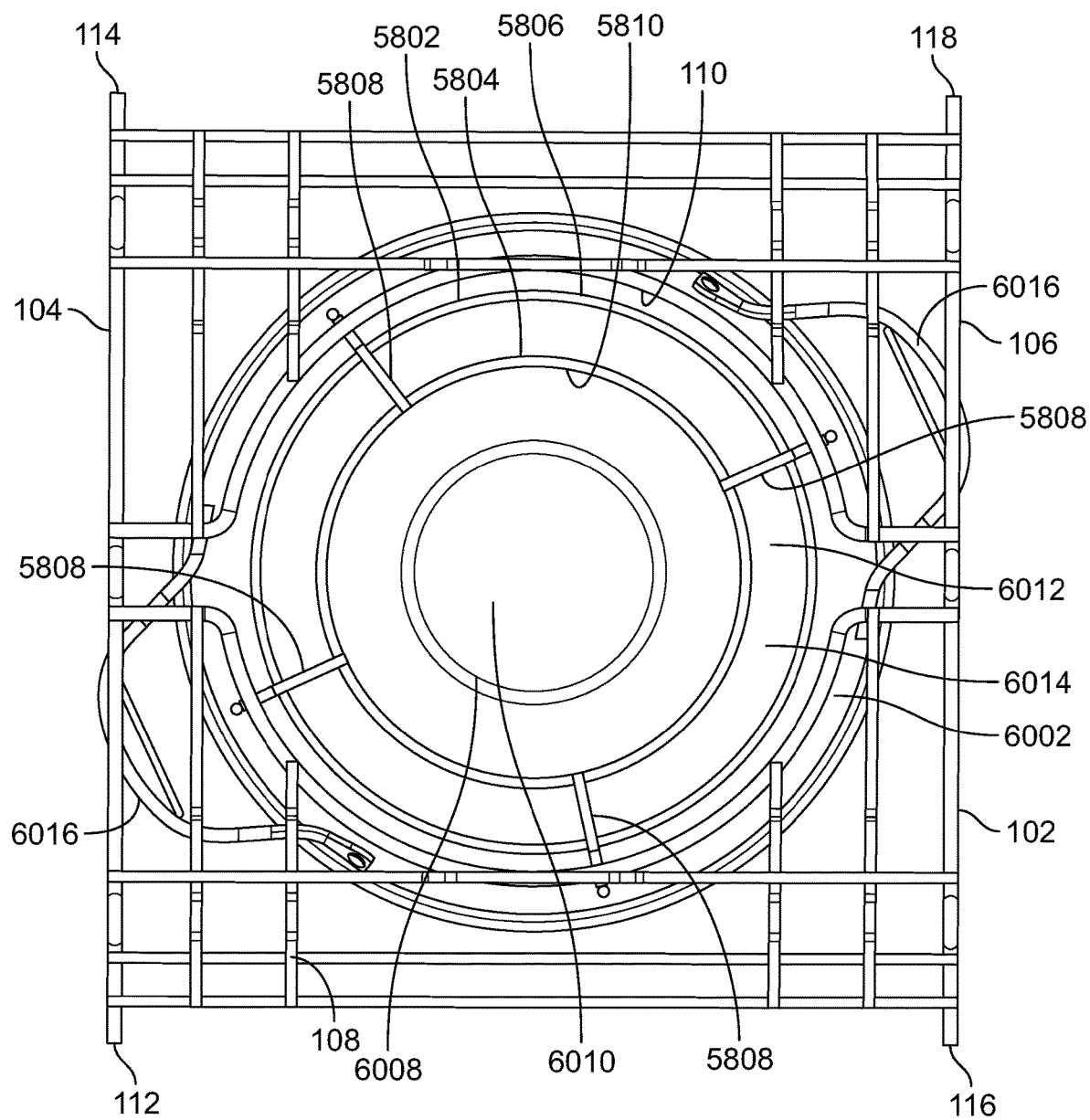
FIG. 63 is a bottom view of the wok of FIGS. 60-62, with the wok shown positioned on the filler ring of FIGS. 58, 59, 61, and 62, and with the filler ring shown positioned in the inset frame of FIGS. 1-3, 59, 61, and 62.

FIG. 61 is a perspective view of the wok 6002 of FIG. 60, with the wok 6002 shown positioned on the filler ring 5802 of FIGS. 58 and 59, and with the filler ring 5802 shown positioned on the inset frame 102 of FIGS. 1-3 and 59. FIG. 62 is a top view of the wok 6002 of FIGS. 60 and 61, with the wok 6002 shown positioned on the filler ring 5802 of FIGS. 58, 59, and 61, and with the filler ring 5802 shown positioned on the inset frame 102 of FIGS. 1-3, 59, and 61. FIG. 63 is a bottom view of the wok 6002 of FIGS. 60-62, with the wok 6002 shown positioned on the filler ring 5802 of FIGS. 58, 59, 61, and 62, and with the filler ring 5802 shown positioned in the inset frame 102 of FIGS. 1-3, 59, 61, and 62. In the illustrated example of FIGS. 61-63, the inner ring 5804 of the filler ring 5802 supports the outer surface 6014 of the sidewall 6012 of the pot 6004 of the wok 6002, with the bottom surface 6010 of the base 6008 of the pot 6004 generally being located and/or positioned below the central opening 5810 of the filler ring 5802.

Figure 64:
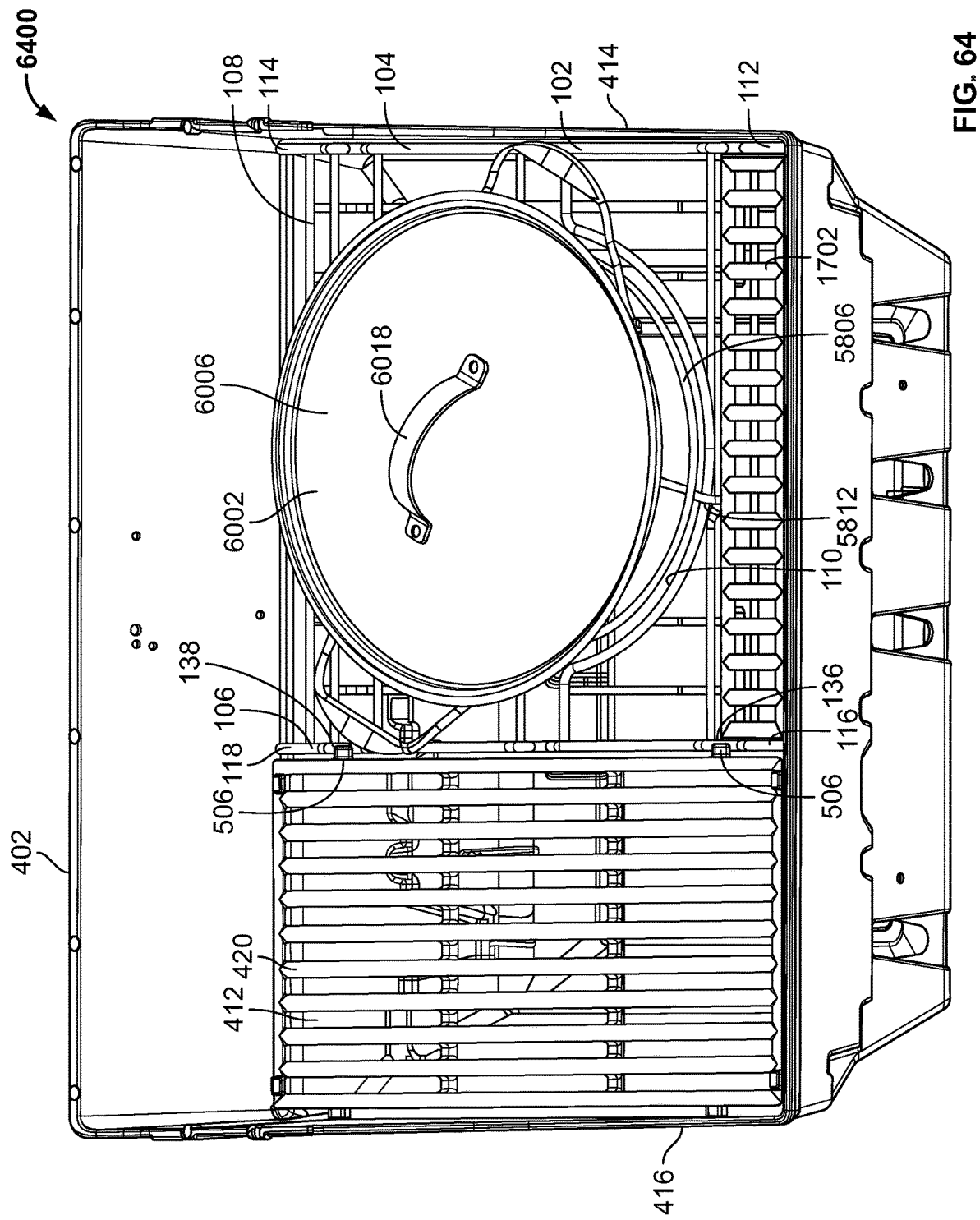
FIG. 64 is a perspective view of the cookbox of FIGS. 4-8 configured in an example ninth cookbox configuration in which the inset frame of FIGS. 1-3, 59, and 61-63 is positioned in the cookbox, the filler ring of FIGS. 58, 59, and 61-63 is positioned on the inset frame, and the wok of FIGS. 60-63 is positioned on the filler ring.
Figure 65:
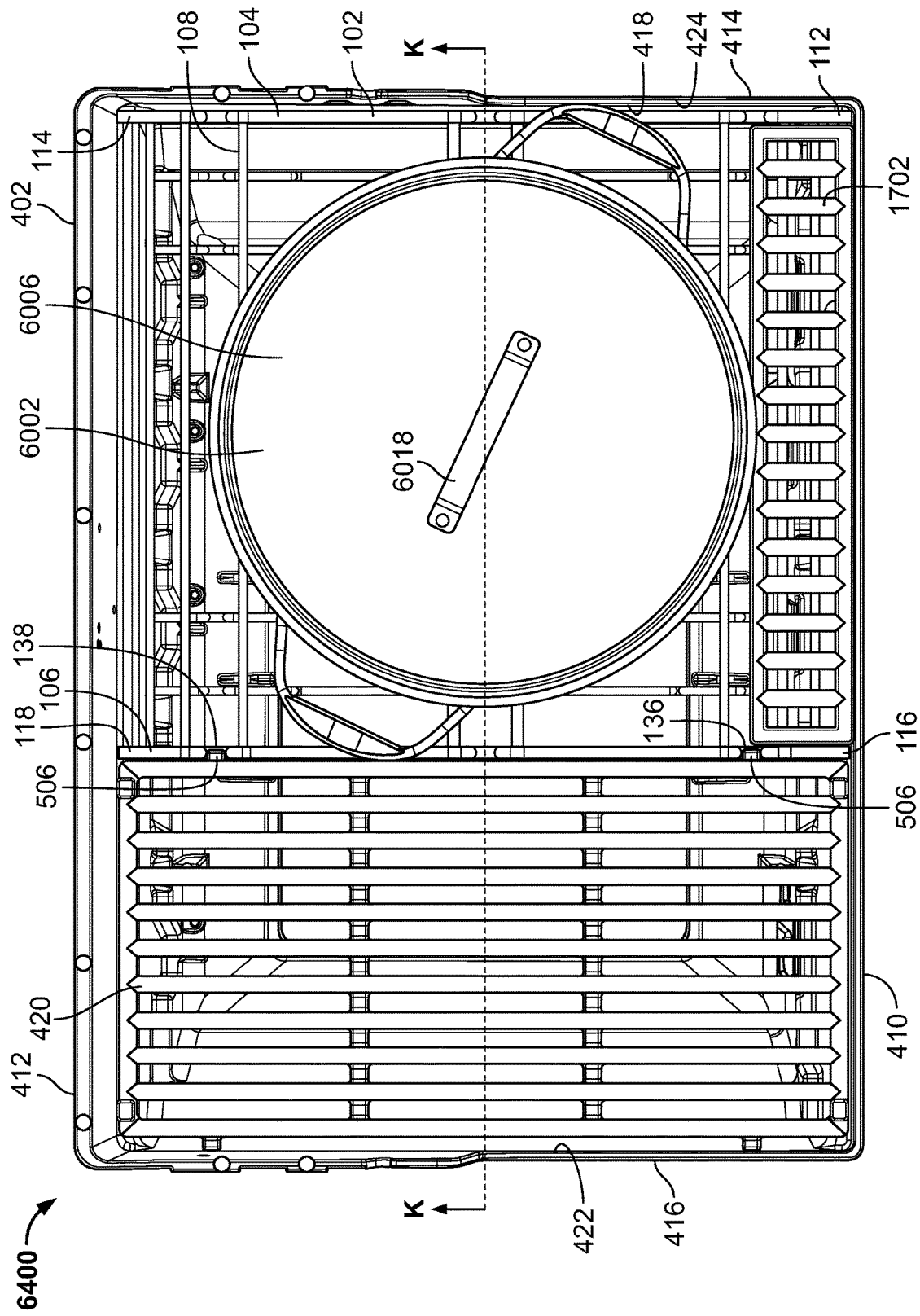
FIG. 65 is a top view of the ninth cookbox configuration of FIG. 64.
Figure 66:
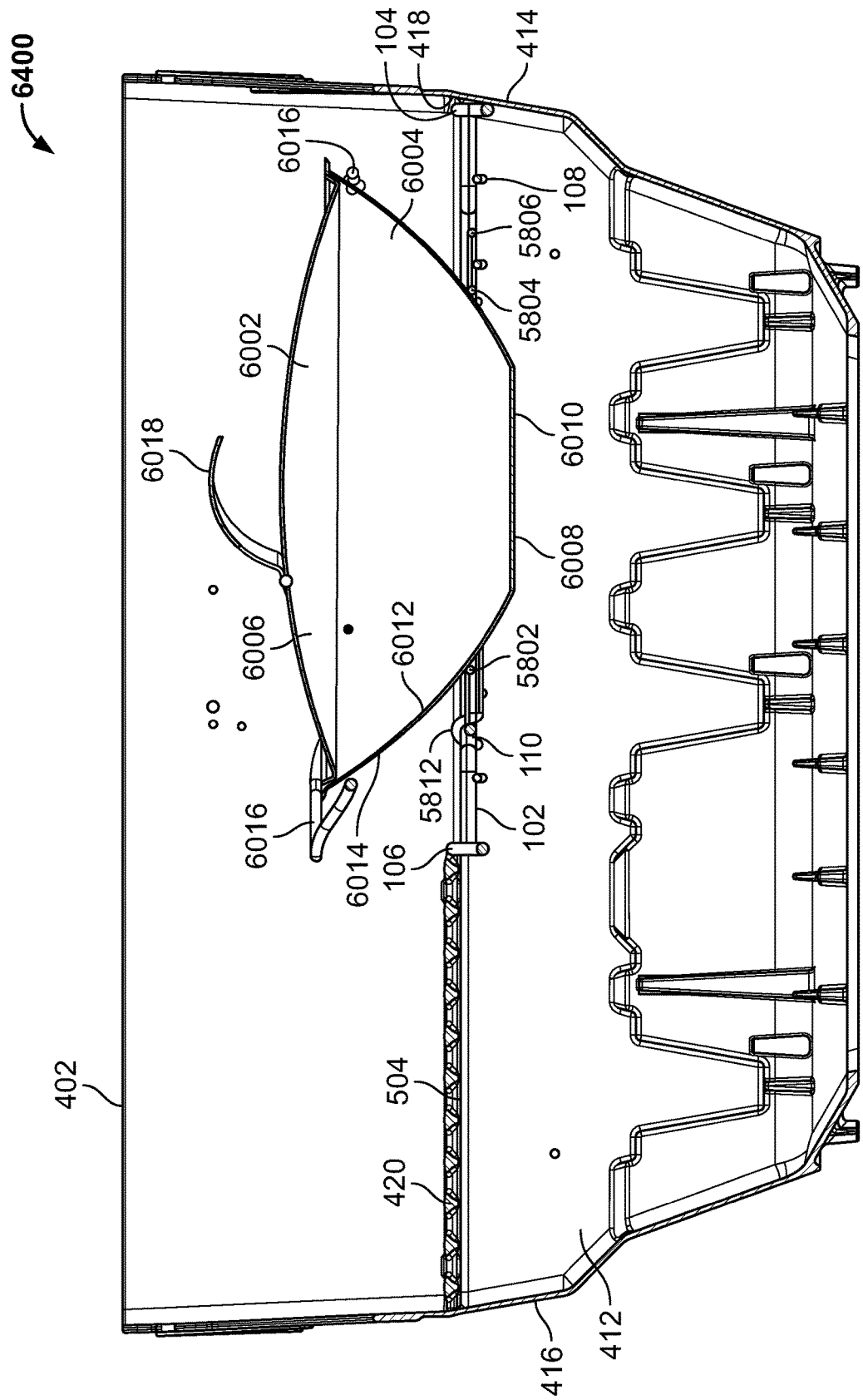
FIG. 66 is a cross-sectional view of the ninth cookbox configuration of FIGS. 64 and 65 taken along section K-K of FIG. 65.

FIG. 64 is a perspective view of the cookbox 402 of FIGS. 4-8 configured in an example ninth cookbox configuration 6400 in which the inset frame 102 of FIGS. 1-3, 59, and 61-63 is positioned in the cookbox 402, the filler ring 5802 of FIGS. 58, 59, and 61-63 is positioned on the inset frame 102, and the wok 6002 of FIGS. 60-63 is positioned on the filler ring 5802. FIG. 65 is a top view of the ninth cookbox configuration 6400 of FIG. 64. FIG. 66 is a cross-sectional view of the ninth cookbox configuration 6400 of FIGS. 64 and 65 taken along section K-K of FIG. 65. As shown in FIGS. 64-66, the location and/or position of the inset frame 102 within the cookbox 402 is substantially the same as the location and/or position of the inset frame 102 within the cookbox 402 as shown and described above in connection with FIGS. 9-12. As further shown in FIGS. 64-66, the respective locations and/or positions of the filler ring 5802 on the inset frame 102 and the wok 6002 on the filler ring 5802 are substantially the same as the respective locations and/or positions of the filler ring 5802 on the inset frame 102 and the wok 6002 on the filler ring 5802 as shown and described above in connection with FIGS. 61-63.

In the illustrated example of FIGS. 64-66, the inset frame 102 and the wok 6002 are respectively located and/or positioned within the cookbox 402 in a side-by-side relationship relative to the cooking grate 420, with the cooking grate 420 being located and/or positioned within the first section 422 of the opening 418 of the cookbox 402, and with the inset frame 102, the filler ring 5802, and the wok 6002 respectively being located and/or positioned within the second section 424 of the opening 418 of the cookbox 402. The inset frame 102 supports, locates, and/or positions the filler ring 5802, and the filler ring 5802 in turn supports, locates, and/or positions the pot 6004 of the wok 6002.

As further shown in FIGS. 64-66, the inset frame 102 additionally supports the above-described filler grate 1702, with the filler grate 1702 being located and/or positioned on the inset frame 102 forward of the pot 6004 of the wok 6002. In other examples, the filler grate 1702 can instead be located and/or positioned on the inset frame 102 rearward of the pot 6004 of the wok 6002. In still other examples, a first instance of the filler grate 1702 can be located and/or positioned on the inset frame 102 forward of the pot 6004 of the wok 6002 while a second instance of the filler grate 1702 is also located and/or positioned on the inset frame 102 rearward of the pot 6004 of the wok 6002.

From the foregoing, it will be appreciated that example inset frames disclosed herein are advantageously configured to interchangeably support cooking accessories of various shapes and sizes within a cookbox of a grill. For example, inset frames disclosed herein are advantageously configured to interchangeably support various large-format rectangular cooking accessories (e.g., a rectangular sear grate, a rectangular cooking stone, a rectangular griddle, a rectangular grilling basket, a rectangular cooking grate, etc.) dimensioned to fill, cover, and/or occupy a substantial portion and/or section (e.g., a majority) of an upper opening of the cookbox of the grill, and to further interchangeably support various rounded (e.g., circular) cooking accessories (e.g., a circular Dutch oven, a circular wok, a circular pot, a circular grilling basket, etc.) dimensioned to have a comparatively smaller form factor and/or footprint relative to such large-format rectangular cooking accessories. Inset frames disclosed herein accordingly provide enhanced flexibility with regard to the range of cooking accessories and/or the range of cooking operations that can be accommodated and/or performed within cookboxes of grills.

In some examples, an inset frame configured to be positioned within a cookbox of a grill is disclosed. In some disclosed examples, the inset frame comprises a support lattice configured to interchangeably support a rectangular cooking accessory and a circular cooking accessory within the cookbox.

In some disclosed examples, the rectangular cooking accessory is a rectangular sear grate, a rectangular cooking stone, a rectangular griddle, a rectangular grilling basket, or a rectangular cooking grate.

In some disclosed examples, the circular cooking accessory is a circular Dutch oven, a circular wok, a circular pot, or a circular grilling basket.

In some disclosed examples, the inset frame further comprises a first support rod and a second support rod spaced apart from the first support rod. In some disclosed examples, the support lattice is coupled to and extends between the first support rod and the second support rod.

In some disclosed examples, a bottom surface of the rectangular cooking accessory is configured to be laterally bounded by the first support rod and the second support rod.

In some disclosed examples, the first support rod and the second support rod each include a first end and a second end located opposite the first end. In some disclosed examples, the first end is configured to be positioned on a front rail of the cookbox. In some disclosed examples, the second end is configured to be positioned on a rear rail of the cookbox.

In some disclosed examples, the support lattice is configured to concurrently support the rectangular cooking accessory and a filler grate within the cookbox.

In some disclosed examples, the filler grate includes a support flange configured to be disposed in a recess of the support lattice when the filler grate is supported by the support lattice. In some disclosed examples, the support flange is to assist in positioning the filler grate relative to the inset frame.

In some disclosed examples, the filler grate is configured to be positioned on the support lattice at a location forward of the rectangular cooking accessory within the cookbox.

In some disclosed examples, the filler grate is configured to be positioned on the support lattice at a location rearward of the rectangular cooking accessory within the cookbox.

In some disclosed examples, the inset frame further comprises a central opening located within the support lattice. In some disclosed examples, the central opening is located between the first support rod and the second support rod.

In some disclosed examples, a bottom surface of the rectangular cooking accessory is configured to extend fully across the central opening of the support lattice.

In some disclosed examples, the circular cooking accessory includes a base or docking feet configured to be circumferentially bounded by the central opening.

In some disclosed examples, the inset frame is configured to be located in a side-by-side arrangement relative to a cooking grate located within the cookbox.

In some disclosed examples, the support lattice is configured to support the rectangular cooking accessory at a vertical elevation within the cookbox that is substantially identical to a corresponding vertical elevation of the cooking grate within the cookbox.

In some disclosed examples, the support lattice is configured to support the rectangular cooking accessory at a vertical elevation that causes the rectangular cooking accessory and the cooking grate to collectively provide a planar and continuous cooking surface extending laterally between a right sidewall and a left sidewall of the cookbox.

In some disclosed examples, the support lattice is configured to concurrently support the rectangular cooking accessory and a filler grate within the cookbox. In some disclosed examples, the filler grate forms part of the planar and continuous cooking surface.

In some disclosed examples, the filler grate is configured to be positioned on the support lattice at a location forward or rearward of the rectangular cooking accessory within the cookbox.

In some disclosed examples, the rectangular cooking accessory is a rectangular sear grate.

In some disclosed examples, the rectangular cooking accessory is a rectangular cooking stone. In some disclosed examples, the rectangular cooking stone includes a notched corner.

In some disclosed examples, the rectangular cooking accessory is a rectangular griddle.

In some disclosed examples, the rectangular cooking accessory is a rectangular cooking basket. In some disclosed examples, the rectangular cooking basket includes a foot configured to be coupled to a support rod of the inset frame to restrict lateral movement of the rectangular cooking basket relative to the inset frame.

In some disclosed examples, the support lattice includes a central opening configured to support a filler ring. In some disclosed examples, the filler ring includes a central opening configured to support a wok.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A grill, comprising:
   a cookbox;
   a rectangular cooking accessory positioned within the cookbox, the rectangular cooking accessory having a planar bottom surface; and
   an inset frame positioned within the cookbox, the inset frame including:
   a first support rod;
   a second support rod spaced apart from and arranged parallel to the first support rod; and
   a support lattice coupled to and extending between the first support rod and the second support rod, the support lattice supporting the rectangular cooking accessory within the cookbox, the support lattice including one or more curved rods defining a central opening having a circular profile, the central opening located between the first support rod and the second support rod, the planar bottom surface of the rectangular cooking accessory extending fully across the central opening and being supported by the one or more curved rods, the first support rod and the second support rod extending above and laterally bounding the planar bottom surface of the rectangular cooking accessory such that the first support rod and the second support rod restrict lateral movement of the planar bottom surface of the rectangular cooking accessory relative to the support lattice, the support lattice configured to interchangeably support the rectangular cooking accessory and a circular cooking accessory within the cookbox, the support lattice further configured such that the central opening receives a portion of the circular cooking accessory when the circular cooking accessory is positioned on the support lattice.

2. The grill of claim 1, wherein the rectangular cooking accessory is a rectangular sear grate, a rectangular cooking stone, a rectangular griddle, a rectangular grilling basket, or a rectangular cooking grate.

3. The grill of claim 1, wherein the circular cooking accessory is a circular Dutch oven, a circular wok, a circular pot, or a circular grilling basket.

4. The grill of claim 1, wherein the first support rod and the second support rod each include a first end and a second end located opposite the first end, the first end positioned on a front rail of the cookbox, the second end positioned on a rear rail of the cookbox.

5. The grill of claim 1, further comprising a filler grate positioned within the cookbox, wherein the support lattice concurrently supports the rectangular cooking accessory and the filler grate within the cookbox.

6. The grill of claim 5, wherein the filler grate includes a downwardly extending support flange disposed in a recess of the support lattice, the support flange configured to assist in positioning the filler grate relative to the inset frame.

7. The grill of claim 5, wherein the filler grate is positioned on the support lattice at a location forward of the rectangular cooking accessory.

8. The grill of claim 5, wherein the filler grate is positioned on the support lattice at a location rearward of the rectangular cooking accessory.

9. The grill of claim 1, wherein the support lattice is configured such that the central opening receives and circumferentially bounds a base or docking feet of the circular cooking accessory when the circular cooking accessory is positioned on the support lattice.

10. The grill of claim 1, further comprising a cooking grate located within the cookbox, wherein the inset frame located in a side-by-side arrangement relative to the cooking grate within the cookbox.

11. The grill of claim 10, wherein the support lattice supports the rectangular cooking accessory at a vertical elevation within the cookbox that matches a corresponding vertical elevation of the cooking grate within the cookbox.

12. The grill of claim 10, wherein the support lattice supports the rectangular cooking accessory at a vertical elevation that causes the rectangular cooking accessory and the cooking grate to collectively provide a planar and continuous cooking surface extending laterally between a right sidewall and a left sidewall of the cookbox.

13. The grill of claim 12, further comprising a filler grate positioned within the cookbox, wherein the support lattice concurrently supports the rectangular cooking accessory and the filler grate within the cookbox, the filler grate forming part of the planar and continuous cooking surface.

14. The grill of claim 13, wherein the filler grate is positioned on the support lattice at a location forward or rearward of the rectangular cooking accessory.

15. The grill of claim 10, wherein at least one of the first support rod and the second support rod includes a recess formed along a corresponding length of the at least one of the first support rod and the second support rod, the recess receiving a laterally extending spacer tab of the cooking grate when the inset frame and the cooking grate are positioned in the side-by-side arrangement within the cookbox.

16. The grill of claim 15, wherein the recess further receives a laterally extending spacer tab of the rectangular cooking accessory concurrently with the spacer tab of the cooking grate when the inset frame and the cooking grate are positioned in the side-by-side arrangement within the cookbox with the rectangular cooking accessory positioned on the support lattice of the inset frame.

17. The grill of claim 10, wherein the inset frame and the cooking grate completely occupy an opening of the cookbox when the inset frame and the cooking grate are positioned in the side-by-side arrangement within the cookbox, wherein the opening is defined by a front wall, a rear wall, a right sidewall, and a left sidewall of the cookbox, wherein the inset frame occupies a first section of the opening and the cooking grate occupies a second section of the opening adjacent the first section when the inset frame and the cooking grate are positioned in the side-by-side arrangement within the cookbox.

18. The grill of claim 1, wherein the rectangular cooking accessory is a rectangular sear grate.

19. The grill of claim 1, wherein the rectangular cooking accessory is a rectangular cooking stone.

20. The grill of claim 19, wherein the rectangular cooking stone includes a notched corner.

21. The grill of claim 1, wherein the rectangular cooking accessory is a rectangular griddle.

22. The grill of claim 1, wherein the rectangular cooking accessory is a rectangular cooking basket.

23. The grill of claim 22, wherein the rectangular cooking basket includes a foot coupled to the first support rod or the second support rod of the inset frame to restrict lateral movement of the rectangular cooking basket relative to the inset frame.

24. The grill of claim 1, wherein the central opening of the support lattice is configured to support a filler ring, and wherein the filler ring includes a central opening configured to support a wok.

25. The grill of claim 1, wherein the support lattice is coupled to respective undersides of and located at least partially below the first support rod and the second support rod, wherein the one or more curved rods are located at least partially below the respective undersides of the first support rod and the second support rod.

* * * * *